(12) United States Patent
Zhu et al.

(10) Patent No.: US 11,197,238 B2
(45) Date of Patent: Dec. 7, 2021

(54) NETWORK ACCESS METHOD, DEVICE, AND SYSTEM

(71) Applicant: HUAWEI TECHNOLOGIES CO., LTD., Guangdong (CN)

(72) Inventors: Yuanping Zhu, Shanghai (CN); Yada Huang, Shanghai (CN); Lingli Pang, Shanghai (CN); Yi Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/751,801

(22) Filed: Jan. 24, 2020

(65) Prior Publication Data
US 2020/0163012 A1 May 21, 2020

Related U.S. Application Data

(63) Continuation of application No. PCT/CN2018/097989, filed on Aug. 1, 2018.

(30) Foreign Application Priority Data

Aug. 2, 2017 (CN) .......................... 201710652059.2

(51) Int. Cl.
*H04W 48/18* (2009.01)
*H04W 12/06* (2021.01)
(Continued)

(52) U.S. Cl.
CPC ........... *H04W 48/18* (2013.01); *H04W 12/06* (2013.01); *H04W 12/08* (2013.01); *H04W 48/16* (2013.01); *H04W 88/16* (2013.01)

(58) Field of Classification Search
CPC ..... H04W 48/18; H04W 12/06; H04W 88/16; H04W 12/08; H04W 48/16
(Continued)

(56) References Cited

U.S. PATENT DOCUMENTS

| 10,136,318 | B1 * | 11/2018 | Hancock | ............. | H04L 63/0876 |
| 2008/0028445 | A1 * | 1/2008 | Dubuc | ................... | H04L 63/08 |
| | | | | | 726/5 |

(Continued)

FOREIGN PATENT DOCUMENTS

| CN | 102045684 A | 5/2011 |
| CN | 102572830 A | 7/2012 |

(Continued)

OTHER PUBLICATIONS

L. Blunk et al.:"PPP Extensible Authentication Protocol (EAP)", RFC 2284, Mar. 1998, total 15 pages.

*Primary Examiner* — Michael Y Mapa
(74) *Attorney, Agent, or Firm* — Womble Bond Dickinson (US) LLP

(57) ABSTRACT

A method for accessing a network by a terminal device by using a wireless means in the field of communications technologies, includes: receiving, by a resident node in a communications network, a first message from a terminal device, where the first message includes an authorization request; sending, by the resident node, a second message, where the second message is processed by a network node into a third message; and receiving, by the resident node, authorization result information from the network, and sending the authorization result information to the terminal device.

18 Claims, 36 Drawing Sheets

(51) Int. Cl.
*H04W 88/16* (2009.01)
*H04W 12/08* (2021.01)
*H04W 48/16* (2009.01)

(58) Field of Classification Search
USPC .......................................................... 455/411
See application file for complete search history.

(56) References Cited

U.S. PATENT DOCUMENTS

| | | | |
|---|---|---|---|
| 2009/0158392 A1* | 6/2009 | Hughes | H04L 63/08 |
| | | | 726/3 |
| 2010/0189052 A1 | 7/2010 | Kavanagh et al. | |
| 2010/0211999 A1* | 8/2010 | Grobman | H04L 63/1458 |
| | | | 726/5 |
| 2015/0074761 A1 | 3/2015 | Zhu et al. | |
| 2015/0350912 A1 | 12/2015 | Head et al. | |
| 2015/0382383 A1 | 12/2015 | Avtamonov et al. | |

FOREIGN PATENT DOCUMENTS

| | | |
|---|---|---|
| CN | 103841558 A | 6/2014 |
| CN | 103229534 B | 1/2016 |
| CN | 106131832 A | 11/2016 |
| WO | 2013170576 A1 | 11/2013 |
| WO | 2017099864 A1 | 6/2017 |

* cited by examiner

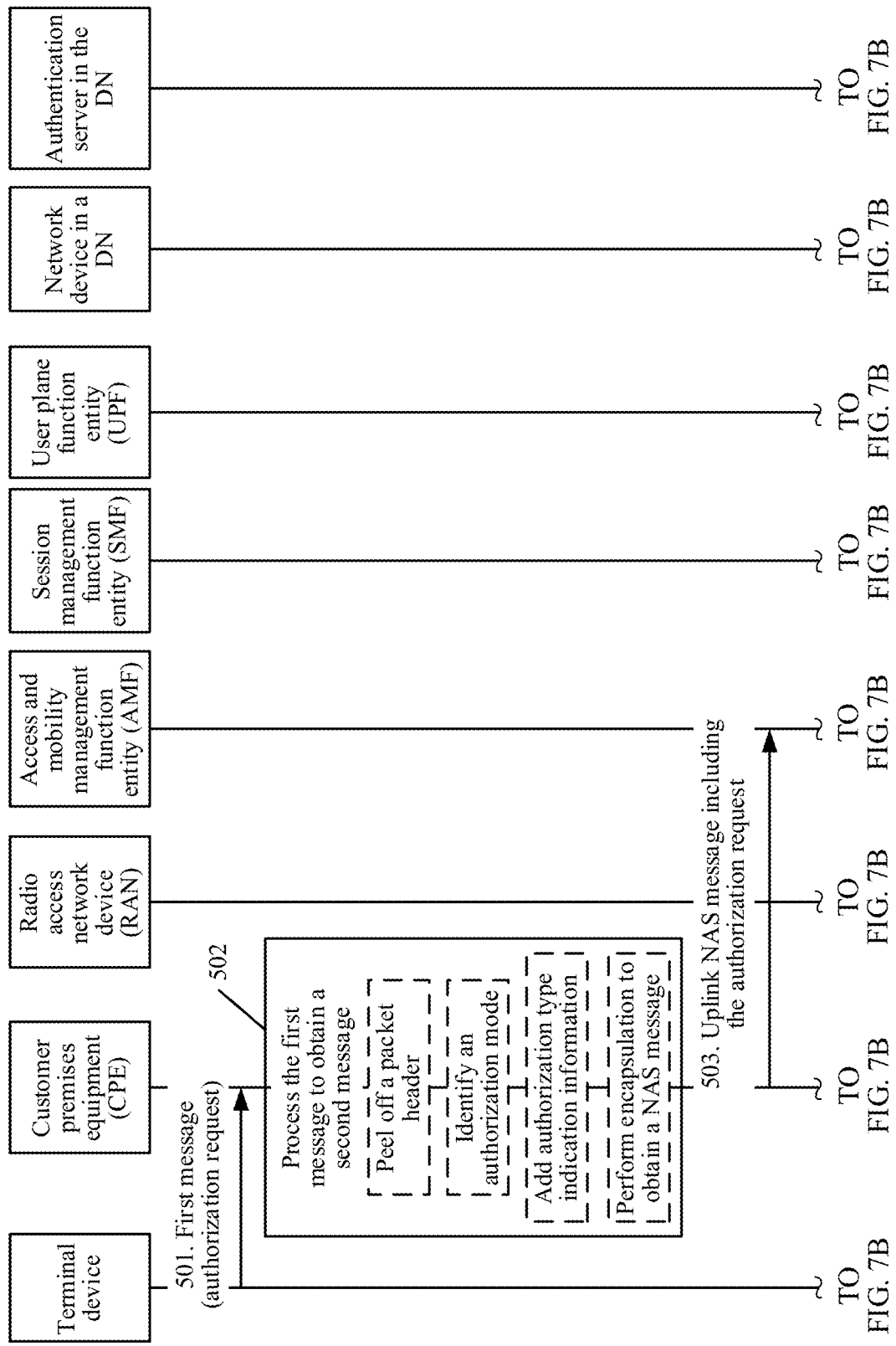

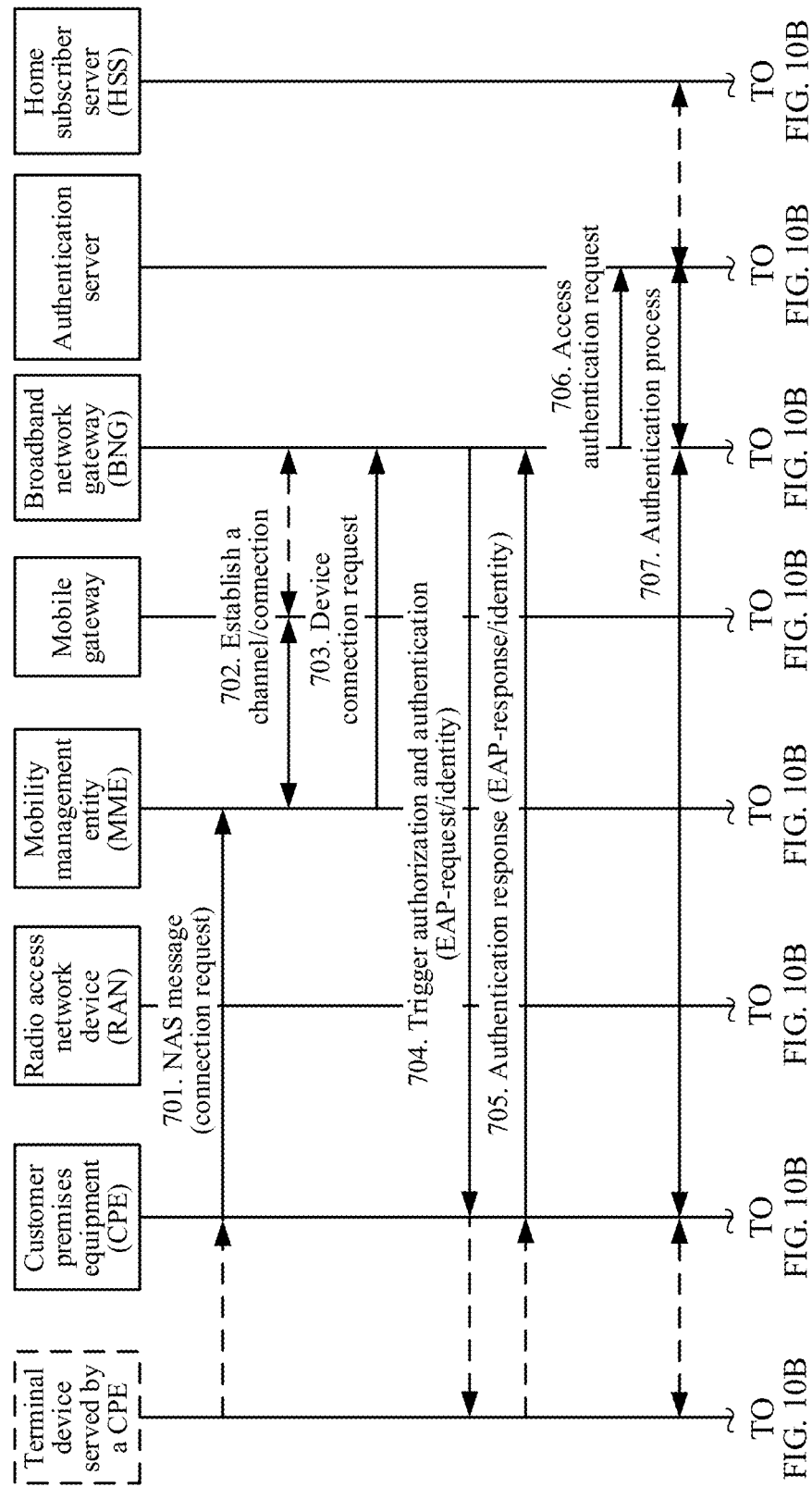

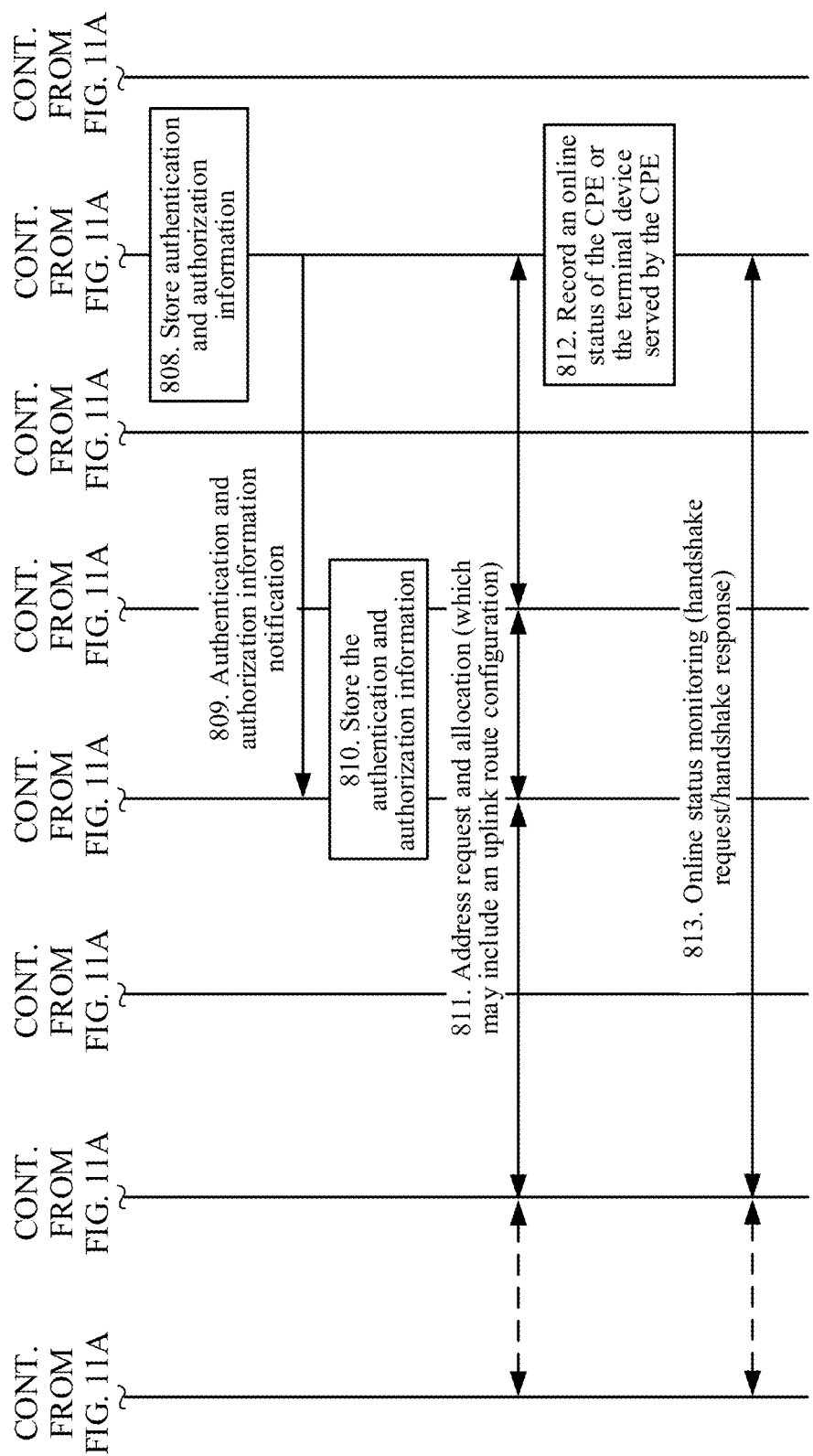

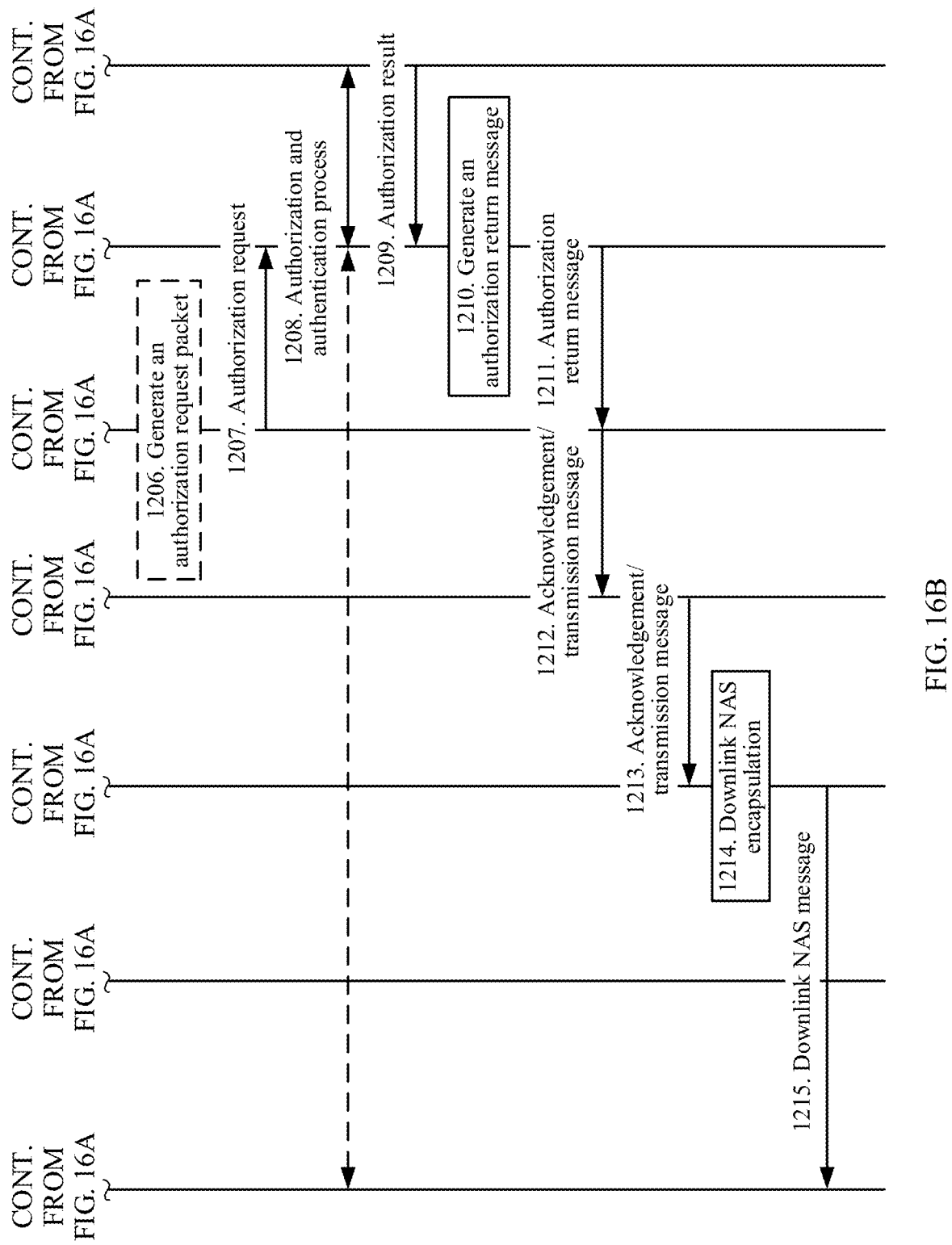

NETWORK ACCESS METHOD, DEVICE, AND SYSTEM

CROSS-REFERENCE TO RELATED APPLICATIONS

This application is a continuation of International Application No. PCT/CN2018/097989, filed on Aug. 1, 2018, which claims priority to Chinese Patent Application No. 201710652059.2, filed, on Aug. 2, 2017. The disclosures of the aforementioned applications are hereby incorporated by reference in their entireties.

TECHNICAL FIELD

This application relates to the field of communications technologies, and particularly, to a network access method, a device, and a system.

BACKGROUND

In recent years, with vigorous development of network construction, a global popularity rate of broadband gradually increases. As a large quantity of emerging services emerge, networks are continuously required to have a higher speed. Some old and traditional wired connection modes, such as an asymmetric digital subscriber line (ADSL for short), cannot meet a speed increasing requirement of a broadband service, and an access network need to be modified and upgraded by deploying a large quantity of fibers (fiber to the x, FTTx for short). However, in some old towns or some remote areas with much land and few people, laying of optical fibers is extremely expensive, construction costs are high, and network operators cannot accept the deployment of optical fibers. Therefore, to meet a broadband access requirement in this scenario, wireless to the x (WTTx for short) becomes a possible option.

In a WTTx scenario, as shown in FIG. 1, a home user deploys and installs a customer premises equipment (CPE for short). The CPE is connected, through a wireless air interface, to a radio access network (RAN for short) device deployed by an operator, and then accesses a network. In addition, the CPE may provide network connections for more terminal devices. The terminal devices may be a mobile phone, a computer, a set-top box (STB for short) of a television, and the like. For various terminal devices served by the CPE, the network needs to provide authorization and address allocation services, so that these devices can smoothly implement corresponding services. For example, if the set-top box is expected to be able to receive an internet protocol television (IPTV for short) service, the set-top box can request various IPTV programs only after authorization succeeds in an IPTV network and a valid internet protocol (IP for short) address is allocated.

In a current wireless network, an authentication mode of a mobile terminal is to send information about the mobile terminal to a core network node by using a non-access stratum (NAS for short) message of a control plane, and is generally that a mobile management entity (MME for short) performs authorization after querying the information about the terminal device from a home subscriber server (HSS for short); and then, after a packet data network gateway (PGW for short) allocates an IP address to the mobile terminal device, the PGW sends the IP address to the mobile terminal by using the NAS message.

In fixed network access modes, a terminal usually uses the following three typical access modes: a point to point protocol over X (PPPoX for short)-based access mode, an internet protocol over X (IPoX for short)-based access mode, and an IEEE 802.1x standard-based access mode. Each access mode corresponds to a different authorization mode. Examples are as follows.

The PPPoX-based access mode provides point-to-point connections on different types of networks, and implements broadband network access and remote connection through PPP dialing. The terminal establishes a tunnel with a broadband remote access router (BRAS for short) to bear a PPP session. For example, the most common protocol, namely, the point to point protocol over Ethernet (PPPoE for short), is a tunneling protocol for encapsulating a PPP data packet in an Ethernet framework. The terminal performs PPPoE negotiation with the BRAS. To be specific, after interaction at a discovery stage, the terminal and the BRAS perform PPP session negotiation (including three stages: link control protocol (LCP for short) negotiation, authentication, and network control protocol (NCP for short) negotiation). During the authentication, the terminal sends an authentication packet to the BRAS based on an authentication mode of the LCP negotiation, and then the BRAS sends an authentication request to an authentication server (AAA server) by using the remote authentication dial-in user service (RADIUS for short) protocol. After the authentication succeeds, at the NCP stage, the BRAS assigns an IP address to a terminal of a fixed network and returns the IP address to the terminal requesting the address.

In the IPoX-based access mode, a common authorization mode is "dynamic host configuration protocol (DHCP for short)+authentication". The terminal obtains an IP address through static configuration or DHCP, and verifies a user identity in a mode such as Web authentication, binding authentication, or fast authentication. For example, in the binding authentication mode, the terminal broadcasts a DHCP request, a gateway forwards the DHCP request of the terminal to a DHCP server after receiving the DHCP request, and the DHCP server sends an authentication request to an authentication server (AAA server). After the authentication succeeds, the DHCP server allocates a valid IP address to a terminal that is of a fixed network and that requests the address, and returns the IP address to the gateway. Then, the gateway forwards the IP address to the requesting terminal.

In the IEEE 802.1x-based access mode, an extensible authentication protocol (EAP for short) of the PPP protocol is introduced, so that more authentication mechanisms can be used, for example, a plurality of extensible authentication methods such as message-digest algorithm-5 (MD5), a one-time password (OTP for short), a smart card, and a pre-shared key (security Pre-shared Key).

In mobile networks, a NAS message-based network access mode is currently applicable only to mobile terminals. A CPE serving as a mobile terminal can perform authorization and address allocation by using this method, but other terminal devices, such as a computer and a set-top box of a television, belonging to the CPE currently cannot perform authorization and request addresses by using NAS messages because the terminal devices do not support a control plane protocol in the mobile networks. The terminal devices still initiate requests according to a traditional fixed network authorization protocol (for example, PPPoX or IPoX). These requests need to be transmitted, through the CPE, a radio access network of a base station, and a backhaul network, to a mobile gateway such as a PGW, and then forwarded to a node that is in an external network and that performs authorization and address allocation, for example, a gateway device BNG/BRAS/SR (which is collectively referred to as a BNG in this specification for ease of description) or a DHCP server. An authorization mode in the traditional fixed network authorization protocol is not supported in an existing mobile network. Therefore, a node in the network needs to be modified to adapt to an access authorization requirement of a terminal device served by the CPE.

It can be learned from the foregoing description that, an existing terminal device served by a CPE cannot well access a network in a region in which insufficient optical fibers are laid.

SUMMARY

To resolve a problem in the prior art that a terminal device cannot well access a network, embodiments of this application provide a network access method, to complete, by fully using an existing network, a process of accessing a network by a terminal device, and especially to complete, by using a mobile network, a process of accessing a network by a terminal device served by a resident node, thereby avoiding laying of dedicated network channels, and increasing mobile network utilization. The embodiments of this application further provide a corresponding device and system.

A first aspect of this application provides a network access method, including: receiving, by a resident node, a first message from a terminal device, where the first message includes an authorization request, and the resident node may be a customer premises equipment (CPE for short); sending, by the resident node, a second message, where the second message is processed by a network node into a third message, the network node includes a RAN device or a management device (for example, an MME), the third message is used by a gateway device to identify the authorization request and/or an authorization mode for the terminal device to access a network, the second message may be sent by the resident node, the RAN device may process the second message and obtain the third message after the processing, and the authorization request and/or the authorization mode for the terminal device to access a network are/is used by the network to perform authorization on the terminal device; and receiving, by the resident node, authorization result information returned from the network, and sending the authorization result information to the terminal device. The authorization result information may be carried in a signaling message, for example, carried in an authorization return message. Certainly, the authorization result information may alternatively be carried in another message. In addition, the authorization result information in this embodiment of this application may be an authorization result sent by the network device. In a process in which the authorization result information is returned to the resident node by using the gateway device and another device, other information, such as route configuration information, may further be added to, for example, the authorization return message, and returned together with the authorization result information. It can be learned from the first aspect that, in this solution, a process of accessing the network by the terminal device may be completed by fully using an existing network, for example, a process of accessing the network by the terminal device served by the CPE may be completed by using a mobile network, thereby avoiding laying of dedicated network channels, and improving mobile network utilization. The embodiments of this application further provide a corresponding device and system.

With reference to the first aspect, that the authorization request and/or the authorization mode for the terminal device to access a network are/is used by the network to perform authorization on the terminal device includes: the authorization mode is used to instruct the gateway device to send the authorization request to the network device, and the authorization request is used to instruct the network device to perform authorization on the terminal device; and the receiving, by the resident node, authorization result information returned from the network includes: receiving, by the resident node, the authorization result information returned by the network device by using the gateway device.

With reference to the first aspect, the second message includes the authorization request and indication information, where the indication information is used to indicate the authorization mode for the terminal device to access a network. The indication information may be authorization type indication information. The authorization type indication information may include an identifier indication of the authorization mode and/or an identifier indication of an authorization protocol, and is used to indicate the authorization mode for the terminal device to access a network. In this embodiment, an authorization mode is provided, thereby ensuring authorization diversity.

With reference to the first aspect, the second message is transmitted to the gateway device through an authorization channel corresponding to the authorization mode, and the authorization channel is used to determine the corresponding authorization mode. For example, the embodiment may be that there is a mapping relationship between an identifier of the authorization channel and the authorization mode, so that the corresponding authorization mode is determined based on the authorization channel. The embodiment may not be limited to the mapping relationship between the identifier of the authorization channel and the authorization mode, and there may be another correspondence, provided that the authorization channel corresponds to the authorization mode. The authorization channel may be a channel used to transmit data and/or signaling, and is not limited to transmitting only an authorization message. The authorization channel is established between the resident node and the gateway device. The authorization channel may be a bearer or a transmission tunnel, or may be a connection to an APN/a DNN, a PDN connection, a PDU session, a network slice, or the like. When the channel is established, a used authorization mode or authorization protocol is determined. In this case, when the authorization request of the terminal device or the resident node is transmitted, authorization type indication information may not need to be transmitted, and only the authorization request is transmitted on the corresponding channel. In this embodiment, another authorization mode is provided, thereby ensuring authorization diversity.

With reference to one embodiment, the method further includes: identifying, by the resident node based on the first message, the authorization mode for the terminal device to access a network from information carried in a data packet between the terminal device and the resident node; and processing, by the resident node, the authorization request and the indication information used to indicate the authorization mode, to obtain the second message. A method for obtaining the second message may be adding the indication information to the first message to obtain the second message, or may be re-generating a second message based on the authorization request and the indication information.

With reference to one embodiment, the second message includes the indication information, where the indication information may be added by the resident node in a processing process that is of a protocol layer above an air interface access layer in a communication protocol or that is of the air interface access layer; and the sending, by the resident node, a second message includes: sending, by the resident node, the second message to the RAN device, where the resident node may send the second message to the RAN device by using an evolved packet system EPS bear; and when the second message includes the indication information, the indication information and the authorization request are included in the third message, and the third message is transmitted through a transmission channel between the RAN device and the gateway device. In this embodiment, a user plane authorization mode is provided, thereby ensuring authorization mode diversity.

With reference to one embodiment, the second message is a first non-access stratum NAS message, where the first NAS message includes the authorization request and the indication information; and the sending, by the resident node, a second message includes: sending, by the resident node, the first NAS message to the RAN device, and sending the first NAS message to the management device by using the RAN device, where the authorization request message and the indication information in the first NAS message are obtained by the management device, and are sent by the management device to the gateway device. In this embodiment, a control plane authorization mode is provided, thereby ensuring authorization mode diversity.

With reference to one embodiment, the method further includes: sending, by the resident node by using the RAN device, another message used to access a network, where the another message is used by the gateway device to identify an authentication request for the resident node to access the network and/or an authentication mode for the resident node to access the network, and the authentication request and the authentication mode for the resident node to access the network are used by the network to perform authentication on the resident node; and receiving, by the resident node, authentication result information returned by the network. In this embodiment, the authentication mode for the resident node to access the network is provided.

With reference to one embodiment, that the authentication request and the authentication mode for the resident node to access the network are used by the network to perform authentication on the resident node includes: the authentication mode is used to instruct the gateway device to send the authentication request to the network device, and the authentication request is used to instruct the network device to perform authentication on the resident node; and the receiving, by the resident node, authentication result information returned by the network includes: receiving, by the resident node, the authentication result information returned by the network device by using the gateway device.

With reference to one embodiment, the another message includes the authentication request and another piece of indication information, where the another piece of indication information includes information used to indicate the authentication mode for the resident node to access the network.

With reference to one embodiment, the third message is transmitted to the gateway device through an authentication channel corresponding to the authentication mode, and the authentication channel is used to determine the corresponding authentication mode.

With reference to one embodiment, the another message is a second NAS message.

With reference to one embodiment, the first NAS message and/or the second NAS message are/is first-type NAS messages/a first-type NAS message, and the first-type NAS message is a message used by the terminal device and/or the resident node to access the network; or the first NAS message and/or the second NAS message are/is second-type NAS messages/a second-type NAS message, the second-type NAS message includes an information element, and the information element includes information used by the terminal device and/or the resident node to access the network, where the information element included in the second-type NAS message may be a currently existing information element, and a field that is specially used to place the information for accessing the network is set in the information element; or the first NAS message and/or the second NAS message are/is third-type NAS messages/a third-type NAS message, and the third-type NAS message includes an information element, and the information element is used to carry information used by the terminal device and/or the resident node to access the network, where the information element includes an information element used for access or a message container used for access, and the information element used for access may be an information element that is specially set, and the information element is used only to access the network.

With reference to one embodiment, the authorization result information includes information that the authorization succeeds, and a return message corresponding to the authorization result information further includes address allocation information and/or route configuration information, where the return message corresponding to the authorization result information may be a return message including the authorization result information, or may be another return message after the return message including the authorization result information; the route configuration information includes reference information that is allocated by the network device and used for route configuration of the resident node or configuration information that is determined by the gateway device based on reference information of route configuration and used for the route configuration of the resident node, and the address allocation information includes a network address pre-allocated or allocated to the terminal device. The reference information of the route configuration may be reference information used for uplink route configuration of the resident node, and the configuration information of the route configuration may be configuration information used for the uplink route configuration of the resident node.

With reference to one embodiment, the resident node stores the configuration information used for the route configuration of the resident node, and the configuration information is used by the resident node to determine corresponding route configuration for a service of the terminal device.

With reference to one embodiment, the second message further includes additional authorization information, where the additional authorization information includes at least one of an identity indicating the resident node, information indicating a location of the terminal device and/or a location of the resident node, and information about a channel used to transmit the authorization request; and the information about a channel used to transmit the authorization request includes at least one of the following information: a tunnel identifier, a bearer identifier, and a session identifier.

A second aspect of this application provides a network access method, including: receiving, by a gateway device, an authorization request, where the authorization request is sent by a terminal device to a resident node by using a first message, the resident node may be a customer premises equipment, the first message is processed by the resident node into a second message, the second message is processed by a network node into a third message, and the third message includes the authorization request and/or an authorization mode for the terminal device to access a network; identifying, by the gateway device based on the third message, the authorization request and the authorization mode for the terminal device to access a network, where the second message is modified on a RAN device to obtain the third message in this application; sending, by the gateway device based on the authorization mode, the authorization request to a corresponding network device in the network, where the authorization request is used to instruct the network device to perform authorization on the terminal device; and sending, by the gateway device, authorization result information to the RAN device or a management device, where the authorization result information includes an authorization result that is for the terminal device and that is returned by the network device. It can be learned from the second aspect that, in this solution, a process of accessing the network by the terminal device may be completed by fully using an existing network, for example, a process of accessing the network by the terminal device served by the CPE may be completed by using a mobile network, thereby avoiding laying of dedicated network channels, and improving mobile network utilization. The embodiments of this application further provide a corresponding device and system.

With reference to the second aspect, the method further includes: receiving, by the gateway device, indication information, where the indication information is included in the second message and the third message, and the indication information is used to indicate the authorization mode for the terminal device to access a network. The indication information may be authorization type indication information. The authorization type indication information may include an identifier indication of the authorization mode and/or an identifier indication of an authorization protocol, and is used to indicate the authorization mode for the terminal device to access a network. In this embodiment, an authorization mode is provided, thereby ensuring authorization diversity.

With reference to the second aspect, the receiving, by a gateway device, an authorization request includes: receiving, by the gateway device, the authorization request through an authorization channel corresponding to the authorization mode, where the authorization channel is used to determine the corresponding authorization mode. In one embodiment, the authorization channel is a channel used to transmit data and/or signaling, and is not limited to transmitting only an authorization message. The authorization channel may be established between the CPE and the gateway device. The authorization channel may be a bearer or a transmission tunnel, or may be a connection to an APN/a DNN, a PDN connection, a PDU session, a network slice, or the like. When the channel is established, a used authorization mode or authorization protocol is determined. In this case, when the authorization request of the terminal device or the CPE is transmitted, authorization type indication information may not need to be transmitted, and only the authorization request or an authentication request is transmitted on the corresponding channel. In this embodiment, another authorization mode is provided, thereby ensuring authorization diversity.

With reference to one embodiment, receiving, by the gateway device, the authorization request and the indication information includes: receiving, by the gateway device through a transmission channel between the radio access network RAN device and the gateway device, the third message sent by the RAN device, where the third message includes the authorization request and the indication information that are included in the second message.

With reference to one embodiment, receiving, by the gateway device, the authorization request and the indication information includes: receiving, by the gateway device, the authorization request and the indication information that are sent by the management device, where the authorization request and the indication information are obtained by the management device from a first non-access stratum NAS message and are sent by the management device, and the first NAS message is sent by the resident node to the management device by using the radio access network RAN device.

With reference to one embodiment, the gateway device adds additional authorization information to a fourth message sent to the network device, where the additional authorization information includes at least one of an identity indicating the resident node, information indicating a location of the terminal device and/or a location of the resident node, and information about a channel used to transmit the authorization request; and the information about a channel used to transmit the authorization request includes at least one of the following information: a tunnel identifier, a bearer identifier, and a session identifier.

With reference to one embodiment, the method further includes: recording, by the gateway device, a mapping relationship between identification information of the resident node and an identifier of the terminal device, where the mapping relationship is used to send the authorization result information corresponding to the authorization request.

With reference to one embodiment, the method further includes: receiving, by the gateway device, an authentication request used by the resident node to access a network, where the authentication request is included in another message sent by the resident node; identifying, by the gateway device based on the another message, the authentication request for the resident node to access the network and/or an authentication mode for the resident node to access the network; sending, by the gateway device, the authentication request to the network device based on the authentication mode, where the authentication request is used by the network device to perform authentication on the resident node; and forwarding, by the gateway device, authentication result information that is for the resident node and that is returned by the network device.

With reference to one embodiment, the another message includes the authentication request and another piece of indication information, where the another piece of indication information includes information used to indicate the authentication mode for the resident node to access the network.

With reference to one embodiment, the third message is transmitted to the gateway device through an authentication channel corresponding to the authentication mode, and the authentication channel is used to determine the corresponding authentication mode.

With reference to one embodiment, the method further includes: determining, by the gateway device, configuration information of route configuration based on reference information that is of the route configuration and that is allocated by the network device, where the reference information of the route configuration is configuration information that is of the route configuration, that is allocated by the network device when the authorization result information includes information that the authorization succeeds, and that is sent by the gateway device to the resident node by using the RAN device or by using the management device and the radio access network RAN device.

With reference to one embodiment, the another piece of indication information and the authentication request that are received by the gateway device are obtained by the management device from a second NAS message sent by the resident node.

A third aspect of this application provides a network access method, including: receiving, by a management device, an authorization request sent by a resident node, where the authorization request is sent by a terminal device to the resident node by using a first message; sending, by the management device, a third message to a gateway device, where the third message includes the authorization request and/or an authorization mode for the terminal device to access a network, the third message is used by the gateway device to identify the authorization request and/or the authorization mode for the terminal device to access a network, the authorization mode is used to instruct the gateway device to send, to the resident node, authorization result information returned by the gateway device, and the authorization result information includes an authorization result that is for the terminal device and that is returned by the network device. It can be learned from the third aspect that, in this solution, a process of accessing the network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the third aspect, in one embodiment, the first message is processed by the resident node into a second message, the second message is processed by the management device into the third message, and the second message and the third message include the authorization request and indication information, where the indication information is used to indicate the authorization mode for the terminal device to access a network.

With reference to the third aspect, in one embodiment, the first message is processed by the resident node into the second message, the second message is processed by the management device into the third message, and the second message is a first non-access stratum NAS message; and the method further includes: obtaining, by the management device, the authorization request and the indication information from the first NAS message, and sending the indication information when sending the authorization request.

With reference to the third aspect, in one embodiment, the method further includes: receiving, by the management device, another message used by the resident node to access a network, where the another message is used by the gateway device to identify an authentication request for the resident node to access the network and an authentication mode for the resident node to access the network, and the authentication mode is used to instruct the gateway device to send the authentication request to the network device; and sending, by the management device, the authentication request to the gateway device, where the authentication request is used to instruct the network device to perform authentication on the resident node.

With reference to one embodiment, the another message includes the authentication request and another piece of indication information, where the another piece of indication information includes information used to indicate the authentication mode for the resident node to access the network.

With reference to one embodiment, the method further includes: obtaining, by the management device, the another piece of indication information and the authentication request from a second NAS message; and the sending, by the management device, the authentication request to the gateway device includes: sending, by the management device, authentication protocol type information and the authentication request through a transmission channel established between the management device and the gateway device.

A fourth aspect of this application provides a network access method, including: sending, by a resident node, a first message to a radio access network RAN device, where the first message includes an authorization request, the first message is processed by a network node into a second message, the second message is used by a gateway device to identify the authorization request for the resident node to access a network and/or an authorization mode for the resident node to access the network, and the authorization request and/or the authorization mode for the resident node to access the network are/is used by the network to perform authorization on the resident node; and receiving, by the resident node, authorization result information from the network. It can be learned from the fourth aspect that, in this solution, a process of accessing a network by a terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the fourth aspect, in one embodiment, that the authorization request and/or the authorization mode for the resident node to access the network are/is used by the network to perform authorization on the resident node includes: the authorization mode is used to instruct the gateway device to send the authorization request to a network device, and the authorization request is used to instruct the network device to perform authorization on the terminal device; and the receiving, by the resident node, authorization result information returned from the network includes: receiving, by the resident node, the authorization result information returned by the network device by using the gateway device.

With reference to the fourth aspect, in one embodiment, the first message includes the authorization request and indication information, where the indication information includes information used to indicate the authorization mode for the resident node to access the network.

With reference to the fourth aspect, in one embodiment, the first message is transmitted to the gateway device through an authorization channel corresponding to the authorization mode, and the authorization channel is used to determine the corresponding authorization mode. In one embodiment, the authorization channel is a channel used to transmit data and/or signaling, and is not limited to transmitting only an authorization message.

With reference to one embodiment, the first message is a non-access stratum NAS message.

With reference to one embodiment, the NAS message is a first-type NAS message, and the first-type NAS message is a message used by the resident node to access the network; or the NAS message is a second-type NAS message, where the second-type NAS message includes an information element, and the information element includes information used by the resident node to access the network; or the NAS message is a third-type NAS message, where the third-type NAS message includes an information element, the information element is used to carry information used by the resident node to access the network, and the information element includes an information element used for access or a message container used for access.

With reference to one embodiment, the authorization result information includes information that the authorization succeeds, and a return message corresponding to the authorization result information further includes address allocation information and/or route configuration information, where the route configuration information includes reference information that is of route configuration and that is allocated by the network device or configuration information that is of route configuration and that is determined by the gateway device based on reference information of the route configuration, and the address allocation information includes a network address pre-allocated or allocated to the terminal device.

With reference to one embodiment, the first message further includes additional authorization information, where the additional authorization information includes at least one of an identity indicating the resident node, information indicating a location of the resident node, and information about a channel used to transmit the authorization request; and the information about a channel used to transmit the authorization request includes at least one of the following information: a tunnel identifier, a bearer identifier, and a session identifier.

A fifth aspect of this application provides a network access method, including: receiving, by a gateway device, an authorization request used by a resident node to access a network, where the authorization request is included in a first message sent by the resident node, and the first message is processed by a network node into a second message; identifying, by the gateway device based on the second message, the authorization request for the resident node to access the network and/or an authorization mode for the resident node to access the network; sending, by the gateway device, the authorization request to a network device based on the authorization mode, where the authorization request is used by the network device to perform authorization on the resident node; and sending, by the gateway device, authorization result information to a radio access network RAN device or a management device, where the authorization result information includes an authorization result that is for the resident node and that is returned by the network device. It can be learned from the fifth aspect that, in this solution, a process of accessing a network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the fifth aspect, in one embodiment, the first message includes the authorization request and indication information, where the indication information includes information used to indicate the authorization mode for the resident node to access the network.

With reference to the fifth aspect, in one embodiment, the first message is transmitted to the gateway device through an authorization channel corresponding to the authorization mode, and the authorization channel is used to determine the corresponding authorization mode. The authorization channel may be a channel used to transmit data and/or signaling, and is not limited to transmitting only an authorization message.

With reference to one embodiment, the first message is a non-access stratum NAS message; and the method further includes: receiving, by the gateway device, the indication information, where the indication information and the authorization request are obtained by the management device from the NAS message sent by the resident node.

With reference to one embodiment, the method further includes: determining, by the gateway device, configuration information of route configuration of the resident node based on reference information that is of the route configuration and that is allocated by the network device, where the configuration information is used to determine corresponding route configuration for a service of the terminal device, and the reference information of the route configuration is allocated by the network device when the authorization result information includes information that the authorization succeeds.

With reference to one embodiment, the gateway device adds additional authorization information to a third message sent to the network device, where the additional authorization information includes at least one of an identity indicating the resident node, information indicating a location of the resident node, and information about a channel used to transmit the authorization request; and the information about a channel used to transmit the authorization request includes at least one of the following information: a tunnel identifier, a bearer identifier, and a session identifier.

A sixth aspect of this application provides a network access method, including: receiving, by a management device, an authorization request used by a resident node to access a network, where the authorization request is included in a first message sent by the resident node; processing, by the management device, the first message into a second message, where the second message is used by the gateway device to identify the authorization request for the resident node to access the network and/or an authorization mode for the resident node to access the network, and the authorization mode is used to instruct the gateway device to send the authorization request to the network device; sending, by the management device, the authorization request to the gateway device, where the authorization request is used to instruct the network device to perform authorization on the resident node; and sending, by the management device to the resident node, authorization result information returned by the gateway device, where the authorization result information includes an authorization result that is for the resident node and that is returned by the network device. It can be learned from the sixth aspect that, in this solution, a process of accessing a network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the sixth aspect, in one embodiment, the first message includes the authorization request and indication information, where the indication information includes information used to indicate the authorization mode for the resident node to access the network.

With reference to one embodiment, the first message is a non-access stratum NAS message, and before the sending, by the management device, the authorization request to the gateway device, the method further includes:

obtaining, by the management device, the indication information and the authorization request from the NAS message; and the sending, by the management device, the authorization request to the gateway device includes:

sending, by the management device, the indication information and the authorization request through a transmission channel established between the management device and the gateway device.

With reference to one embodiment, the method further includes: receiving, by the management device, authorization information sent by the gateway device, and storing the authorization information.

A seventh aspect of this application provides a network access method, including: receiving, by a resident node, a first message from a terminal device, where the first message includes a first authorization request;

transmitting, by the resident node, a first non-access stratum NAS message to a management device by using an access network AN device, where the first NAS message includes the first authorization request, and the management device learns of the first authorization request from the first NAS message and then sends the first authorization request to an authentication device, so that the authentication device performs authorization on the terminal device based on the first authorization request; and receiving, by the resident node, first authorization result information returned by the management device, and sending the first authorization result information to the terminal device, where the first authorization result information includes an authentication result of the authentication device for the terminal device. It can be learned from the seventh aspect that, in this solution, a process of accessing a network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the seventh aspect, in one embodiment, the first message and the first NAS message further include first indication information, where the first indication information includes information used to indicate an authorization mode for the terminal device to access the network, and the first indication information is used to instruct the authentication device to perform authorization on the terminal device based on the authorization mode indicated by the first indication information.

With reference to one embodiment, when the authentication device is an authentication service function entity, the receiving, by the resident node, first authorization result information returned from the authentication device via the management device includes:

receiving, by the resident node, a second NAS message, where the second NAS message includes the first authorization result information and/or address information of the terminal device.

With reference to one embodiment, the first NAS message further includes at least one of an identity indicating the resident node, information indicating a location of the terminal device and/or a location of the resident node, and information about a channel used to transmit the first authorization request; and the information about a channel used to transmit the first authorization request includes at least one of the following information: a tunnel identifier, a bearer identifier, and a session identifier.

With reference to one embodiment, the method further includes:

sending, by the resident node, a third NAS message to the management device, where the third NAS message includes a second authorization request, and the management device obtains the second authorization request from the third NAS message and then sends the second authorization request to the authentication device, so that the authentication device performs authorization on the resident node based on the second authorization request; and receiving, by the resident node, second authorization result information returned by the management device, where the second authorization result information includes an authorization result that is for the resident node and that is returned by the authentication device.

With reference to one embodiment, the third NAS message further includes second indication information, where the second indication information is used to indicate an authorization mode for the resident node to access a network, and the second indication information is used to instruct the authentication device to perform authorization on the resident node based on the authorization mode indicated by the second indication information.

With reference one embodiment, the first NAS message and/or the second NAS message and/or the third NAS message are/is first-type NAS messages/a first-type NAS message, where the first-type NAS message is a message used by the terminal device or the resident node to access the network; or the first NAS message and/or the second NAS message and/or the third NAS message are/is second-type NAS messages/a second-type NAS message, where the second-type NAS message includes an information element, and the information element includes information used by the terminal device or the resident node to access the network; or the first NAS message and/or the second NAS message and/or the third NAS message are/is third-type NAS messages/a third-type NAS message, where the third-type NAS message includes an information element, the information element is used to carry information used by the terminal device or the resident node to access the network, and the information element includes an information element used for network access or a message container used for network access.

With reference to one embodiment, the third NAS message further includes additional authorization information, where the additional authorization information includes at least one of an identity indicating the resident node, information indicating a location of the resident node, and information about a channel used to transmit the second authorization request; and the information about a channel used to transmit the second authorization request includes: a tunnel identifier, and/or a bearer identifier, and/or a session identifier.

An eighth aspect of this application provides a network access method, including: receiving, by a gateway device, a first authorization request sent by a management device, where the first authorization request is sent by a terminal device to a resident node by using a first message, the first message is a first non-access stratum NAS message, or the first message is processed by the resident node into a first non-access stratum NAS message, the first NAS message includes the first authorization request, and the management device learns of the first authorization request from the first NAS message;

sending, by the gateway device, the first authorization request to an authentication device, so that the authentication device performs authorization on the terminal device based on the first authorization request; and sending, by the gateway device, first authorization result information to the management device, where the first authorization result information is sent by the management device to the resident node by using a second NAS message, and the first authorization result information includes an authorization result that is for the terminal device and that is returned by the authentication device.

With reference to the eighth aspect, in one embodiment, the first message and the first NAS message further include first indication information, where the first indication information includes information used to indicate an authorization mode for the terminal device to access a network, and the first indication information is used to instruct the authentication device to perform authorization on the terminal device based on the authorization mode indicated by the first indication information.

With reference to one embodiment, the method further includes:

adding, by the gateway device, additional authorization information to a second message sent to the authentication device, where the additional authorization information includes at least one of an identity indicating the resident node, information indicating a location of the terminal device and/or a location of the resident node, and information about a channel used to transmit the first authorization request, where the information about a channel used to transmit the first authorization request includes at least one of the following information: a tunnel identifier, a bearer identifier, and a session identifier.

With reference to one embodiment, the method further includes:

receiving, by the gateway device, a second authorization request sent by the management device, where the second authorization request is included in a third NAS message sent by the resident node, and the management device learns of the second authorization request from the third NAS message;

sending, by the gateway device, the second authorization request to the authentication device, so that the authentication device performs authorization on the resident node based on the second authorization request; and sending, by the gateway device, second authorization result information to the management device, where the second authorization result information includes an authorization result that is for the resident node and that is returned by the authentication device.

With reference to one embodiment, the third NAS message further includes second indication information, where the second indication information is used to indicate an authorization mode for the resident node to access a network, and the second indication information is used to instruct the authentication device to perform authorization on the resident node based on the authorization mode indicated by the second indication information.

With reference to one embodiment, the method further includes:

adding, by the gateway device, additional authorization information to a third message sent to the authentication device, where the additional authorization information includes at least one of the identity indicating the resident node, the information indicating a location of the terminal device, and information about a channel used to transmit the second authorization request, where the information about a channel used to transmit the second authorization request includes at least one of the following information: a tunnel identifier, a bearer identifier, and a session identifier.

A ninth aspect of this application provides a network access method, including: receiving, by a management device, a first NAS message sent by a resident node, where the first NAS message includes a first authorization request, the first authorization request is included in a first message sent by a terminal device, and the first authorization request is used to instruct an authentication device to perform authorization on the terminal device; obtaining, by the management device, the first authorization request from the first NAS message; sending, by the management device, the first authorization request to the authentication device, so that the authentication device performs authorization on the terminal device based on the first authorization request; and sending, by the management device, first authorization result information to the resident node, where the first authorization result information includes an authorization result that is for the terminal device and that is returned by the authentication device. It can be learned from the ninth aspect that, in this solution, a process of accessing a network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the ninth aspect, in one embodiment, the first message further includes first indication information, where the first indication information is used to indicate an authorization mode for the terminal device to access the network, and the first indication information is used by the authentication device to perform authorization on the terminal device based on the authorization mode indicated by the first indication information.

With reference to one embodiment, the method further includes:

receiving, by the management device, address information returned from the gateway device;

adding, by the management device, the first authorization result information and/or the address information to a second NAS message; and sending, by the management device, the second NAS message to the resident node.

With reference to the ninth aspect, in one embodiment, the method further includes:

receiving, by the management device, a third NAS message from the resident node, where the third NAS message includes a second authorization request;

extracting, by the management device, the second authorization request from the third NAS message;

sending, by the management device, an authentication request to the authentication device, so that the authentication device performs authentication on the resident node based on the authentication request, where the authentication request is the second authorization request or is generated by the management device based on the second authorization request; and sending, by the management device, second authorization result information to the resident node, where the second authorization result information includes an authorization result that is for the resident node and that is returned by the authentication device.

With reference to one embodiment, the third NAS message further includes second indication information, where the second indication information is used to indicate an authorization mode for the resident node to access a network, and the second indication information is used to instruct the authentication device to perform authorization on the resident node based on the authorization mode indicated by the second indication information.

A tenth aspect of this application provides a network access method, including: sending, by a terminal device, a first message to a resident node, where the first message is a non-access stratum NAS message, the first message includes a first authorization request, the authorization request is used to instruct an authentication device to perform authorization on the terminal device, and a protocol stack of the terminal device includes an Ethernet protocol layer, a local area network protocol layer, or a personal area network protocol layer below a non-access NAS layer; and receiving, by the terminal device, first authorization result information returned by the resident node. It can be learned from the tenth aspect that, in this solution, a process of accessing a network by the terminal device may be completed by fully using an existing network, for example, a process of accessing the network by a terminal device served by a CPE may be completed by using a mobile network, thereby avoiding laying of dedicated network channels, and improving mobile network utilization. The embodiments of this application further provide a corresponding device and system.

With reference to the tenth aspect, in one embodiment, the first message further includes first indication information, where the first indication information is used to indicate an authorization mode for the terminal device to access the network, and the first indication information is used by the authentication device to perform authorization on the terminal device based on the authorization mode indicated by the first indication information.

An eleventh aspect of this application provides a resident node, applied to a process of accessing a network by a terminal device served by the resident node. The resident node includes a memory, a transceiver, and at least one processor. The memory stores an instruction; the memory, the transceiver, and the at least one processor are connected to each other by using a line, and the transceiver is configured to perform message transmission and reception operations on the resident node side in the method according to any one of the embodiments; and the at least one processor invokes the instruction, to perform a message processing operation or a control operation performed on the resident node side in the method according to any one of the embodiments.

A twelfth aspect of this application provides a gateway device, applied to a process of accessing a network by a terminal device served by a resident node. The gateway device includes a memory, a transceiver, and at least one processor. The memory stores an instruction; the memory, the transceiver, and the at least one processor are connected to each other by using a line, and the transceiver is configured to perform message transmission and reception operations on the gateway device side in the method according to any one of the embodiments; and the at least one processor invokes the instruction, to perform a message processing operation or a control operation performed on the gateway device side in the method according to any one of the embodiments.

A thirteenth aspect of this application provides a management device, applied to a process of accessing a network by a terminal device served by the resident node. The management device includes a memory, a transceiver, and at least one processor. The memory stores an instruction; the memory, the transceiver, and the at least one processor are connected to each other by using a line, and the transceiver is configured to perform message transmission and reception operations on the management device side in the method according to any one of the embodiments; and the at least one processor invokes the instruction, to perform a message processing operation or a control operation performed on the management device side in the method according to any one of the embodiments.

In one embodiment, a function of the gateway device provided in the twelfth aspect of this application and a function of the management device provided in the thirteenth aspect of this application may alternatively be combined as a whole, to interact with another network element as a core network node in the foregoing method procedure. In this way, procedure interaction between the original gateway device and the original management device may be implemented inside the core network node, and procedure interaction between the original gateway device and/or the original management device and another network element may continue to be used as procedure interaction between the core network node and the another network element.

A fourteenth aspect of this application provides a resident node, applied to a process of accessing a network by the resident node. The resident node includes a memory, a transceiver, and at least one processor. The memory stores an instruction; the memory, the transceiver, and the at least one processor are connected to each other by using a line, and the transceiver is configured to perform message transmission and reception operations on the resident node side in the method according to any one of the embodiments; and the at least one processor invokes the instruction, to perform a message processing operation or a control operation performed on the resident node side in the method according to any one of the embodiments.

A fifteenth aspect of this application provides a gateway device, applied to a process of accessing a network by a resident node. The gateway device includes a memory, a transceiver, and at least one processor. The memory stores an instruction; the memory, the transceiver, and the at least one processor are connected to each other by using a line, and the transceiver is configured to perform message transmission and reception operations on the gateway device side in the method according to any one of the embodiments; and the at least one processor invokes the instruction, to perform a message processing operation or a control operation performed on the gateway device side in the method according to any one of the embodiments.

A sixteenth aspect of this application provides a management device, applied to a process of accessing a network by the resident node. The management device includes a memory, a transceiver, and at least one processor. The memory stores an instruction; the memory, the transceiver, and the at least one processor are connected to each other by using a line, and the transceiver is configured to perform message transmission and reception operations on the management device side in the method according to any one of the embodiments; and the at least one processor invokes the instruction, to perform a message processing operation or a control operation performed on the management device side in the method according to any one of the embodiments.

In one embodiment, a function of the gateway device provided in the fifteenth aspect of this application and a function of the management device provided in the sixteenth aspect of this application may alternatively be combined as a whole, to interact with another network element as a core network node in a related method procedure. In this way, procedure interaction between the original gateway device and the original management device may be implemented inside the core network node, and procedure interaction between the original gateway device and/or the original management device and another network element may continue to be used as procedure interaction between the core network node and the another network element.

A seventeenth aspect of this application provides a resident node, applied to a process of accessing a network by the resident node and a terminal device served by the resident node. The resident node includes a memory, a transceiver, and at least one processor. The memory stores an instruction; the memory, the transceiver, and the at least one processor are connected to each other by using a line, and the transceiver is configured to perform message transmission and reception operations on the resident node side in the method according to any one of the embodiments; and the at least one processor invokes the instruction, to perform a message processing operation or a control operation performed on the resident node side in the method according to any one of the embodiments.

An eighteenth aspect of this application provides a gateway device, applied to a process of accessing a network by a resident node and a terminal device served by the resident node. The gateway device includes a memory, a transceiver, and at least one processor. The memory stores an instruction; the memory, the transceiver, and the at least one processor are connected to each other by using a line, and the transceiver is configured to perform message transmission and reception operations on the gateway device side in the method according to any one of the one embodiments; and the at least one processor invokes the instruction, to perform a message processing operation or a control operation performed on the gateway device side in the method according to any one of the embodiments.

A nineteenth aspect of this application provides a management device, applied to a process of accessing a network by the resident node and a terminal device served by the resident node. The management device includes a memory, a transceiver, and at least one processor. The memory stores an instruction; the memory, the transceiver, and the at least one processor are connected to each other by using a line, and the transceiver is configured to perform message transmission and reception operations on the management device side in the method according to any one of the embodiments; and the at least one processor invokes the instruction, to perform a message processing operation or a control operation performed on the management device side in the method according to any one of the embodiments.

In one embodiment, a function of the gateway device provided in the eighteenth aspect of this application and a function of the management device provided in the nineteenth aspect of this application may alternatively be combined as a whole, to interact with another network element as a core network node in a related method procedure. In this way, procedure interaction between the original gateway device and the original management device may be implemented inside the core network node, and procedure interaction between the original gateway device and/or the original management device and another network element may continue to be used as procedure interaction between the core network node and the another network element.

A twentieth aspect of this application provides a terminal device, applied to a process of accessing a network by the terminal device, and including: a memory, a transceiver, and at least one processor, where the memory stores an instruction, the memory, the transceiver, and the at least one processor are connected to each other by using a line, and the transceiver is configured to perform message transmission and reception operations on the terminal device side in the method according to the tenth aspect.

A twenty-first aspect of this application provides a chip system, which may be applied to a resident node. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the resident node in the method according to any one of the embodiments.

A twenty-second aspect of this application provides a chip system, which may be applied to a gateway device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the gateway device in the method according to any one of the embodiments.

A twenty-third aspect of this application provides a chip system, which may be applied to a management device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the management device in the method according to any one of the one embodiments.

A twenty-fourth aspect of this application provides a chip system, which may be applied to a resident node. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the resident node in the method according to any embodiment.

A twenty-fifth aspect of this application provides a chip system, which may be applied to a gateway device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the gateway device in the method according to any one of the embodiments.

A twenty-sixth aspect of this application provides a chip system, which may be applied to a management device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the management device in the method according to any one of the embodiments.

A twenty-seventh aspect of this application provides a chip system, which may be applied to a resident node. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the resident node in the method according to any one of the embodiments.

A twenty-eighth aspect of this application provides a chip system, which may be applied to a gateway device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the gateway device in the method according to any one of the embodiments.

A twenty-ninth aspect of this application provides a chip system, which may be applied to a management device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the management device in the method according to any one of the embodiments.

A thirtieth aspect of this application provides a chip system, which may be applied to a terminal device. The chip system includes: at least one processor, a memory, and an interface circuit, where the memory, the transceiver, and the at least one processor are connected to each other by using a line, and the at least one memory stores an instruction; and the instruction is executed by the processor, to perform an operation of the terminal device in the method according to the tenth aspect.

Another aspect of this application provides a computer-readable storage medium, which may be applied to a resident node. The computer-readable storage medium stores an instruction. When the instruction is run on a computing device, an operation of the resident node in the method according to any one of the embodiments is performed.

Another aspect of this application provides a computer-readable storage medium, which may be applied to a gateway device. The computer-readable storage medium stores an instruction. When the instruction is run on a computing device, an operation of the gateway device in the method according to any one of the embodiments is performed.

Another aspect of this application provides a computer-readable storage medium, which may be applied to a management device. The computer-readable storage medium stores an instruction. When the instruction is run on a computing device, an operation of the management device in the method according to any one of the embodiments is performed.

Another aspect of this application provides a computer-readable storage medium, which may be applied to a resident node. The computer-readable storage medium stores an instruction. When the instruction is run on a computing device, an operation of the resident node in the method according to any one of the embodiments is performed.

Another aspect of this application provides a computer-readable storage medium, which may be applied to a gateway device. The computer-readable storage medium stores an instruction. When the instruction is run on a computing device, an operation of the gateway device in the method according to any one of the embodiments is performed.

Another aspect of this application provides a computer-readable storage medium, which may be applied to a management device. The computer-readable storage medium stores an instruction. When the instruction is run on a computing device, an operation of the management device in the method according to any one of the embodiments is performed.

Another aspect of this application provides a computer-readable storage medium, which may be applied to a resident node. The computer-readable storage medium stores an instruction. When the instruction is run on a computing device, an operation of the resident node in the method according to any one of the embodiments is performed.

Another aspect of this application provides a computer-readable storage medium, which may be applied to a gateway device. The computer-readable storage medium stores an instruction. When the instruction is run on a computing device, an operation of the gateway device in the method according to any one of the embodiments is performed.

Another aspect of this application provides a computer-readable storage medium, which may be applied to a management device. The computer-readable storage medium stores an instruction. When the instruction is run on a computing device, an operation of the management device in the method according to any one of the embodiments is performed.

Another aspect of this application provides a computer-readable storage medium, which may be applied to a terminal device. The computer-readable storage medium stores an instruction. When the instruction is run on a computing device, an operation of the terminal device in the method according to any one of the embodiments is performed.

Another aspect of this application provides a computer program product, which may be applied to a resident node. When the program is run on a computing device, an operation of the resident node in the method according to any one of the embodiments is performed.

Another aspect of this application provides a computer program product, which may be applied to a gateway device. When the program is run on a computing device, an operation of the gateway device in the method according to any one of the embodiments is performed.

Another aspect of this application provides a computer program product, which may be applied to a management device. When the program is run on a computing device, an operation of the management device in the method according to any one of the embodiments is performed.

Another aspect of this application provides a computer program product, which may be applied to a resident node. When the program is run on a computing device, an operation of the resident node in the method according to any one of the embodiments is performed.

Another aspect of this application provides a computer program product, which may be applied to a gateway device. When the program is run on a computing device, an operation of the gateway device in the method according to any one of the embodiments is performed.

Another aspect of this application provides a computer program product, which may be applied to a management device. When the program is run on a computing device, an operation of the management device in the method according to any one of the embodiments is performed.

Another aspect of this application provides a computer program product, which may be applied to a resident node. When the program is run on a computing device, an operation of the resident node in the method according to any one of the embodiments is performed.

Another aspect of this application provides a computer program product, which may be applied to a gateway device. When the program is run on a computing device, an operation of the gateway device in the method according to any one of the embodiments is performed.

Another aspect of this application provides a computer program product, which may be applied to a management device. When the program is run on a computing device, an operation of the management device in the method according to any one of the embodiments is performed.

Another aspect of this application provides a computer program product, which may be applied to a terminal device. When the program is run on a computing device, an operation of the terminal device in the method according to any one of the embodiments is performed.

According to the solutions provided in the embodiments of this application, the process of accessing the network by the terminal device may be completed by fully using the existing network, for example, the process of accessing the network by the terminal device served by the CPE may be completed by using the mobile network, thereby avoiding laying of the dedicated network channels, and improving the mobile network utilization. The embodiments of this application further provide the corresponding device and system.

BRIEF DESCRIPTION OF DRAWINGS

FIG. 7A, FIG. 7B, and FIG. 7C are a schematic diagram of another embodiment of a network access method for a device according to the embodiments of this application;

FIG. 10A and FIG. 10B are a schematic diagram of another embodiment of a network access method for a device according to the embodiments of this application;

FIG. 11A and FIG. 11B are a schematic diagram of another embodiment of a network access method for a device according to the embodiments of this application;

FIG. 16A and FIG. 16B are a schematic diagram of another embodiment of a access network method for a device according to the embodiments of this application;

DESCRIPTION OF EMBODIMENTS

Figure 1:
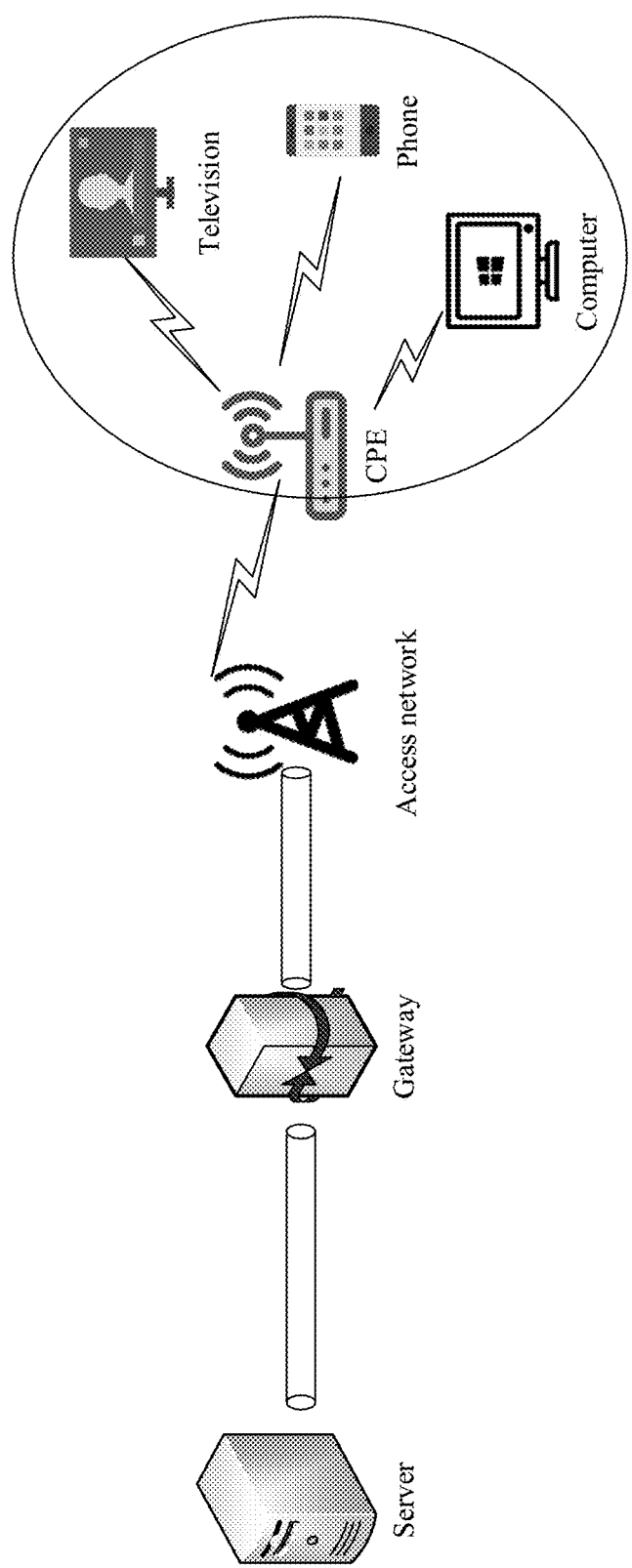
FIG. 1 is a schematic diagram of a scenario of WTTx.

The following describes embodiments of this application with reference to the accompanying drawings. Apparently, the described embodiments are merely some rather than all of the embodiments of this application. A person of ordinary skill in the art may learn that as a new technology emerges, the technical solutions provided in the embodiments of this application are also applicable to a similar technical problem.

The embodiments of this application provide a network access method, to complete a process of accessing a network by a terminal device by fully using an existing network, for example, a process of accessing, by using a mobile network, a network by a terminal device served by a CPE, thereby avoiding laying of dedicated network channels, and improving mobile network utilization. The embodiments of this application further provide a corresponding device and system. Detailed descriptions are provided below.

Terms "uplink" and "downlink" in this application are used to describe data/information transmission directions in some scenarios. For example, an "uplink" direction is a direction in which data/information is transmitted from a terminal device to a network side, and a "downlink" direction is a direction in which data/information is transmitted from a network side device to the terminal device. "Uplink" and "downlink" are used to describe only directions. Neither a device from which data/information transmission starts nor a device at which data/information transmission stops is limited.

The term "and/or" in this application may describe only an association relationship for describing associated objects and represent that three relationships may exist. For example, A and/or B may represent the following three cases: Only A exists, both A and B exist, and only B exists. In addition, the character "/" in this specification generally indicates an "or" relationship between the associated objects.

Names are assigned to various types of objects such as messages/information/devices/network elements/systems/apparatuses/actions/operations/procedures/concepts that may be used in this application. However, these specific names do not constitute a limitation to the related objects. The assigned names may vary with a factor such as a scenario, a context, or a usage habit. An understanding of a technical meaning of a related object should be mainly determined from a function and a technical effect that are embodied/performed in a technical solution.

In the specification, claims, and accompanying drawings of this application, the terms "first", "second", and so on are intended to distinguish between similar objects but do not necessarily indicate a specific order or sequence. It should be understood that the data termed in such a way is interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or modules is not necessarily limited to those expressly listed operations or modules, but may include other operations or modules not expressly listed or inherent to such a process, method, system, product, or device. Names or numbers of operations in this application do not mean that the operations in the method procedure need to be performed in a chronological/logical order indicated by the names or numbers. An execution sequence of the operations in the procedure that have been named or numbered may be changed based on technical objectives to be implemented, provided that a same or similar technical effect can be achieved. The module division in this application is logical division and may be another division in actual implementation. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms. This is not limited in this application. In addition, modules or sub-modules described as separate components may be or may not be physically separated, or may be or may not be physical modules, or may be distributed into a plurality of circuit modules. Objectives of the solutions of this application may be achieved by selecting some or all of the modules based on actual requirements.

The term "authorization" in the embodiments of this application means identity authentication and/or authorization of a related operation.

There are a plurality of English abbreviations in the embodiments of this application, and therefore Chinese full names and English full names corresponding to the English abbreviations in the embodiments of this application are first described in the following table.

| English abbreviation | English full name | Chinese full name |
|---|---|---|
| 4G | The fourth generation mobile communication | 第四代移动通信 |
| 5G | The fifth generation mobile communication | 第五代移动通信 |
| ADSL | asymmetric digital subscriber line | 非对称数字用户环路 |
| FTTx | fiber to the x | 光纤接入 |
| WTTx | wireless to the x | 无线接入 |
| CPE | customer premise equipment | 用户驻地设备 |
| RAN | radio access network | 无线接入网络 |
| STB | set-top box | 机顶盒 |
| IPTV | internet protocol television | 互联网电视 |
| IP | internet protocol | 互联网协议 |
| NAS | non-access stratum | 非接入层 |
| MME | mobile management entity | 移动管理实体 |
| HSS | home subscriber server | 归属签约用户服务器 |
| PGW | PDN gateway | 分组数据网关 |
| PDN | packet data network | 分组数据网络 |
| SGW | serving gateway | 服务网关 |
| PPPoX | point to point protocol over X | x 网络上承载点对点协议 |
| IPoX | internet protocol over X | x 网络上承载IP 协议 |
| BRAS | broadband remote access router | 宽带远程接入路由器 |
| PPPoE | point to point protocol over ethernet | 以太网承载 PPP 协议 |
| AAA server | Authentication, Authorization and Accounting server | 认证授权计费服务器 |
| DHCP | dynamic host configuration protocol | 动态主机配置协议 |
| EAP | extensible authentication protocol | 扩展认证协议 |
| OTP | one time passwords | 一次性口令 |
| UPF | user plane function | 用户平面功能实体 |
| AMF | access and mobility management function | 接入和移动管理功能实体 |
| SMF | session management function | 会话管理功能实体 |
| PC | personal computer | 个人计算机 |
| GTP | GPRS Tunnelling Protocol | GPRS 隧道协议 |
| GPRS | general packet radio service | 通用分组无线业务 |
| BNG | broadband network gateway | 宽带网络网关 |
| L2TP | layer 2 tunnel protocol | 二层隧道协议 |
| PAP | password authentication protocol | 密码验证协议 |
| CHAP | challenge handshake authentication protocol | 挑战握手 认证协议 |
| APN | access point name | 接入点名称 |
| DNN | data network name | 数据网络名称 |
| NCP | network control protocol | 网络控制协议 |
| EPS | evolved packet system | 演进型分组系统 |
| eNB | evolved nodeB | 演进基站 |
| TEID | tunnel endpoint identity | 隧道端点标识 |
| MAC | media access control | 媒体接入控制 |
| LCP | link control protocol | 链路控制协议 |
| PAP | password authentication protocol | 密码身份验证协议 |
| CHAP | challenge handshake authentication protocol | 挑战握手 认证协议 |
| PCO | protocol configuration option | 协议配置选项 |
| DN nodes | data network nodes | 数据网络节点 |
| LAN | local area network | 局域网 |
| WLAN | Wireless local area networks | 无线局域网 |
| RLC | radio link control | 无线链路控制 |
| SDAP | Service Data Adaptation Protocol | 服务数据适配协议 |
| ECGI | E-UTRAN Cell Global Identifier | 演进通用陆地无线接入网络小区标识 |
| TAI | Tracking Area Identity | 跟踪区域标识 |
| RADUIS | Remote Authentication Dial In User Service | 远端用户接入认证服务 |
| LGW | Local Gateway | 本地网关 |

A resident node in the embodiments of this application may be a CPE. An external network in the embodiments of this application may be named relative to a mobile network. The external network is a network including other network elements or network devices than network elements/network devices of the mobile network (including an access network and a core network). The external network in the embodiments of this application may be a fixed network. In this application, a terminal device served by the CPE is a terminal device that is connected to the CPE and that accesses a network by using the CPE.

For ease of reading and understanding, before the embodiments of this application are described, a structure of the embodiments of this application is described below as a whole.

A part 1 is a solution in which a terminal device served by a CPE completes network access in an external network by using a mobile network. The solution includes a solution 1 and a solution 2, the solution 1 further includes a solution 1-1 and a solution 1-2, and the solution 2 further includes a solution 2-1 and a solution 2-2.

The solution 1 is a solution in which the terminal device served by the CPE completes network access in the external network by using a 4G mobile network.

The solution 1-1 is a solution in which the terminal device served by the CPE completes network access in the external network by using a user plane of the 4G mobile network.

The solution 1-2 is a solution in which the terminal device served by the CPE completes network access in the external network by using a control plane of the 4G mobile network.

The solution 2 is a solution in which the terminal device served by the CPE completes network access in the external network by using a 5G mobile network.

The solution 2-1 is a solution in which the terminal device served by the CPE completes network access in the external network by using a user plane of the 5G mobile network.

The solution 2-2 is a solution in which the terminal device served by the CPE completes network access in the external network by using a control plane of the 5G mobile network.

A part 2 is a solution in which a CPE or a terminal device served by the CPE completes network access in an external network by using a mobile network. The solution includes a solution 1 and a solution 2.

The solution 1 is a solution in which the CPE or the terminal device served by the CPE completes network access in the external network by using a 4G mobile network.

The solution 2 is a solution in which the CPE or the terminal device served by the CPE completes network access in the external network by using a 5G mobile network.

A part 3 is a solution in which a terminal device served by a CPE and the CPE access a network in a converged network of a fixed network and a mobile network.

A part 4 is another solution in which a terminal device served by a CPE and the CPE access a network in a converged network of a fixed network and a mobile network.

The fixed network may also be referred to as a wired network, and the mobile network may also be referred to as a wireless network.

In the solutions of the part 1 and part 2, differences between the 4G and the 5G include: Some functions of a UPF and an SMF in the 5G overlap with some functions of a mobile gateway (for example, a PGW) in the 4G. Some functions of an AMF in the 5G overlap with some functions of an MME in the 4G. Therefore, to clearly express all devices in a 4G scenario and a 5G scenario, the SMF, the UPF, the S/P-GW (the SGW or the PGW), an LGW, and the like may be collectively referred to as a gateway device, the S/P-GW or the LGW may be referred to as a mobile gateway, and the MME and the AMF are collectively referred to as a management device. However, in an embodiment of the 4G or 5G scenario, a corresponding specific network element may be used for representation. For example, the gateway device is represented by using the PGW, the SMF, or the UPF, and the management device is represented by using the MME or the AMF.

It should be noted that the foregoing solutions of the part 1 to the part 4 are described by using the mobile network and the fixed network (the external network) as an example. Actually, it may be understood that, provided that two or more networks are interconnected or connected to implement network access of the terminal device or the CPE, or two or more networks are converged to implement network access of the terminal device or the CPE, all the solutions fall within the scope included in the embodiments of this application.

The terminal device in the embodiments of this application includes a fixed terminal device such as an STB, a personal computer (PC), an IP telephone, or a fax machine, and a mobile terminal device such as a mobile phone and a tablet computer. The served terminal device may be a terminal device that accesses a network or performs a service by using the CPE. That is, the CPE is responsible for all network connections of these terminal devices.

The following describes the solutions in the foregoing described parts.

Figure 2A:
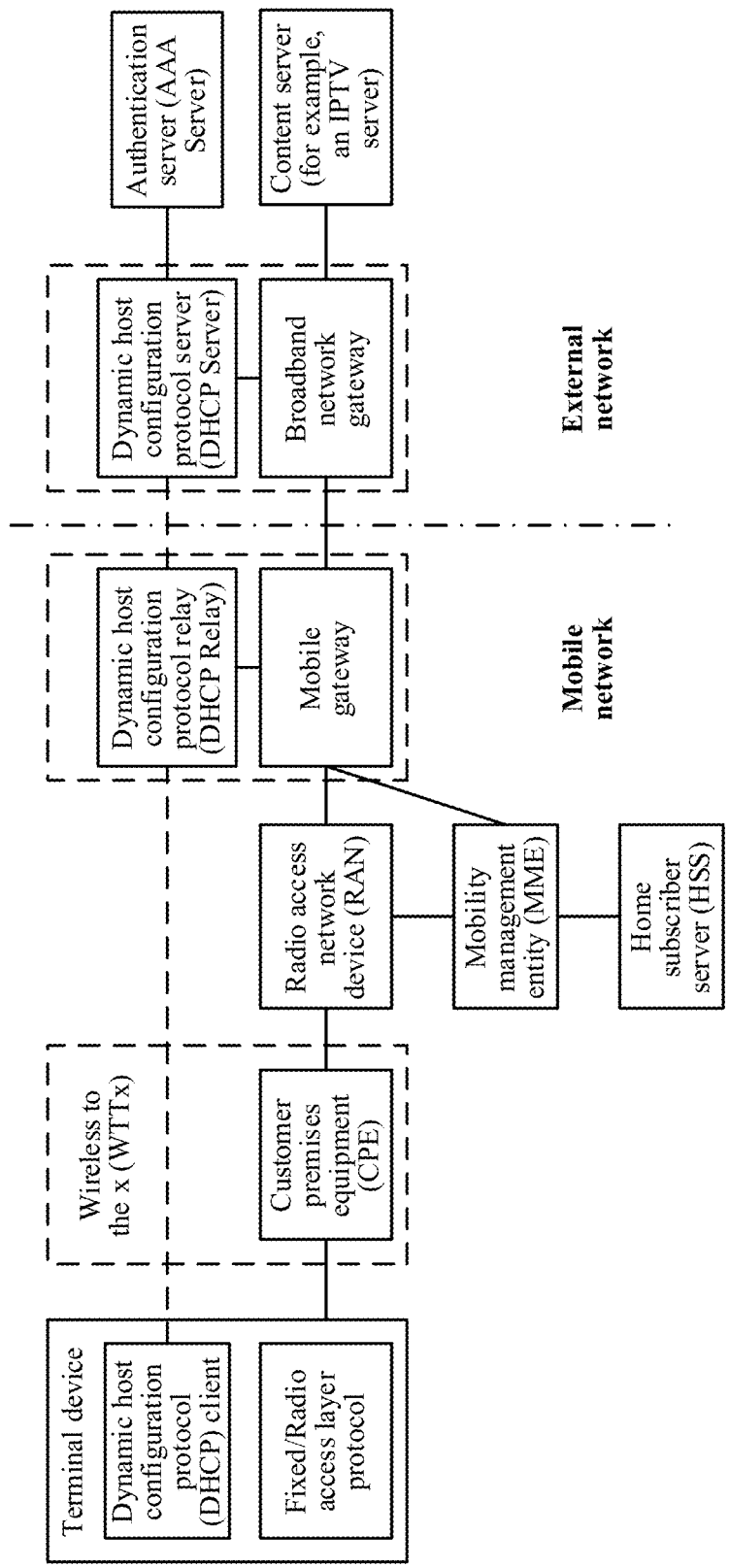
FIG. 2A is a schematic diagram of a network architecture according to an embodiment of this application.

FIG. 2A is a schematic diagram of a network architecture including a mobile network and an external network.

The network architecture shown in FIG. 2A is described by using an architecture in which a mobile network is a 4G network as an example. The network architecture includes four network access lines shown in FIG. 2B to FIG. 2E for a terminal device.

Figure 2B:
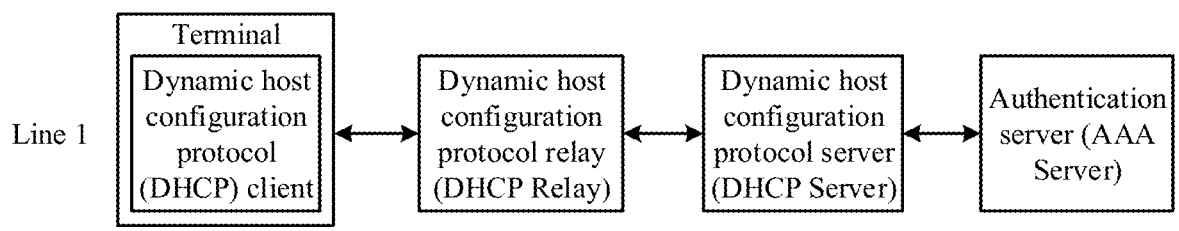
FIG. 2B is a schematic diagram of a network access line of a terminal device.

A line 1 shown in FIG. 2B is a network access route of a terminal in an IPoX manner. In the line 1, the terminal sends a DHCP request packet (for example, a DHCP discover or a DHCP request) to a DHCP server by using a DHCP relay. The DHCP relay may add additional authorization information to an extended field of the DHCP packet. The DHCP server forwards an authentication request for the terminal to an authentication server (AAA Server), and the authentication server performs authorization on the terminal device that sends the DHCP request. In FIG. 2B, a binding authorization mode of DHCP network access is used as an example for description. Actually, the network may authorize the terminal in a plurality of manners, and details are not described herein.

Figure 2C:
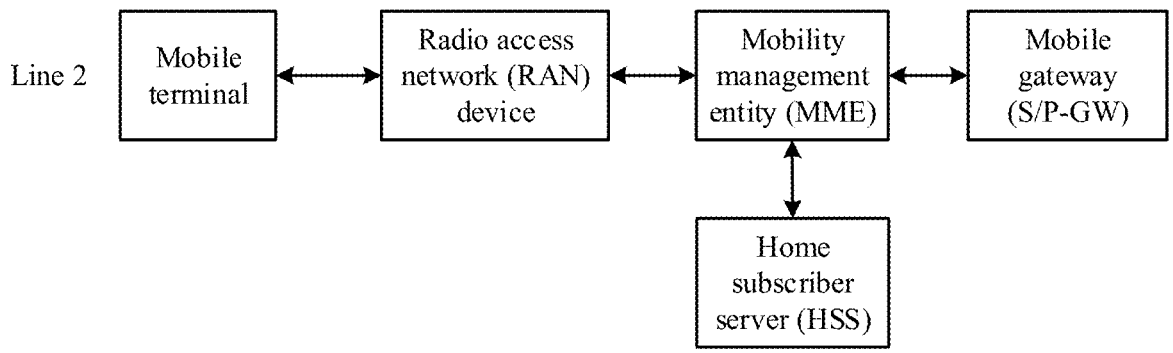
FIG. 2C is a schematic diagram of another network access line of a terminal device.

A line 2 shown in FIG. 2C is a network access route of a mobile terminal in a mobile network. In the line 2, the mobile terminal interworks with an MME and an HSS to complete an authorization process.

Figure 2D:
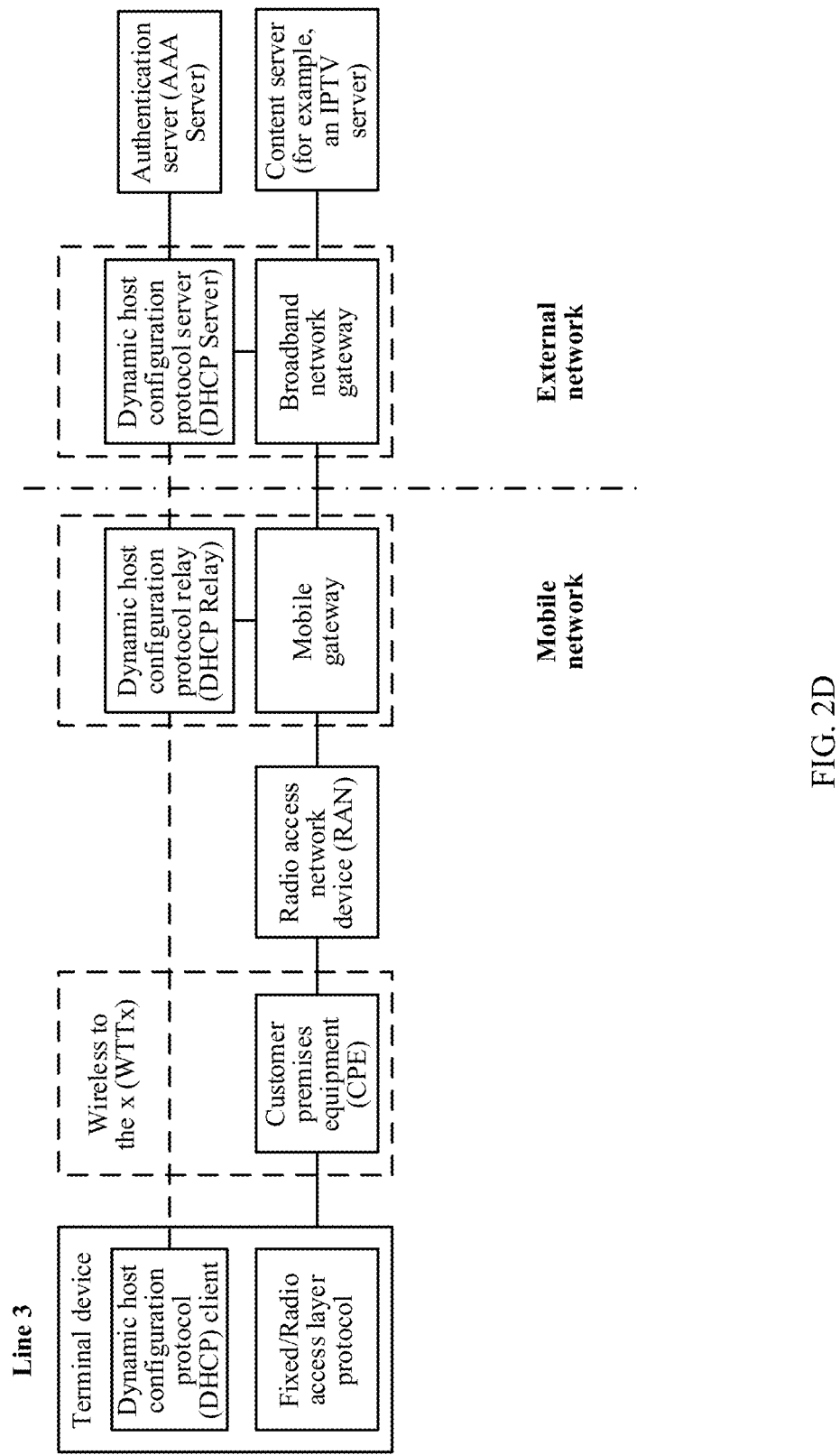
FIG. 2D is a schematic diagram of another network access line of a terminal device according to an embodiment of this application.

A line 3 shown in FIG. 2D shows a process in which a terminal device served by a CPE completes network access in the external network by using a user plane of the mobile network.

Figure 2E:
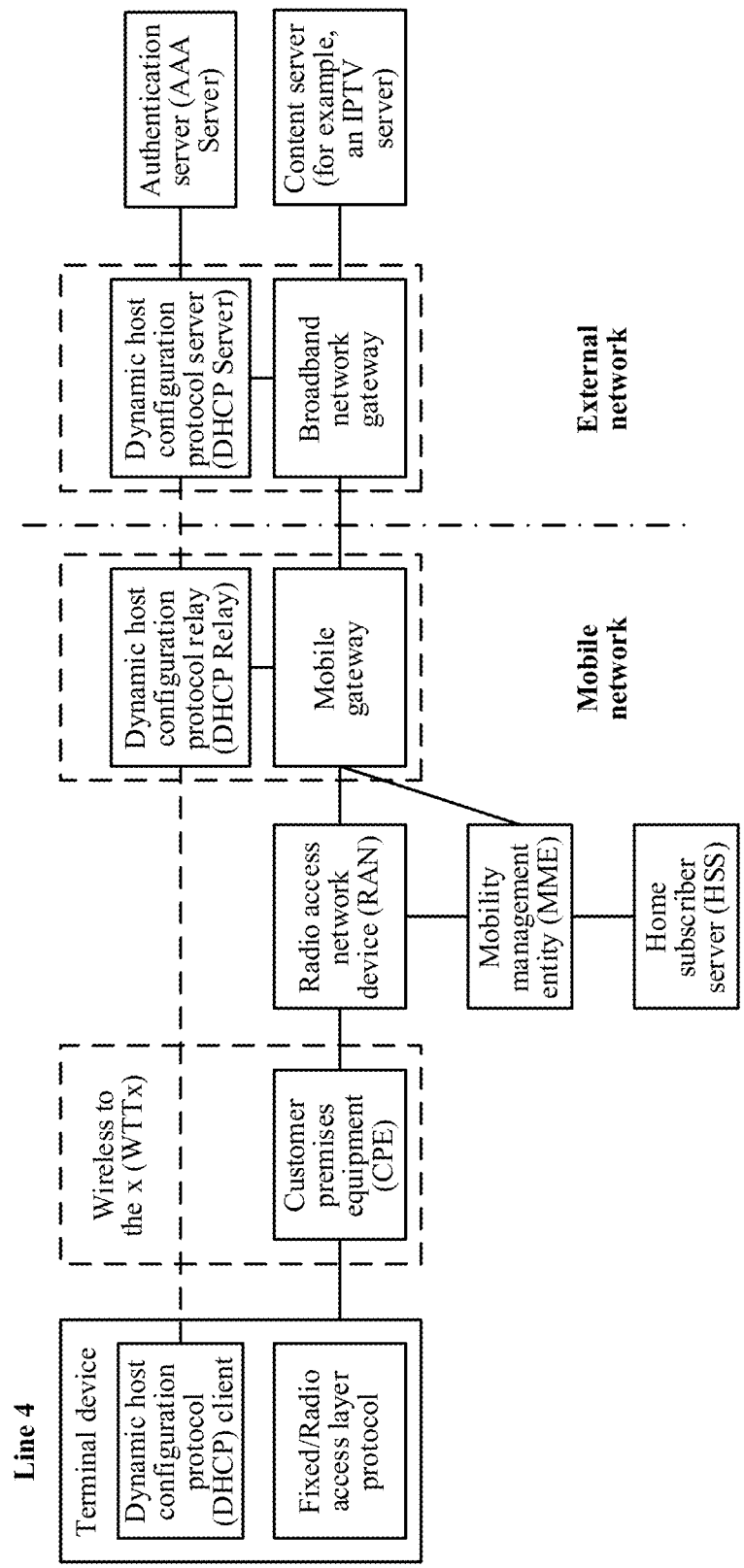
FIG. 2E is a schematic diagram of another network access line of a terminal device according to an embodiment of this application.

A line 4 shown in FIG. 2E shows a process in which a terminal device served by a CPE completes network access in the external network by using a control plane of the mobile network.

The line 3 shown in FIG. 2D and the line 4 shown in FIG. 2E show the processes in which the terminal device served by the CPE completes network access in the external network by using the mobile network. Actually, a process in which the CPE completes network access in the external network by using the mobile network may also be understood with reference to FIG. 2D and FIG. 2E without considering the terminal device served by the CPE. These are not shown one by one in the embodiments of this application.

The solution 1-1 in the part 1 in the embodiments of this application, in one embodiment, the solution in which a terminal device served by a CPE completes network access in an external network by using a user plane of a 4G mobile network, is described below with reference to FIG. 3A and FIG. 3B and the line 3 shown in FIG. 2D.

Figure 3A:
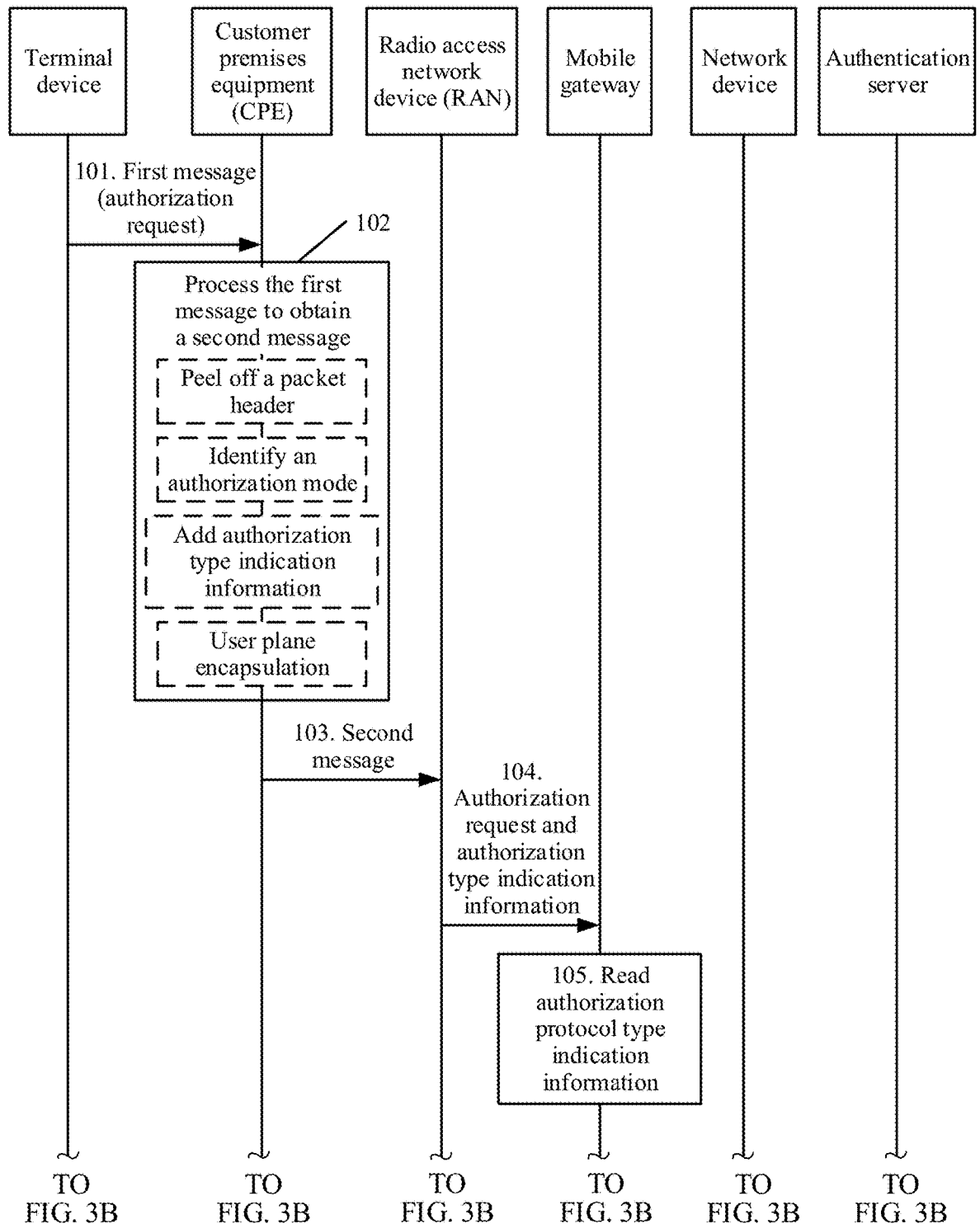
FIG. 3A and FIG. 3B are a schematic diagram of an embodiment of a network access method for a device according to the embodiments of this application.
Figure 3B:
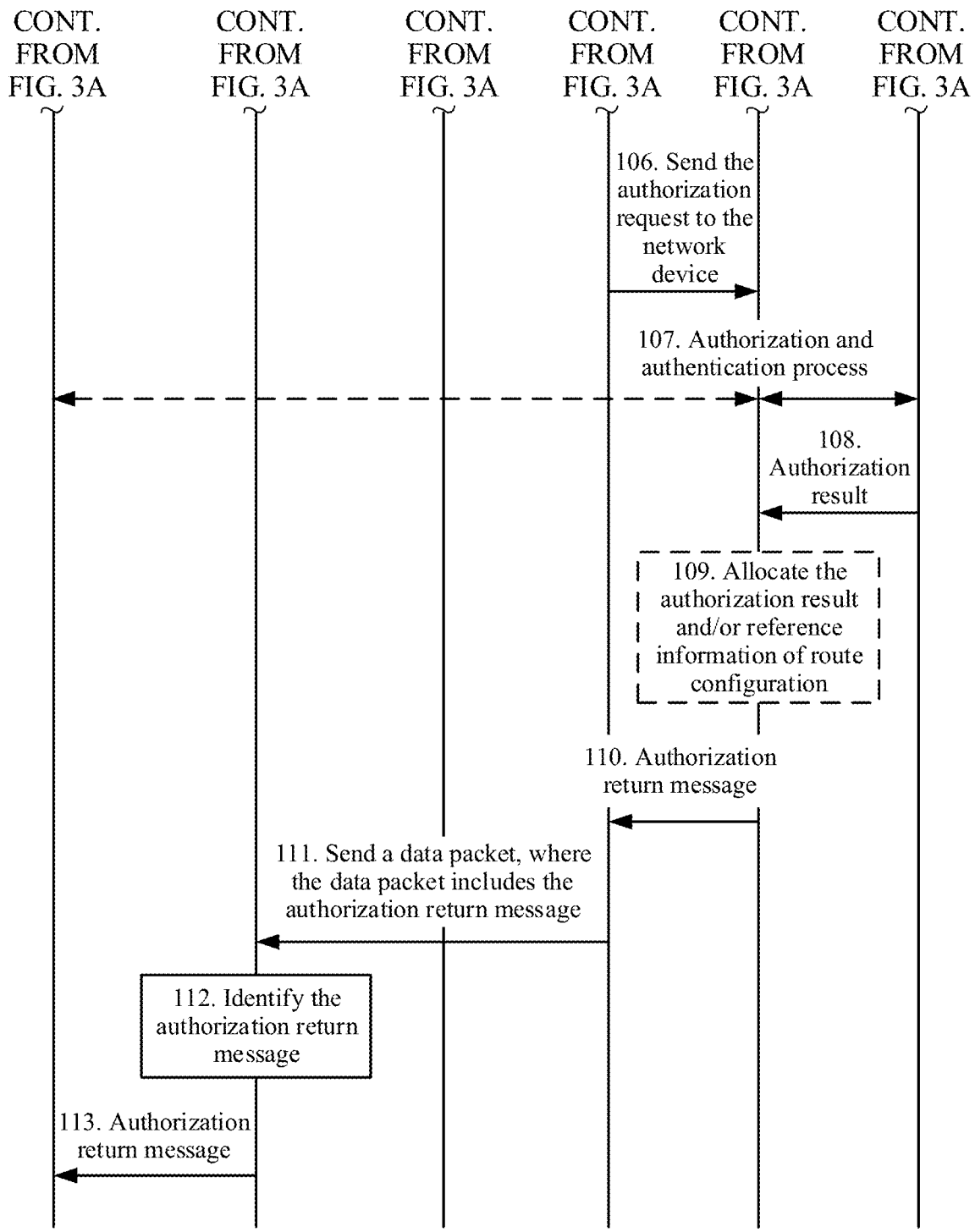

As shown in FIG. 3A and FIG. 3B, an embodiment of a network access method for a device provided in an embodiment of this application includes the following operations.

101. A CPE receives a first message sent by a terminal device, where the first message includes an authorization request.

The terminal device may be understood as a terminal device served by the CPE. The served terminal device is a terminal device connected to the CPE. The terminal device accesses a network by using the CPE. The CPE receives the first message sent by the served terminal device, that is, receives the first message sent by the terminal device connected to the CPE.

The authorization request may be an access request, a connection request, an authorization request, an address allocation request, or another type of information that indicates a network access intention, sent by the served terminal device to the network when the terminal device accesses the network. For brief description, the foregoing requests are collectively referred to as an authorization request.

In one embodiment, the CPE may receive only an authorization request. The authorization request does not need to be carried by another message. For example, the authorization request does not need to be carried by the first message.

102. The CPE processes the first message to obtain a second message.

The second message is used by a gateway device to identify the authorization request and/or an authorization mode for the terminal device to access the network, the authorization mode is used to instruct the gateway device to send the authorization request to a network device, and the authorization request is used to instruct the network device to perform authorization on the terminal device.

In a possible embodiment, the second message includes the authorization request and first indication information. The first indication information may be authorization type indication information. The authorization type indication information is used to indicate the authorization mode for the terminal device to access the network, and the authorization type indication information may include an identifier indication of the authorization mode and/or an identifier indication of an authorization protocol.

In this embodiment of this application, the first indication information, second indication information, and indication information are actually information having an indication function. The first and the second are sequence number identifiers indicating that indication information appears twice in a scenario, and should not be construed as special limitations having a special meaning.

Alternatively, the second message includes the authorization request, and is transmitted to the gateway device through an authorization channel corresponding to the authorization mode. The authorization channel is used to identify the corresponding authentication mode. The authorization channel may be a channel used to transmit data and/or signaling, and is not limited to transmitting only an authorization message.

The authorization channel may be a specific channel established between the CPE and the gateway device. The specific channel may be a bearer or a transmission tunnel, or may be an APN/a DNN, a PDN connection, a PDU session, a network slice, or the like, provided that the specific channel can correspond to the authorization mode. A specific form of the specific channel is not limited in this embodiment of this application. When the specific channel is established, a used authorization mode or authorization protocol is determined. In this case, when the authorization request of the terminal device or the CPE is transmitted, the authorization type indication information may not need to be transmitted, and the authorization request or an authentication request may be transmitted on a corresponding specific channel. The gateway device may determine the corresponding authorization mode based on the specific channel of the authorization request. Authorization result information may also be returned to the terminal device through the specific channel. The authorization result information may be carried in an authorization return message and returned to the terminal device through the specific channel. Certainly, the authorization result information is not limited to being returned through the specific channel, and the authorization result information may alternatively be returned in another manner.

A process in which the terminal device accesses the network in this embodiment of this application is described below by using an example in which the second message includes the authorization request and the authorization type indication information. Actually, when the specific channel is used, data between the CPE and the gateway device is transmitted through the specific channel, and the second message does not need to include the authorization type indication information. Other operations and processes of the network access process by using certain channel are basically the same as those of a network access process in which the authorization type indication information is included. A process of network access through the specific channel may be understood with reference to this manner.

In a process of operation 102, an L1/L2 packet header of a communication protocol between the CPE and the terminal device may be peeled off, and the authorization mode and/or an authorization protocol type that are/is used by the terminal device may be identified. The authorization mode may include but is not limited to, for example, PPP, PPPoX, IPoX, and EAP. The authorization protocol type may include but is not limited to, for example, protocols involved in PPPoX authorization, such as LCP, PAP, and CHAP, or a DHCP protocol (DHCPv4 or DHCPv6) involved in the IPOX, or EAP-AKA, EAP-AKA', EAP-SIM, EAP-TLS, and the like in EAP authorization. After identifying the authorization mode and/or the authorization protocol type corresponding to the authorization request of the served terminal device, the CPE encapsulates the authorization type indication information together with message content (content in which the L1/L2 packet header is peeled off or a complete request packet on which peeling processing is not performed) of the authorization request in the first message or with information such as a plurality of key parameters included in the authorization message, to obtain the second message.

In one embodiment, if the first message is the authorization request, the authorization type indication information may be carried in the authorization request, to obtain an authorization request including the authorization type indication information. The authorization request including the authorization type indication information may be considered as the second message.

When the authorization type indication information is added to the first message or the authorization request, the authorization type indication information may be added to a data packet (or a packet header) of a layer above an air interface access layer, for example, an IP layer, or may be added to a data packet (or a packet header) of an air interface access layer, for example, an SDAP/PDCP/RLC/MAC/PHY layer, or may be added to a data packet (or a packet header) of a newly added (sub-)layer. A specific location for adding is not limited in this embodiment of this application.

103. The CPE sends the second message to a radio access network RAN device.

104. The RAN device sends a data packet that includes the authorization request and the authorization type indication information to a mobile gateway.

After receiving the second message, the RAN device may decapsulate air interface access layer encapsulation, and then perform protocol encapsulation (for example, GTP tunnel encapsulation) of an S1 interface, to obtain a third message. Then, the RAN device sends the third message that includes the authorization request and the authorization type indication information to the mobile gateway through a GTP (GTP-U) tunnel of a user plane. The third message may be a data packet.

If the data packet (or the packet header) of the air interface access layer such as the SDAP/PDCP/RLC/MAC/PHY layer or of the newly added (sub-)layer includes the authorization type indication information added by the CPE, the RAN device may add the authorization type indication information to a packet header (for example, a GTP/UDP/IP packet header) related to the protocol encapsulation of the S1 interface.

105. The mobile gateway reads the authorization request and the authorization type indication information.

For the data packet that is sent by the RAN device and that includes the authorization request and the authorization type indication information, the mobile gateway may read the authorization type indication information from the packet header related to the protocol encapsulation of the S1 interface, and obtain the authorization request from the data packet after the protocol encapsulation of the S1 interface is decapsulated. Alternatively, after decapsulating the protocol encapsulation of the S1 interface, the mobile gateway may obtain the authorization type indication information and the authorization request from the data packet (or the packet header) of the layer above the air interface access layer, for example, the IP layer. Alternatively, the mobile gateway may determine the corresponding authorization mode and/or authorization protocol based on the transmission channel (for example, the specific bearer) of the data packet, and obtain the authorization request from the data packet after decapsulating the protocol encapsulation of the S1 interface.

106. The mobile gateway sends the authorization request to a network device.

Referring to the authorization type indication information, the mobile gateway sends, in the authorization mode or in a mode required by the authorization protocol, the authorization request to the corresponding network device that is in the network and that is related to authorization and address allocation. The corresponding network device includes but is not limited to a BNG, a DHCP server, an AAA server, or the like.

For example, if the authorization mode is the PPP or PPPoX, the BNG serves as an endpoint of the PPP. The mobile gateway may establish a PPP connection to the BNG over an L2TP tunnel, and allocate a PPP session ID.

If the authorization mode is the IPoX, the mobile gateway may serve as a DHCP relay or a DHCP proxy, and send a DHCP message including the authorization request to the BNG and/or the DHCP server.

Before forwarding the authorization request, the mobile gateway may add additional authorization information to an extended option field of the authorization request. For example, the additional authorization information includes at least one of an identity (for example, an IMSI) indicating the CPE, information (for example, an ECGI and/or an eNB ID and/or a TAI) indicating a location of the terminal device and/or a location of the CPE, and information about a channel used to transmit the authorization request. The information about a channel used to transmit the authorization request includes at least one of the following information: an identifier of a tunnel for transmitting the authorization request, an identifier of a bearer for transmitting the authorization request, an identifier (for example, a PDU session ID) of a session for transmitting the authorization request, and the like.

In one embodiment, the CPE may alternatively add the additional authorization information to the second message before sending the second message to the RAN device.

107. The network device performs authorization and authentication on the terminal device based on the authorization mode used by the terminal device.

For example, if a PPP authorization mode is used, after an authentication protocol is negotiated at an LCP stage, the network device terminating a PPP session, for example, the BNG, performs authorization on the terminal device by using the password authentication protocol (PAP for short) or the challenge handshake authentication protocol (CHAP for short), the BNG sends, by using the RADUIS or diameter protocol, the authorization request to the authentication server, that is, the AAA server, for authorization.

If an IPoX authorization mode is used, the network device such as the BNG routes a DHCP discover request message to the DHCP server, and the DHCP server extracts information from a request message, where the information includes an authorization-related extended field (for example, device information, a user name, and a password) added by the terminal and an authorization-related extended option field added by an intermediate node, constructs an authentication packet, and sends, by using the RADIUS protocol or the diameter protocol, the authentication packet to the AAA server for authorization.

If an EAP authorization mode is used, an authorization request of an EAP client (in one embodiment, a terminal device that requests authentication and authorization) is forwarded to an EAP device end (EAP authenticator) such as the BNG. The EAP device end may initiate EAP authentication on the client, and an EAP authentication packet is exchanged between the EAP device end and the EAP client. In addition, the EAP device end transmits, in an EAP relay mode or an EAP termination mode, an authorization-related packet with the authentication server such as the AAA server by using the RADIUS protocol or the diameter protocol.

108. The network device receives authorization result information returned by an authentication server.

The authorization result information may include indication information indicating whether the authorization succeeds.

The authorization result information may be carried in an authorization return message. The authorization return message in this embodiment of this application is not a specific message. The authorization return message may be a plurality of types of messages that can carry the authorization result information. Any message that can carry the authorization result information may serve as the authorization return message.

For example, when the IPoX authorization mode is used, if the authentication fails, the AAA server sends a reject packet to the DHCP server, and the DHCP server returns a DHCP NAK packet to the BNG; if the authentication succeeds, the AAA server sends authentication success information to the DHCP server, and then the DHCP server returns a DHCP offer packet to the BNG.

109. The network device may add, to the authorization return message, an IP address allocated to the terminal device and/or reference information of route configuration.

The reference information of the route configuration may be reference information used for uplink route configuration of the CPE.

The network device in operation 109 includes, but is not limited to, a gateway/router node such as a BNG, or a node having an address allocation function, for example, a DHCP server. The network device sends, based on the authorization mode used by the terminal device, the authorization return message to the terminal device by using a wireless gateway. The authorization return message sent by the network device to the mobile gateway may include an authorization result and/or an address allocation result, and may further include reference information used for route configuration of the CPE.

The reference information used for route configuration of the CPE may include a part or all of the following information: an IP address/network segment address/address prefix of a common server related to a service (for example, an IPTV service), corresponding network mask information (for example, a mask or a mask length), a multicast address used to provide a content (if a multicast type service is included), and a corresponding next-hop node. The IPTV service is used as an example. The common server includes but is not limited to a content server, a fast zapping server, a DHCP server, a DNS server, and the like. The multicast address providing content may include a multicast address of all channels. The corresponding next-hop node may be an IP address of a gateway or a router.

For example, the DHCP server may add, to the DHCP offer packet and/or a DHCP Ack packet, an IP address pre-allocated or allocated to the terminal device, and may further add, in an extended option field (for example, an option 121), the reference information used for route configuration of the CPE.

110. The mobile gateway receives the authorization return message sent by the network device.

The authorization return message carries the authorization result information.

If the authorization return message includes the reference information used for route configuration of the CPE, the mobile gateway may directly perform user plane encapsulation on the authorization return message.

Alternatively, the mobile gateway may generate route configuration information based on the reference information used for route configuration of the CPE. The route configuration information may be the configuration information used for uplink route configuration of the CPE. The route configuration information may include a part or all of the following items: the IP address/network segment address/address prefix of the common server related to the service, the network mask information (for example, the mask or the mask length), the multicast address providing content, a next-hop node address, and an identifier (for example, an APN/a DNN) of a corresponding access point or an identifier of a network slice or an identifier (for example, a PDN connection identifier or a PDU session identifier or a bearer identifier) of a connection channel or an identifier of the gateway device or port information of the CPE device and the like that should be selected by the CPE.

The mobile gateway may send the route configuration information to the CPE in the following manners: The mobile gateway adds the route configuration information to the authorization return message; or the mobile gateway replaces the reference information used for route configuration of the CPE in the authorization return message with the route configuration information; or the mobile gateway sends the route configuration information to an MME, and the MME adds the route configuration information to a NAS message and sends the NAS message to the CPE.

The mobile gateway performs user plane encapsulation on the authorization return message.

The mobile gateway may alternatively not determine the route configuration information based on the reference information of the route configuration. Instead, the mobile gateway continues to send the reference information of the route configuration, and the CPE may determine the route configuration information by itself based on the reference information of the route configuration.

In one embodiment, the reference information of the route configuration and the route configuration information may be collectively referred to as route configuration information. In one embodiment, the route configuration information includes reference information that is allocated by the network device and that is used for route configuration of the resident node, or configuration information that is determined by the gateway device based on the reference information of the route configuration and that is used for route configuration of the resident node.

111. The mobile gateway sends, to the CPE over a user plane bearer with the CPE, a user plane data packet into which the authorization return message is encapsulated.

112. The CPE receives the user plane data packet into which the authorization return message is encapsulated, and decapsulates the user plane data packet to extract the authorization return message.

The CPE may identify the authorization return message to identify a terminal device to which the authorization return message should be sent.

The CPE may configure a route based on the reference information of the route configuration or the route configuration information included in the authorization return message or based on the route configuration information carried in the NAS message received from the MME.

113. The CPE sends the authorization return message to the terminal device that sends the authorization request.

Similarly, the terminal device subsequently continues to exchange another message with the network device based on a requirement of the authorization mode. For example, a DHCP request message and a corresponding DHCP ACK message involved in the IPoX authorization mode are also transmitted over the user plane bearer between the CPE and the mobile gateway, and are routed among the mobile gateway, the BNG, and a selected DHCP server until the process of accessing the network by the terminal device is completed.

It can be learned from content of the embodiment corresponding to FIG. 3A and FIG. 3B that, in this embodiment of this application, access of the terminal device to the network is completed by fully using a user plane of an existing 4G network, thereby avoiding laying of dedicated network channels, and improving mobile network utilization.

The foregoing is a general description of a possible authorization mode for the terminal device. The following uses an example in which the terminal device is an STB and the authorization mode is the IPoX (DHCP+authentication), to describe a process in which the STB completes network access by using a user plane of a 4G mobile network.

Figure 4A:
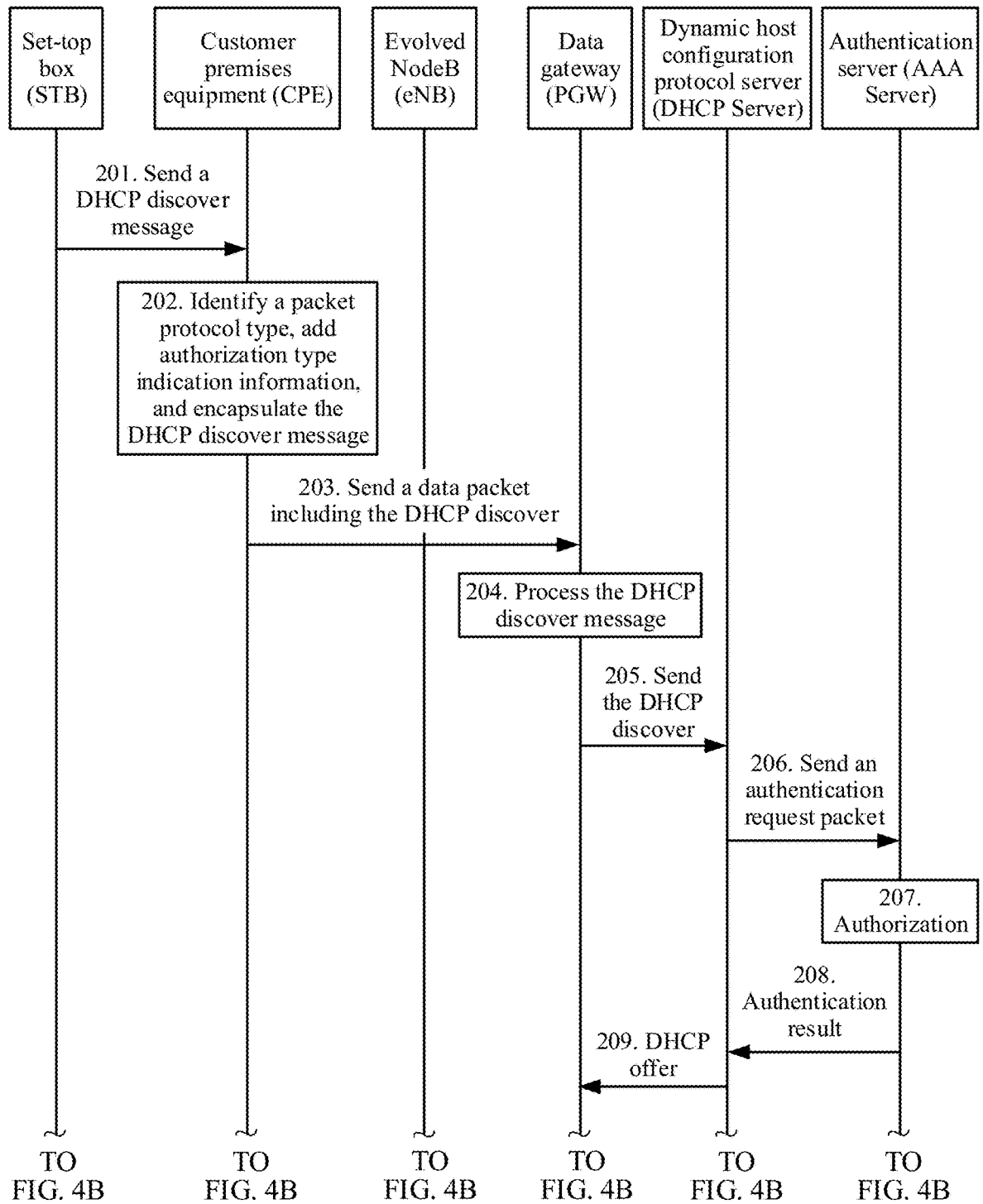
FIG. 4A and FIG. 4B are a schematic diagram of another embodiment of a network access method for a device according to the embodiments of this application.
Figure 4B:
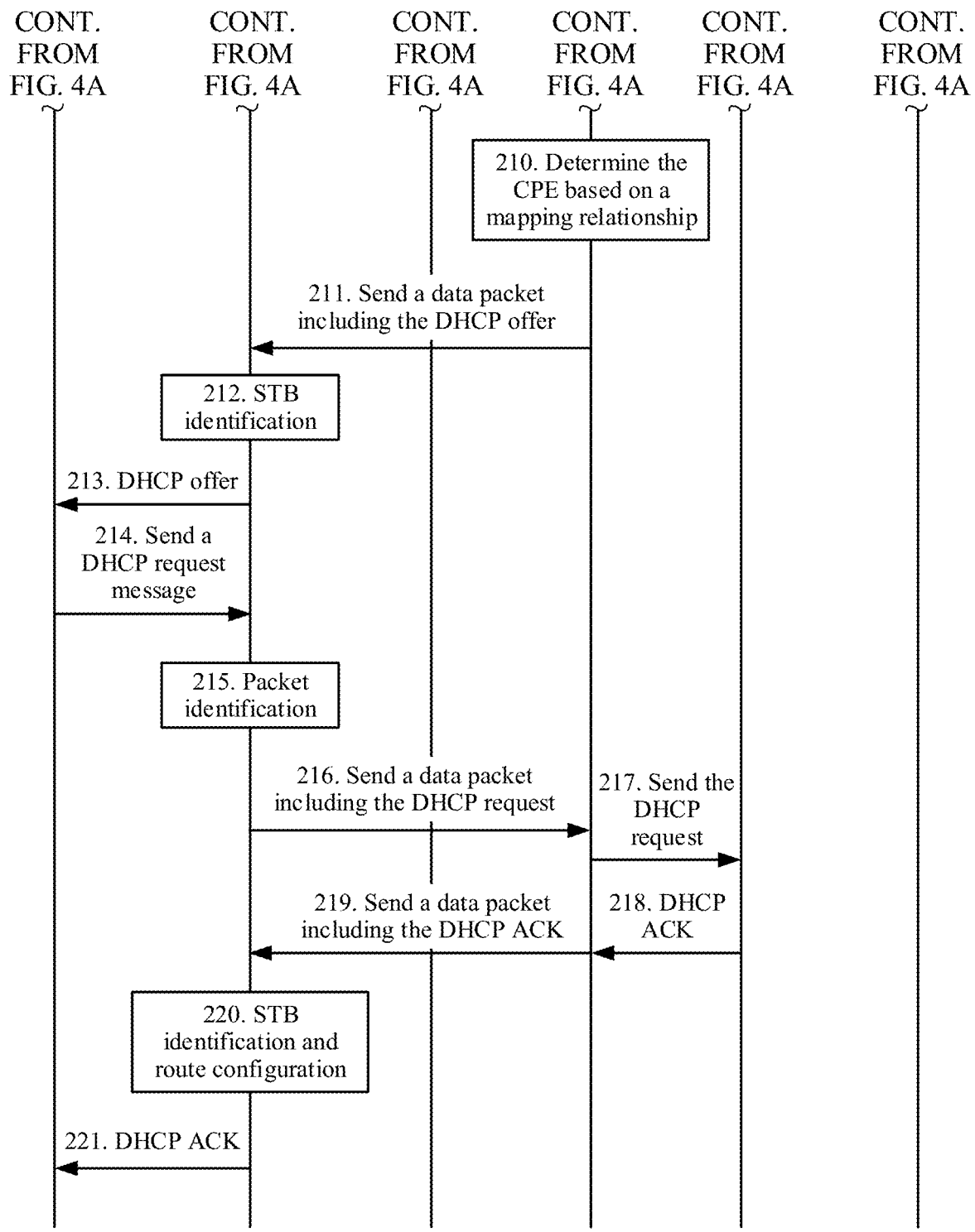

As shown in FIG. 4A and FIG. 4B, another embodiment of a network access method for a device provided in an embodiment of this application includes the following operations.

201. A CPE receives a DHCP discover message sent by the STB.

The DHCP discover message is equivalent to the first message in the embodiment corresponding to FIG. 3A and FIG. 3B, and the DHCP discover message may include device type information of the STB.

202. The CPE identifies the DHCP discover message.

For example, the CPE may identify, based on IP 5-tuple information (a source IP address is 0.0.0.0, a destination IP address is 255.255.255.255, a source port number is 68, a destination port number is 67, and a protocol type is a UDP) included in a received packet sent by the STB, that the received packet is the DHCP discover message. Therefore, the CPE learns that a corresponding authorization mode is the IPoX (DHCP+authentication). Then, the CPE may perform user plane encapsulation on the DHCP discover message, and may add first indication information, such as authorization type indication information, to an encapsulated packet.

203. The CPE forwards an encapsulated DHCP discover message to a PGW by using an evolved NodeB eNB.

204. The PGW receives and processes the DHCP discover message.

The PGW extracts the DHCP discover message from the uplink user plane packet according to an authorization mode indication in the received packet.

When receiving the DHCP discover packet of the STB that is forwarded by the CPE, the PGW records a mapping relationship between an ID (for example, an EPS bearer/a TEID) identifying an identity of the CPE and a MAC address of the STB requesting an IP address.

The PGW may serve as a DHCP relay or a DHCP proxy, to modify content of some related fields in the DHCP packet. For example, when serving as the DHCP relay, the PGW replaces an IP address in Giaddr in the DHCP discover packet with an IP address of the PGW, and adds 1 to a value of a hops field. Alternatively, when serving as an intermediate node, the PGW may add additional authorization information to an extended field (for example, an option 82). For example, the additional authorization information includes at least one of an identity (for example, an IMSI) indicating the CPE, information (for example, an ECGI and/or an eNB ID and/or a TAI) indicating a location of the terminal device and/or a location of a resident node, and information about a channel used to transmit the authorization request. The information about a channel used to transmit the authorization request includes at least one of the following information: an identifier of a tunnel for transmitting the authorization request, an identifier of a bearer for transmitting the authorization request, an identifier of a session for transmitting the authorization request (for example, a PDU session ID), and the like.

205. The PGW sends the DHCP discover message to a DHCP server.

206. The DHCP server generates an authentication request packet based on authorization-related information included in the DHCP discover message, and sends an authentication request to an authentication server.

207. The authentication server performs authorization on the STB.

208. The DHCP server receives an authentication result returned by the authentication server.

209. If the authentication succeeds, the DHCP server sends a DHCP offer packet to the PGW, where the DHCP offer packet includes an IP address pre-allocated by the DHCP server to the STB.

210. The PGW determines, based on the mapping relationship recorded in operation 204, that the DHCP offer packet needs to be sent to the CPE.

211. The PGW sends a data packet including the DHCP offer packet to the CPE.

212. The CPE receives the data packet including the DHCP offer packet, and identifies, from the data packet, that the terminal device is the STB.

For example, the STB may be identified based on a client MAC address in the DHCP offer packet.

213. The CPE sends the DHCP offer packet to the STB.

214. The CPE receives a DHCP request message sent by the STB.

215. The CPE identifies the DHCP request message, performs user plane encapsulation, and adds authorization type indication information.

216. The CPE sends a data packet including the DHCP request to the PGW by using the eNB.

217. The PGW sends the DHCP request message to the DHCP Server.

Before sending the DHCP request message, the PGW may serve as the DHCP relay or the DHCP proxy, to modify content of some related fields in a DHCP request packet.

218. The PGW receives a DHCP acknowledgment (ACK) packet returned by the DHCP server.

The DHCP ACK packet includes the IP address allocated by the DHCP server to the STB, and the DHCP ACK may further include a referenced extended field (for example, an option 121) used for route configuration of the CPE.

219. The PGW sends a data packet including the DHCP ACK packet to the CPE by using the eNB.

In one embodiment, the PGW may add route configuration information to the DHCP ACK. Alternatively, the PGW sends a message including route configuration information to an MME, and the MME sends the message to the CPE by using a NAS message.

220. The CPE receives the data packet including the DHCP ACK packet, and identifies, from the data packet, that the terminal device is the STB, for example, may identify the STB based on the client MAC address in the DHCP offer packet.

The CPE configures a route based on the route configuration information or reference information in the DHCP ACK or NAS message.

221. The CPE sends the DHCP ACK packet to the STB.

After receiving the DHCP ACK packet, the STB may obtain a valid IP address, and complete a network access process. Subsequently, the STB may communicate with a device in the network by using the obtained valid IP address within a valid time range, and accept a service provided by the network.

The foregoing is a description of the solution 1-1 in the part 1. The following describes the solution 1-2 in the embodiments of this application with reference to FIG. 5A and FIG. 5B, in one embodiment, the solution in which the terminal device served by the CPE completes network access in the external network by using a control plane of the 4G mobile network.

Figure 5A:
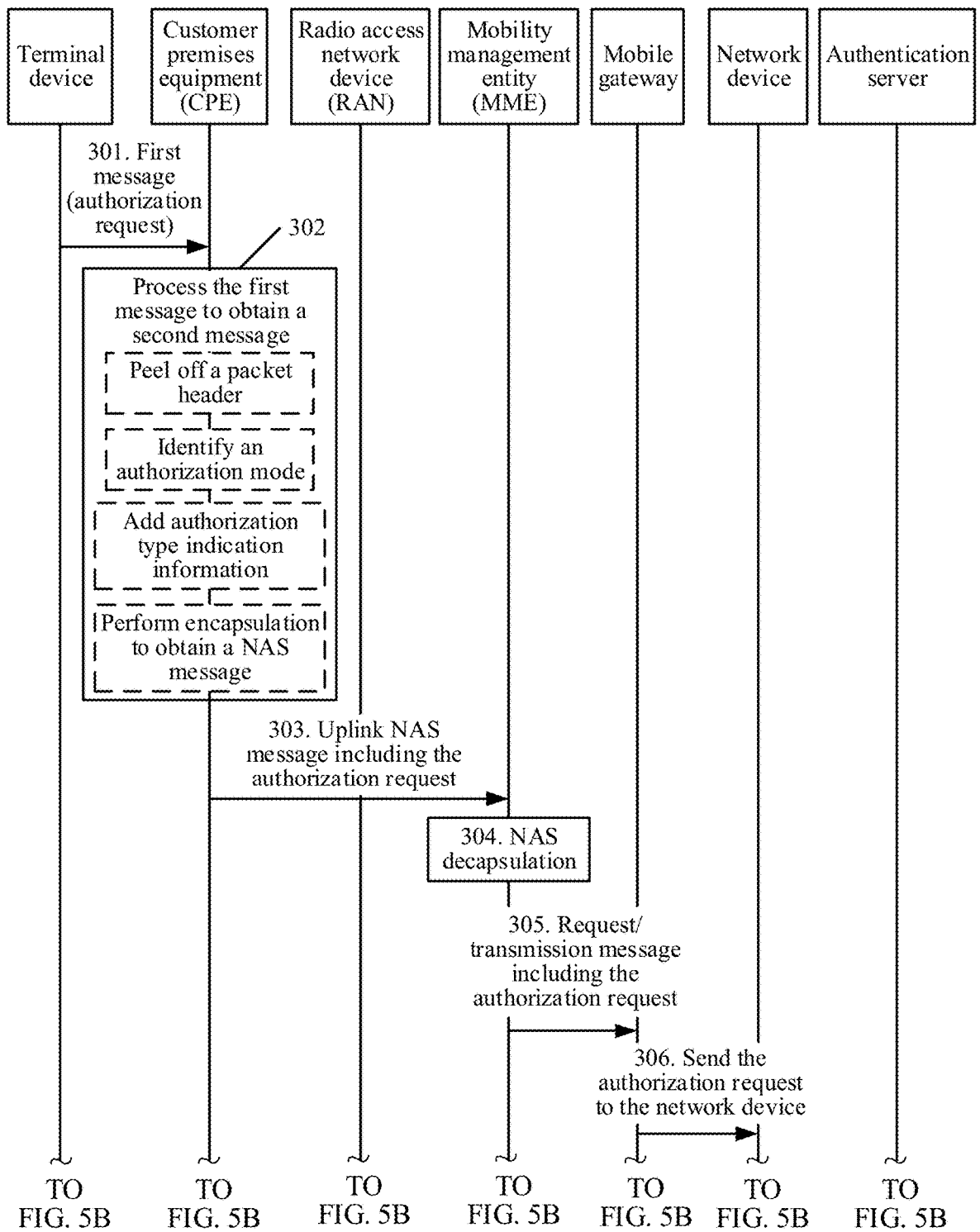
FIG. 5A and FIG. 5B are a schematic diagram of another embodiment of a network access method for a device according to the embodiments of this application.
Figure 5B:
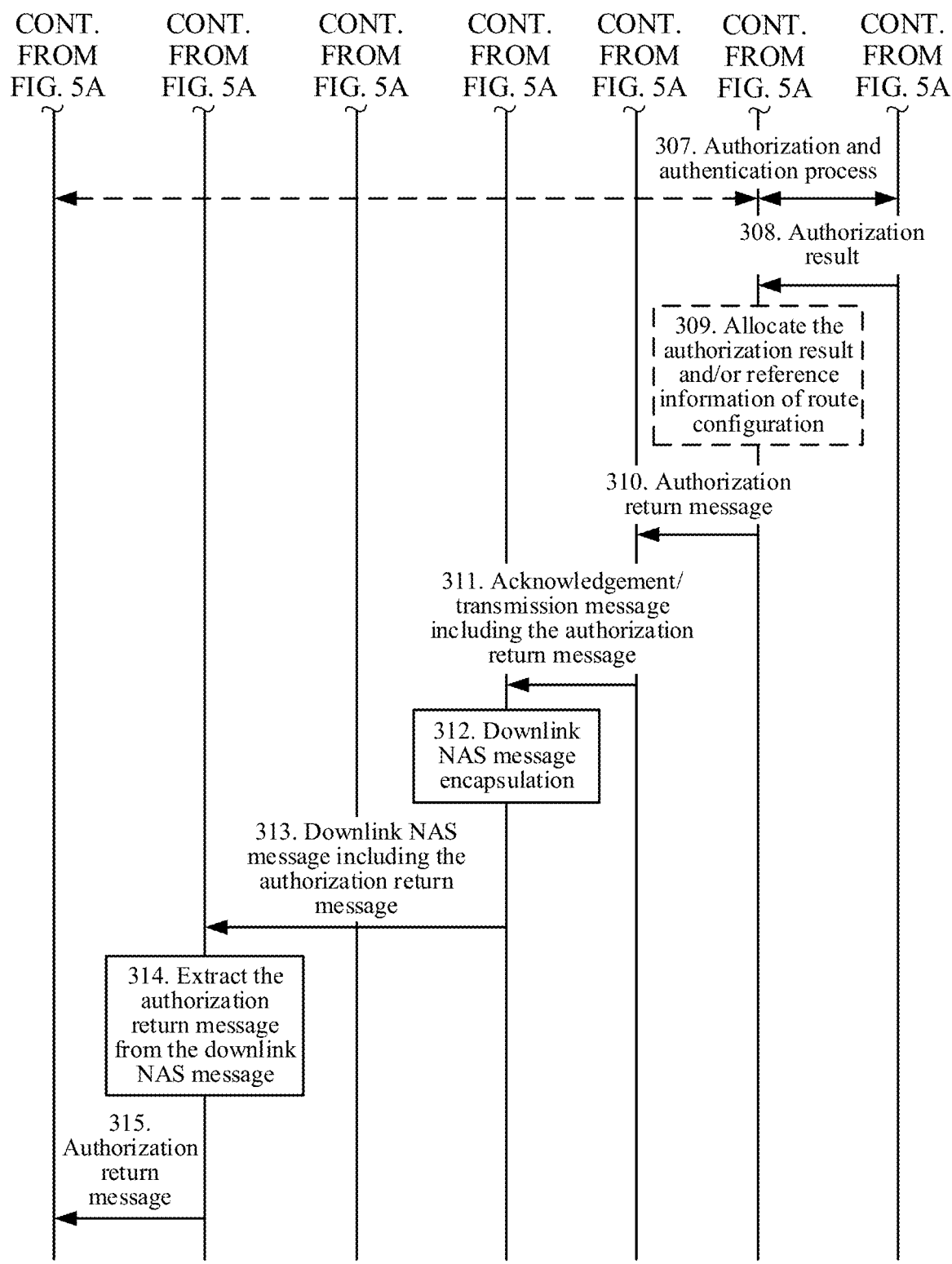

As shown in FIG. 5A and FIG. 5B, another embodiment of a network access method for a device provided in an embodiment of this application includes the following operations.

301. A CPE receives a first message sent by a terminal device, where the first message includes an authorization request.

The terminal device may be understood as a terminal device served by the CPE. The served terminal device is a terminal device connected to the CPE. The terminal device accesses a network by using the CPE. The CPE receives the first message sent by the served terminal device, that is, receives the first message sent by the terminal device connected to the CPE.

The authorization request is an access request, a connection request, an authorization request, an address allocation request, or another type of information that indicates a network access intention, sent by the served terminal device to the network when the terminal device accesses the network. For brief description, the foregoing requests are collectively referred to as an authorization request.

In one embodiment, the CPE may receive only an authorization request. The authorization request does not need to be carried by another message. For example, the authorization request does not need to be carried by the first message.

302. The CPE processes the first message to obtain a second message.

The second message is a NAS message. The NAS message includes the authorization request and/or authorization type indication information.

In a process of operation 302, an L1/L2 packet header of a communication protocol between the CPE and the terminal device may be peeled off, and an authorization mode and/or an authorization protocol type that are/is used by the terminal device may be identified. The authorization mode may include but is not limited to, for example, PPP, PPPoX, IPoX, and EAP. The authorization protocol type may include but is not limited to, for example, protocols involved in PPPoX authorization, such as LCP, PAP, and CHAP, or a DHCP protocol (DHCPv4 or DHCPv6) involved in IPDX, or EAP-AKA, EAP-AKA', EAP-SIM, EAP-TLS, and the like in EAP authorization. After identifying the authorization mode and/or the authorization protocol type corresponding to the authorization request of the served terminal device, the CPE adds, to the NAS message, message content (content in which the L1/L2 message header is peeled off or a complete request packet on which peeling processing is not performed) of the authorization request or information such as a plurality of key parameters included in the authorization message, and indicates corresponding authorization type indication information carrying the authorization message. The authorization type indication information may include an identifier indication of the authorization mode and/or an identifier indication of an authorization protocol.

In other words, the CPE needs to add authorization-related information to the NAS message.

It should be noted that the NAS message in this embodiment of this application may include three types.

A first-type NAS message is a message specially used by the terminal device or the CPE to access the network. In one embodiment, the first-type NAS message is a new defined NAS message type, and is used to carry an interactive message related to a specific type of authorization protocol. For example, the NAS message type is defined as an EAP authorization message, and interactive message content related to EAP authorization is encapsulated in the NAS message, or information, such as a plurality of key parameters, included in an interactive message related to EAP authorization, is encapsulated in the NAS message.

A second-type NAS message includes an information element (IE). The information element may be a protocol configuration option information element. The protocol configuration option information element includes information used by the terminal device or the CPE to access the network. In one embodiment, the second-type NAS message means that in an information element of an existing NAS message, for example, in a protocol supported in a protocol configuration option PCO information element, a protocol corresponding to the authorization mode is added, a corresponding protocol ID is set, and then a key parameter or the authorization type and/or interactive message content related to an authorization protocol may be added to corresponding PCO content. For example, when the terminal device and the network side each generate a NAS message carrying an EAP message, the terminal device and the network side each set a protocol identifier in the PCO information element of the NAS to an identity corresponding to an EAP-AKA, and add, to corresponding "Protocol ID #n contents", interactive message content related to authorization corresponding to the EAP-AKA protocol or information, such as a plurality of key parameters, included in an interactive message related to authorization.

A third-type NAS message includes an information element. The information element may be a special information element used for access or a message container. The special information element used for access or message container is used to carry information used by the terminal device or the CPE to access the network. In one embodiment, the third-type NAS message means that a new information element or message container is configured in an existing NAS message, and is used to carry an interactive message corresponding to the authorization protocol. The third-type NAS message may include a part or all of the following information: the authorization type indication information, the interactive message content related to the authorization, or the information, such as a plurality of key parameters, included in the interactive message related to the authorization.

It should be noted that the NAS message in this embodiment of this application may be any one of the foregoing three types in either an uplink direction or a downlink direction.

303. The CPE sends the NAS message to an MME by using a RAN device.

304. After receiving the NAS message, the MME extracts, from the NAS message, the authorization request, or the key parameters included in the authorization message, and/or the authorization type indication information.

305. The MME sends a message (for example, a request/transmission message) to a mobile gateway.

The message includes at least one of the authorization request or the key parameters included in the authorization message, and the authorization type indication information.

It should be noted that, if the authorization message sent by the MME includes the key parameters, after receiving the message, the mobile gateway needs to generate an authorization request packet based on the key parameters with reference to the authorization type indication information.

Operation 306 to operation 309 are the same as operation 106 to operation 109 in the embodiment corresponding to FIG. 3A and FIG. 3B. Details are not described again in this embodiment. For understanding, refer to operation 106 to operation 109.

310. The mobile gateway receives an authorization return message sent by the network device.

The authorization return message carries authorization result information.

If the authorization return message includes reference information used for route configuration of the CPE, the mobile gateway may generate route configuration information based on the reference information of the route configuration.

For content of the reference information of the route configuration and the route configuration information, refer to the descriptions in operation 109 and operation 110.

311. The mobile gateway sends a message to the MME.

The message (for example, a request/acknowledgment/transmission message) includes at least one of the authorization return message, a key parameter in the authorization return message, and the route configuration information.

312. The MME encapsulates content of the message sent by the mobile gateway into the NAS message.

Content of the NAS message includes at least one of the authorization return message, the key parameter in the authorization return message, and the route configuration information.

For understanding of a type of the NAS message, refer to the three types described above.

313. The MME sends the NAS message to the CPE by using the RAN device.

314. The CPE extracts or generates the authorization return message from the received NAS message.

The CPE may identify the authorization return message to identify a terminal device to which the authorization return message should be sent. The CPE may configure a route based on the route configuration information or the reference information that is used for route configuration of the CPE and that is included in the authorization return message. For content of the reference information of the route configuration and the route configuration information, refer to the descriptions in operation 109 and operation 110.

315. The CPE sends the authorization return message to the terminal device that sends the authorization request.

Similarly, the terminal device subsequently continues to exchange another message with the network device based on a requirement of the authorization mode. For example, a DHCP request message and a corresponding DHCP ACK message involved in an IPoX authorization mode are also transmitted between the MME and the mobile gateway over a control plane channel between the CPE and the MME, and are routed among the mobile gateway, the BNG, and a related DHCP server until a process of accessing the network by the terminal device is completed.

It can be learned from content of the embodiment corresponding to FIG. 5 that, in this embodiment of this application, access of the terminal device to the network is completed by fully using a control plane of an existing 4G network, thereby avoiding laying of dedicated network channels, and improving mobile network utilization.

The foregoing is a description of the solution 1-2 in the part 1. The following describes the solution 2-1 in the embodiments of this application with reference to FIG. 6A and FIG. 6B. In one embodiment, the solution 2-1 is the solution in which the terminal device served by the CPE completes network access by using a user plane of the 5G mobile network.

Figure 6A:
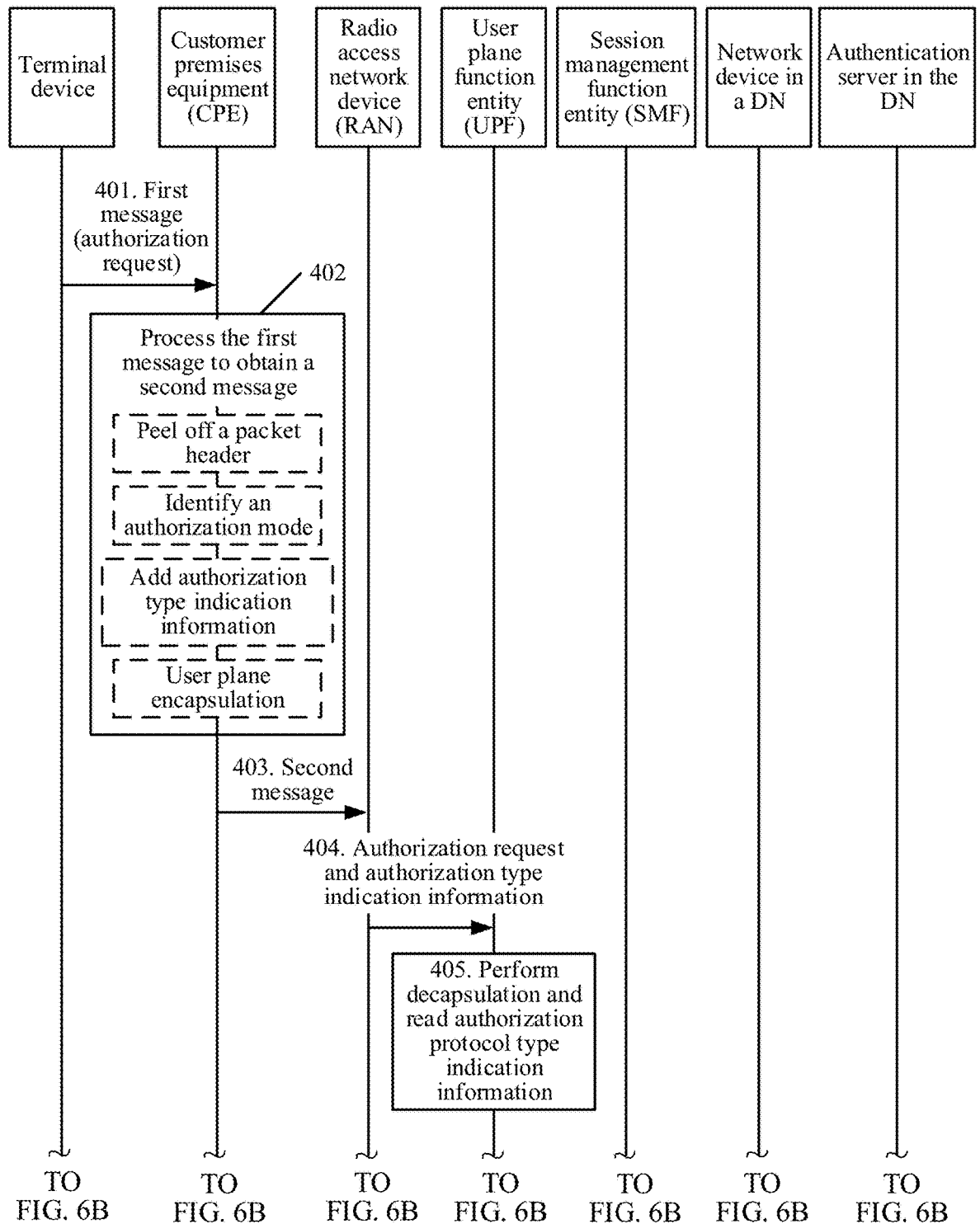
FIG. 6A and FIG. 6B are a schematic diagram of another embodiment of a network access method for a device according to the embodiments of this application.
Figure 6B:
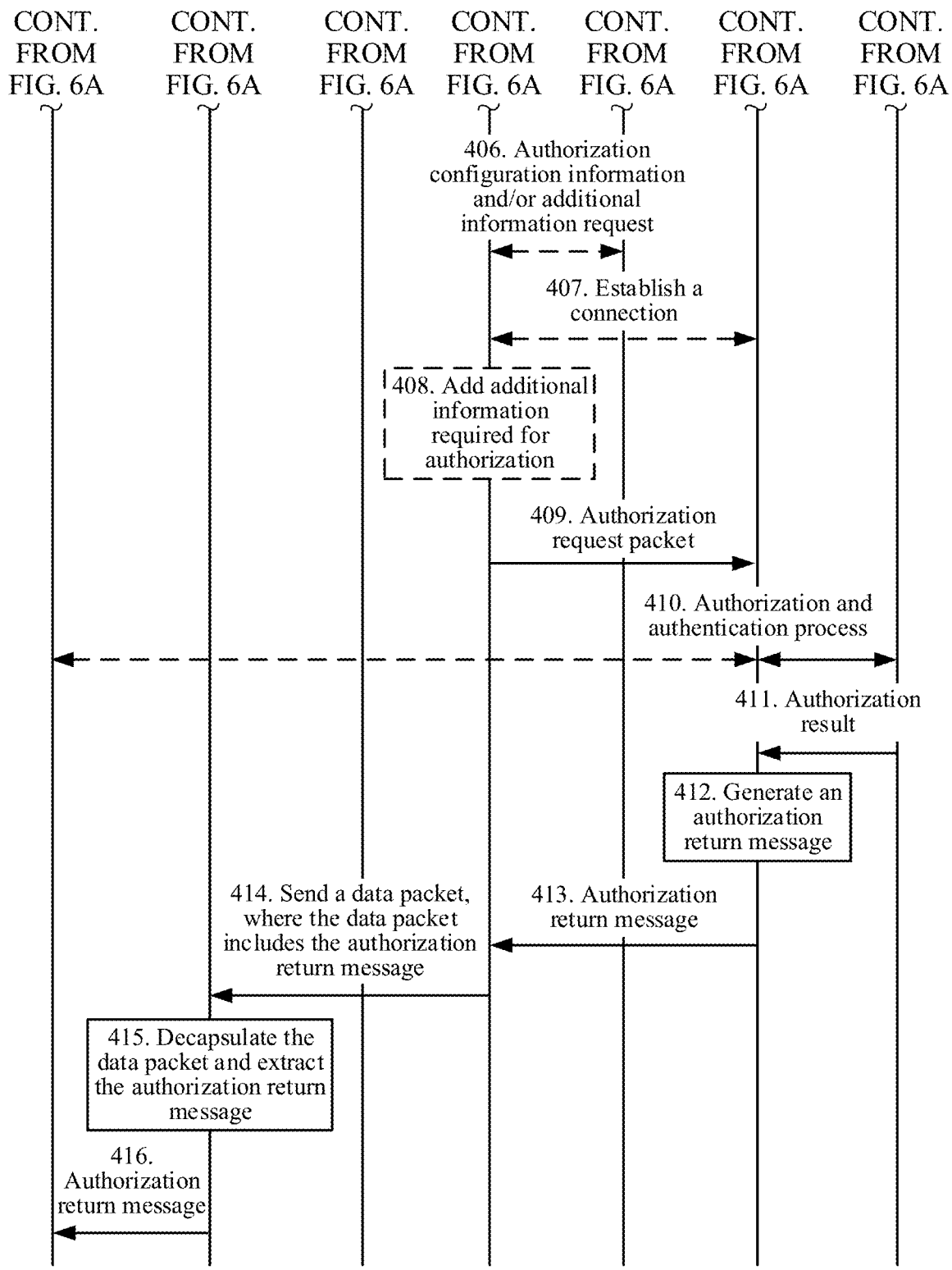

As shown in FIG. 6A and FIG. 6B, another embodiment of a network access method for a device provided in an embodiment of this application includes the following operations.

401. A CPE receives a first message sent by a terminal device, where the first message includes an authorization request.

The terminal device may be understood as a terminal device served by the CPE. The served terminal device is a terminal device connected to the CPE. The terminal device accesses a network by using the CPE. The CPE receives the first message sent by the served terminal device, that is, receives the first message sent by the terminal device connected to the CPE.

The authorization request may be an access request, a connection request, an authorization request, an address allocation request, or another type of information that indicates a network access intention, sent by the served terminal device to the network when the terminal device accesses the network. For brief description, the foregoing requests are collectively referred to as an authorization request.

In one embodiment, the CPE may receive only an authorization request. The authorization request does not need to be carried by another message. For example, the authorization request does not need to be carried by the first message.

402. The CPE processes the first message to obtain a second message.

For understanding of a related message and a processing process in operation 402, refer to operation 102. Details are not described herein again.

403. The CPE sends the second message to a RAN device.

The RAN device may be a gNodeB gNB in 5G.

404. The RAN device sends a data packet to a UPF, where the data packet includes the authorization request and/or authorization type indication information that are/is carried in the second message.

The data packet may be a third message.

The CPE transmits, by using the RAN device, the data packet to the UPF by using an established PDU session. After receiving the second message sent by the CPE, the RAN device decapsulates air interface access layer encapsulation, performs encapsulation (for example, performs tunnel encapsulation) based on a requirement of an N3 interface protocol, and then sends the data packet including the authorization request and/or the authorization type indication information to the UPF through a transmission channel (for example, an N3 tunnel) corresponding to the PDU session between the CPE and the UPF.

If the data packet (or the packet header) of the air interface access layer such as an SDAP/PDCP/RLC/MAC/PHY layer or of a newly added (sub-)layer includes the authorization type indication information added by the CPE, the RAN device may add the authorization type indication information to a packet header (for example, a GTP/UDP/IP packet header) related to protocol encapsulation of an N3 interface.

405. The UPF decapsulates the received data packet, and reads the authorization request and/or the authorization type indication information from the data packet.

For the data packet that is sent by the RAN device and that includes the authorization request and/or the authorization type indication information, the UPF may read the authorization type indication information from the packet header related to the protocol encapsulation of the N3 interface, and obtain the authorization request from the data packet after the protocol encapsulation of the N3 interface is decapsulated. Alternatively, after decapsulating the protocol encapsulation of the N3 interface, the UPF may obtain the authorization type indication information and the authorization request from the data packet (or the packet header) of the layer above the air interface access layer, for example, the IP layer. Alternatively, the UPF may determine the corresponding authorization mode and/or authorization protocol based on a transmission channel (for example, an N3 tunnel corresponding to a specific PDU session) of the data packet, and obtain the authorization request from the data packet after decapsulating the protocol encapsulation of the N3 interface.

406. The UPF requests authorization configuration information and/or additional authorization information from an SMF.

An interface between the UPF and the SMF is an N4 interface. The UPF sends a message (for example, a request/ acknowledgement/transmission message) to the SMF through the N4 interface. The message may include an authorization request packet of the terminal device or a key parameter in an authorization request packet of the terminal device, and/or the authorization type indication information. The SMF sends a message (for example, a request/acknowledgement/transmission message) to the UPF through the N4 interface. The message may include the authorization configuration information and/or the additional authorization information. The additional authorization information is additional information used for authorization.

The authorization configuration information is used to instruct the UPF to establish a connection to a network device in a DN based on an authorization requirement.

The additional authorization information may include at least one of an identity (for example, an IMSI) indicating the CPE, information (for example, an ECGI and/or a gNB ID and/or a TAI) indicating a location of the terminal device and/or a location of a resident node, and information about a channel used to transmit the authorization request. The information about a channel used to transmit the authorization request includes at least one of the following information: an identifier of a tunnel for transmitting the authorization request, an identifier of a bearer for transmitting the authorization request, an identifier (for example, a PDU session ID) of a session for transmitting the authorization request, and the like.

Operation 406 is an operation, and may be performed, or may not be performed.

407. The UPF establishes a connection to a network device in a data network based on an authorization requirement.

The network device in the data network (DN) may include various devices that are in the network and that are used for authorization and/or forwarding and/or address allocation, for example, a BNG, a DHCP Server, and an AAA Server.

For example, if the authorization mode is PPP or PPPoX, the UPF may establish a PPP connection session with the network device, such as the BNG, in the DN over an L2TP tunnel.

If the authorization mode is IPoX, the UPF, as a DHCP relay, routes and forwards a DHCP message including the authorization request to the network device, such as the DHCP server, in the DN.

If the authorization mode is EAP, in a manner 1, the SMF may send, by using a RADIUS protocol or a diameter protocol, a packet including an authorization message to the network device, such as the BNG or the AAA server, in the DN; and the UPF is responsible for forwarding an authorization-related packet exchanged between the SMF and the network device in the DN. In one embodiment, the SMF may serve as an EAP device end. In a manner 2, the UPF may send, by using a RADIUS protocol or a diameter protocol, a packet including an authorization message to the network device, such as the BNG or the AAA server, in the DN. In one embodiment, the UPF may serve as an EAP device end. For understanding of a function of the EAP device end, refer to the description in operation 107.

408. Add the additional authorization information to an authorization request packet.

If the UPF adds the additional authorization information, the additional authorization information may be sent by the SMF to the UPF in operation 406, or may be obtained by the UPF based on context information of the CPE or the PDU session.

If the message sent by the UPF to the SMF in operation 406 includes the authorization request packet, the SMF may add the additional authorization information to the authorization request packet, and then send the packet to the UPF.

409. The UPF sends the authorization request packet to the network device in the DN.

In this operation, the network device includes but is not limited to a gateway/router node, such as the BNG, or a node having an address allocation function, such as the DHCP server, or a node having an authorization and authentication function, such as the AAA server.

410. The network device in the DN performs authorization and authentication on the terminal device based on the authorization mode used by the terminal device.

If "the network device in the DN" in this operation is corresponding to "the network device" in operation 107, for a process of this operation, refer to operation 107.

411. The network device in the DN receives authorization result information returned by an authentication server.

The network device in this operation may include but is not limited to a gateway/router node, such as the BNG, or a node having an address allocation function, such as the DHCP server. If "the network device in the DN" in this operation is corresponding to "the network device" in operation 108, for understanding of a process of this operation, refer to operation 108.

412. The network device in the DN may add, to an authorization return message, an IP address allocated to the terminal device and/or reference information used for route configuration of the CPE.

The network device in this operation may include but is not limited to a gateway/router node, such as the BNG, or a node having an address allocation function, such as the DHCP server. If "the network device in the DN" in this operation is corresponding to "the network device" in operation 109, for understanding of a process of this operation, refer to operation 109.

413. The UPF receives the authorization return message sent by the network device in the DN.

If the authorization return message includes the reference information used for route configuration of the CPE, the UPF may directly perform user plane encapsulation on the authorization return message. Alternatively, the UPF may generate route configuration information based on the reference information used for route configuration of the CPE, where the route configuration information is carried in the authorization return message, and then perform user plane encapsulation on the authorization return message. Alternatively, the UPF performs user plane encapsulation on the authorization return message. In addition, the UPF sends, to the SMF by using an N4 interface message (for example, a request/acknowledgement/transmission message), the reference information used for route configuration of the CPE; the SMF generates, based on the reference information, route configuration information to be sent to the CPE, adds the route configuration information to an N11 interface message (for example, a request/acknowledgement/transmission message), and sends the message to the AMF; and then the AMF adds the route configuration information to a NAS message and sends the NAS message to the CPE. Alternatively, the UPF sends the authorization return message to the SMF by using an N4 interface message (for example, a request/acknowledgement/transmission message); the SMF generates route configuration information, adds the route configuration information to the authorization return message, and sends the authorization return message to the UPF by using a request/acknowledgement/transmission message of the N4 interface; and the UPF performs user plane encapsulation on the authorization return message to which the route configuration information is added.

For content of the reference information of the route configuration and the route configuration information, refer to the descriptions in operation 109 and operation 110. Details are not described herein again.

414. The UPF sends, to the CPE by using the RAN device, a data packet into which the authorization return message is encapsulated.

415. The CPE receives the data packet into which the authorization return message is encapsulated, and decapsulates the data packet to extract the authorization return message.

The CPE may identify the authorization return message to identify a terminal device to which the authorization return message should be sent.

The CPE may configure a route based on the reference information of the route configuration or the route configuration information included in the authorization return message or based on the route configuration information carried in the NAS message received from the AMF.

416. The CPE sends the authorization return message to the terminal device that sends the authorization request.

Similarly, the terminal device subsequently continues to exchange another message with the network device based on a requirement of the authorization mode, for example, a DHCP request message and a corresponding DHCP ACK message related to an IPoX authorization mode until a process of accessing the network by the terminal device is completed.

It can be learned from content of the embodiment corresponding to FIG. 6A and FIG. 6B that, in this embodiment of this application, access of the terminal device to the network is completed by fully using a user plane of an existing 5G network, thereby avoiding laying of dedicated network channels, and improving mobile network utilization.

The foregoing is a description of the solution 2-1 in the part 1. The following describes the solution 2-2 in the embodiments of this application with reference to FIG. 7A, FIG. 7B, and FIG. 7C, in one embodiment, the solution in which the terminal device served by the CPE completes network access by using a control plane of the 5G mobile network.

501. A CPE receives a first message sent by a terminal device, where the first message includes an authorization request.

The terminal device may be understood as a terminal device served by the CPE. The served terminal device is a terminal device connected to the CPE. The terminal device accesses a network by using the CPE. The CPE receives the first message sent by the served terminal device, that is, receives the first message sent by the terminal device connected to the CPE.

The authorization request may be an access request, a connection request, an authorization request, an address allocation request, or another type of information that indicates a network access intention, sent by the served terminal device to the network when the terminal device accesses the network. For brief description, the foregoing requests are collectively referred to as an authorization request.

In one embodiment, the CPE may receive only an authorization request. The authorization request does not need to be carried by another message. For example, the authorization request does not need to be carried by the first message.

502. The CPE processes the first message to obtain a second message.

For understanding of operation 502, refer to operation 302. Details are not described herein again.

503. The CPE sends a NAS message to an AMF by using a RAN device.

504. After receiving the NAS message, the AMF extracts, from the NAS message, the authorization request, or a key parameter included in the authorization request message, and/or authorization type indication information.

505. The AMF sends a message (for example, a request/acknowledgement/transmission message) to an SMF, where the message includes at least one of the authorization request or the key parameter included in the authorization request message, and the authorization type indication information.

A communications interface between the AMF and the SMF is an N11 interface.

506. The SMF generates authorization configuration information and/or additional authorization information.

The authorization configuration information is used to instruct a UPF to establish a connection to a network device in a DN based on an authorization requirement.

For example, if an authorization mode is PPP or PPPoX, the UPF may establish a PPP connection session with the network device, such as a BNG, in the DN over an L2TP tunnel.

If the authorization mode is IPoX, the UPF, as a DHCP relay, sends a DHCP message including authorization-related information to the network device, such as a DHCP server, in the DN.

If the authorization mode is EAP, in a manner 1, the SMF may send, by using a RADIUS protocol or a diameter protocol, a packet including an authorization message to the network device, such as the BNG or an AAA server, in the DN; and the UPF is responsible for forwarding an authorization-related packet exchanged between the SMF and the network device in the DN. In one embodiment, the SMF may serve as an EAP device end. In a manner 2, the UPF may send, by using a RADIUS protocol or a diameter protocol, a packet including an authorization message to the network device, such as the BNG or the AAA server, in the DN. In one embodiment, the UPF may serve as an EAP device end. For understanding of a function of the EAP device end, refer to the description in operation 107.

The additional authorization information may include, for example, at least one of an identity (for example, an IMSI) indicating the CPE, information (for example, an ECGI and/or a gNB ID and/or a TAI) indicating a location of a resident node, and information about a channel used to transmit the authorization request. The information about a channel used to transmit the authorization request includes at least one of the following information: an identifier of a tunnel for transmitting the authorization request, an identifier of a bearer for transmitting the authorization request, an identifier (for example, a PDU session ID) of a session for transmitting the authorization request, and the like.

507. The SMF sends a message to a UPF.

The message (for example, a request/acknowledgement/transmission message) includes at least one of the authorization request or the key parameter included in the authorization request message, the authorization configuration information, the additional authorization information, and the authorization type indication information.

508. The UPF receives the message sent by the SMF, and generates an authorization request packet.

The UPF may generate the authorization request packet with reference to the authorization type indication information in the message (for example, the request/acknowledgement/transmission message) sent by the SMF and based on the authorization request or the key parameter included in the authorization request message and/or the additional authorization information that are/is carried in the message. The authorization request packet may include the additional authorization information.

Operation 509 to operation 512 are the same as operation 409 to operation 412 that are corresponding to FIG. 6A and FIG. 6B. Details are not described again in this embodiment. For understanding, refer to operation 409 to operation 412.

513. The UPF receives the authorization return message sent by the network device in the DN.

The UPF may obtain a key parameter in the authorization return message based on the received authorization return message, to generate a message to be sent to the SMF.

If the authorization return message includes reference information used for route configuration of the CPE, the UPF may extract the reference information used for route configuration of the CPE; or generate route configuration information based on reference information; or add route configuration information to the authorization return message based on reference information.

For content of the reference information of the route configuration and the route configuration information, refer to the descriptions in operation 109 and operation 110. Details are not described herein again.

514. The UPF sends a message to the SMF.

The message (for example, a request/acknowledgment/transmission message) includes at least one of the following information: the authorization return message or the key parameter in the authorization return message, the route configuration information, and the reference information used for route configuration of the CPE.

If the message sent by the UPF and received by the SMF includes the reference information used for route configuration of the CPE, the SMF may generate the route configuration information based on the reference information.

515. The SMF sends a message to the AMF.

The message (for example, a request/acknowledgment/transmission message) includes at least one of the following information: the authorization return message or the key parameter in the authorization return message, the route configuration information, and the reference information used for route configuration of the CPE.

516. The AMF encapsulates content of the message sent by the SMF into a NAS message.

The NAS message includes at least one of the following information: the authorization return message or the key parameter in the authorization return message, the route configuration information, and the reference information used for route configuration of the CPE.

For understanding of a type of the NAS message, refer to the three types described in operation 302.

517. The AMF sends the NAS message to the CPE by using the RAN device.

518. The CPE decapsulates the received NAS message, and extracts or generates the authorization return message from the NAS message.

The CPE may identify the authorization return message to identify a terminal device to which the authorization return message should be sent.

The CPE may configure a route based on the route configuration information or the reference information that is used for route configuration of the CPE and that is included in the authorization return message.

519. The CPE sends the authorization return message to the terminal device that sends the authorization request.

Similarly, the terminal device subsequently continues to exchange another message with the network device based on a requirement of the authorization mode, for example, a DHCP request message and a corresponding DHCP ACK message related to an IPoX authorization mode until a process of accessing the network by the terminal device is completed.

Figure 7B:
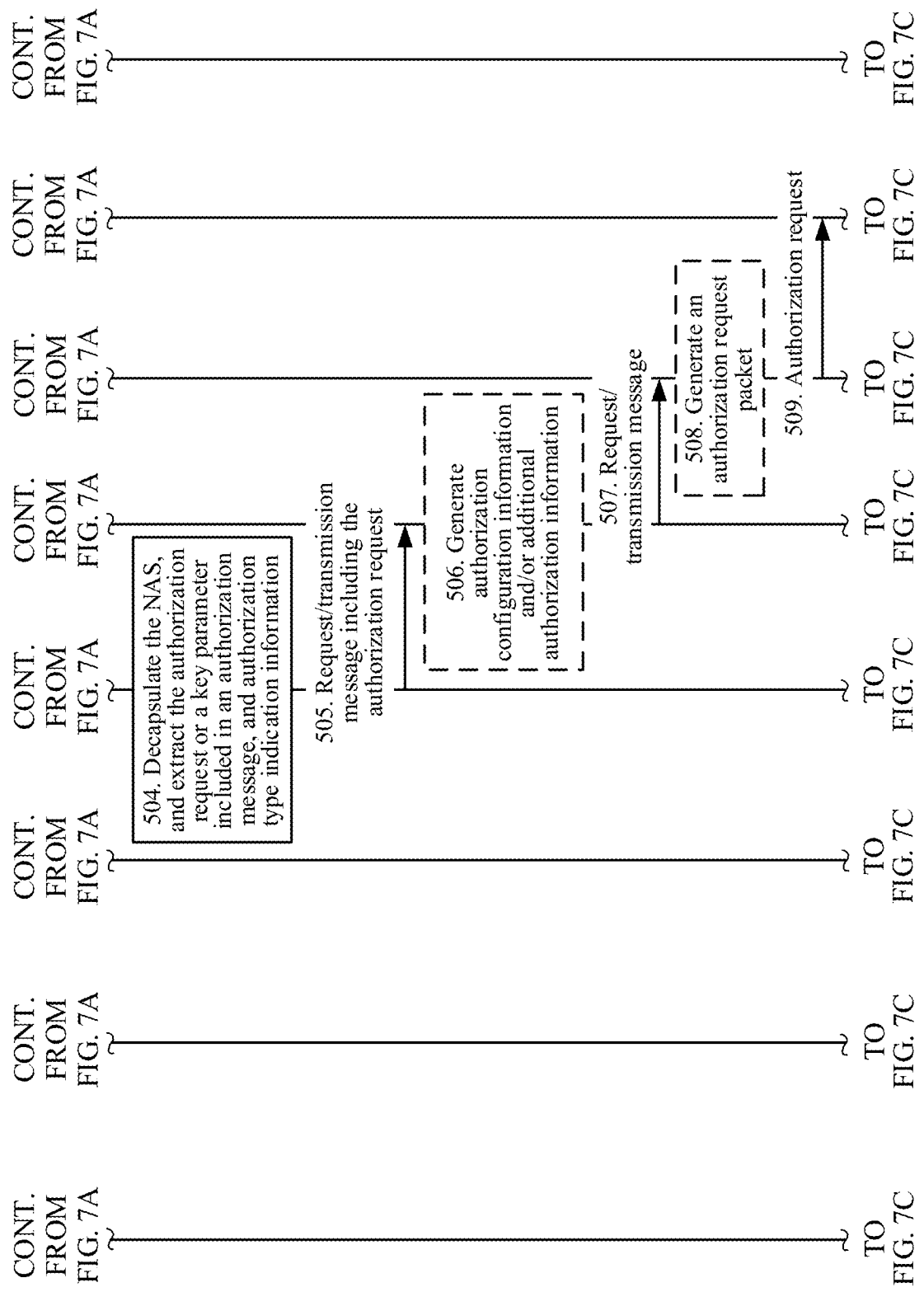
Figure 7C:
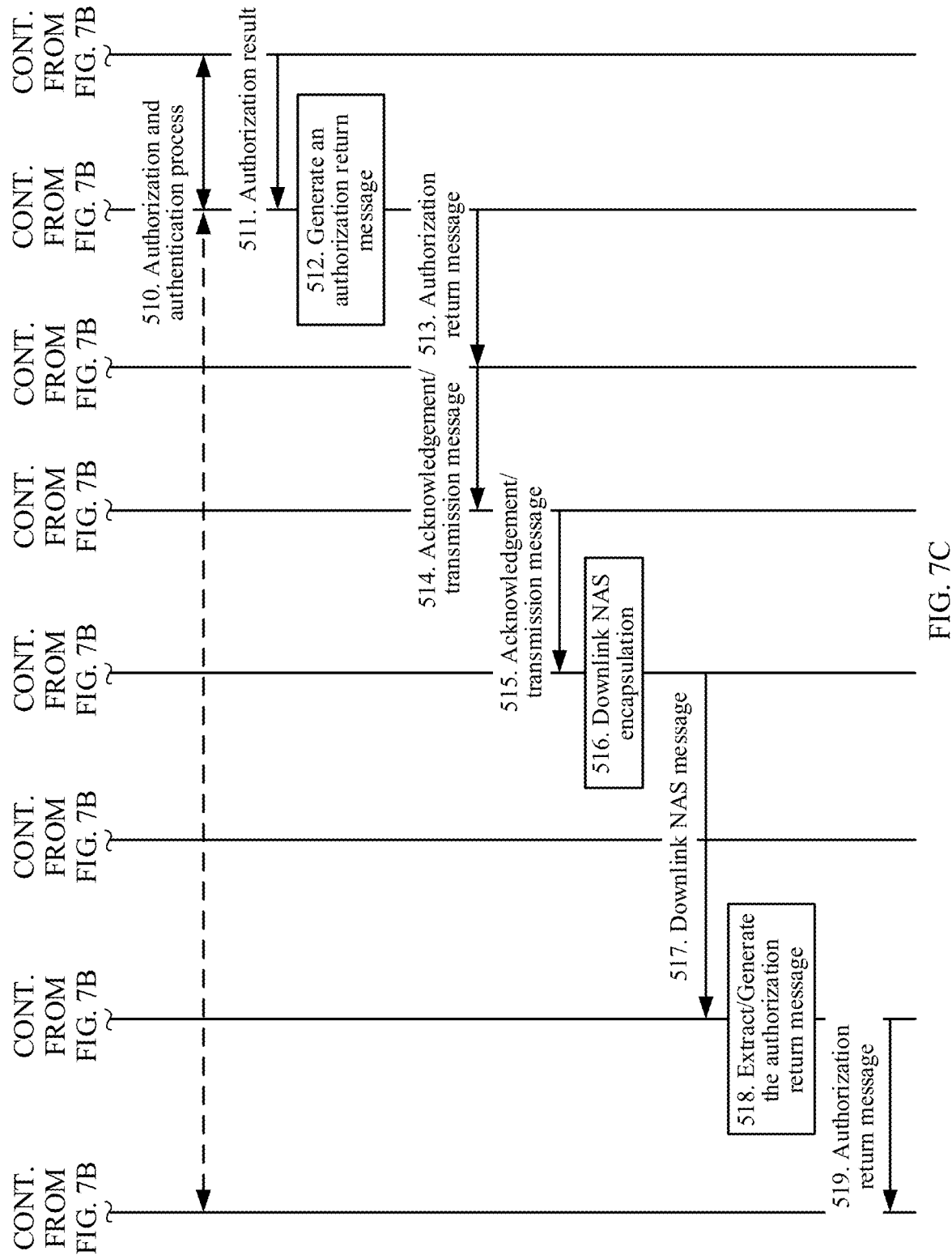

It can be learned from content of the embodiment corresponding to FIG. 7A, FIG. 7B, and FIG. 7C that, in this embodiment of this application, access of the terminal device to the network is completed by fully using a control plane of an existing 5G network, thereby avoiding laying of dedicated network channels, and improving mobile network utilization.

The foregoing is a general description of a possible authorization mode for the terminal device. The following uses an example in which the terminal device is an STB and the authorization mode is the IPoX (DHCP+authentication), to describe a process in which the STB completes network access by using a control plane of a 5G mobile network.

Figure 8A:
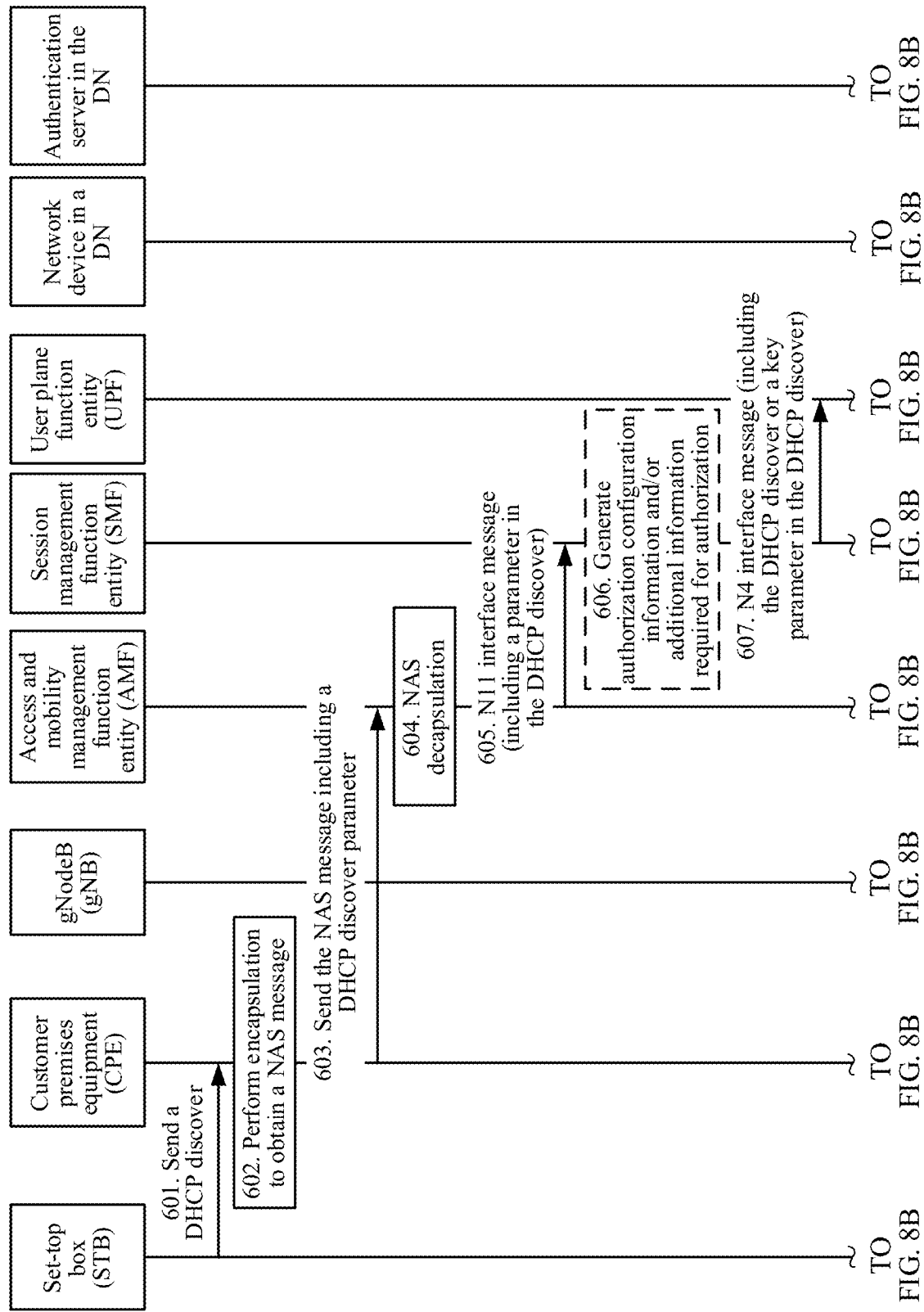
FIG. 8A, FIG. 8B, and FIG. 8C are a schematic diagram of another embodiment of a network access method for a device according to the embodiments of this application.
Figure 8B:
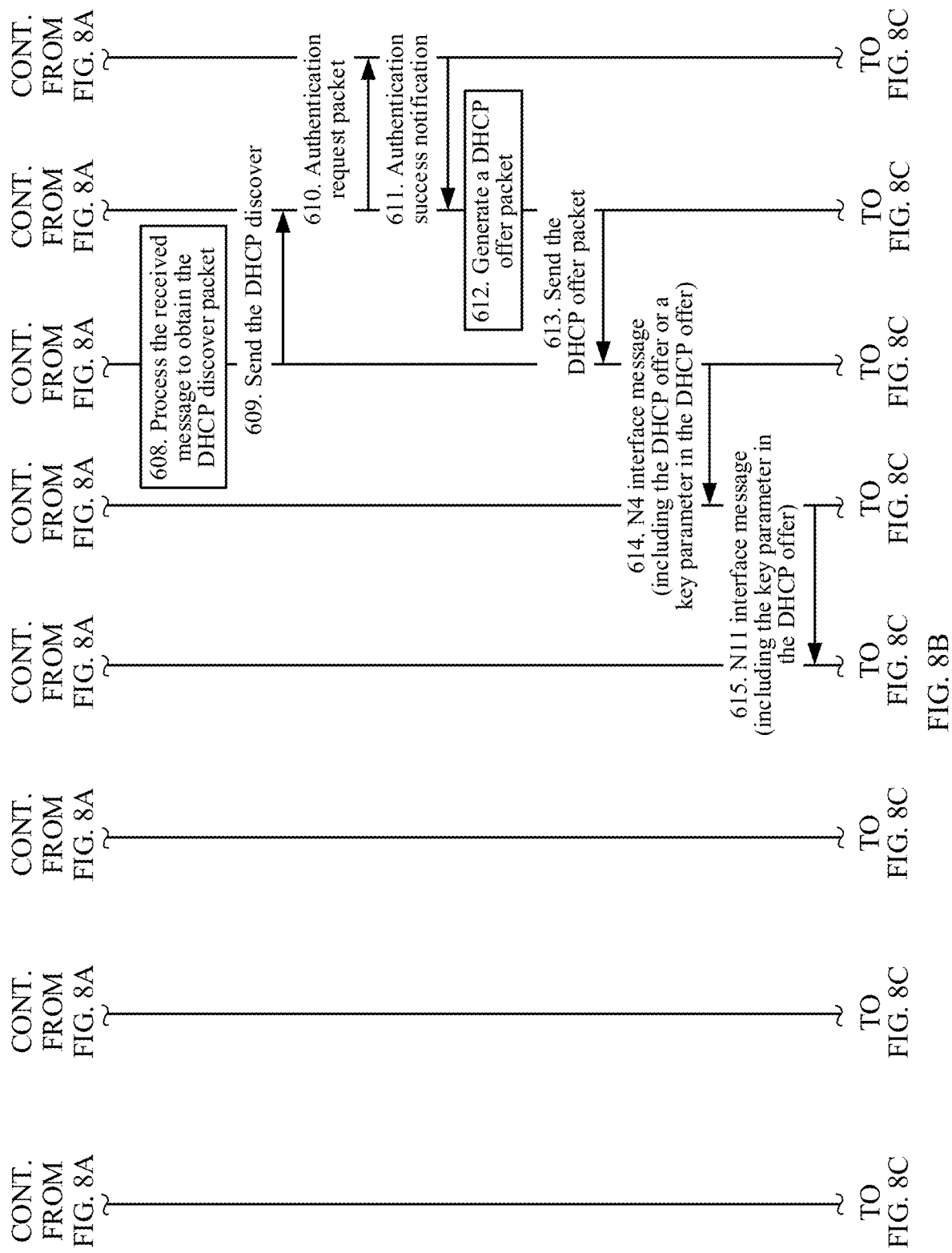
Figure 8C:
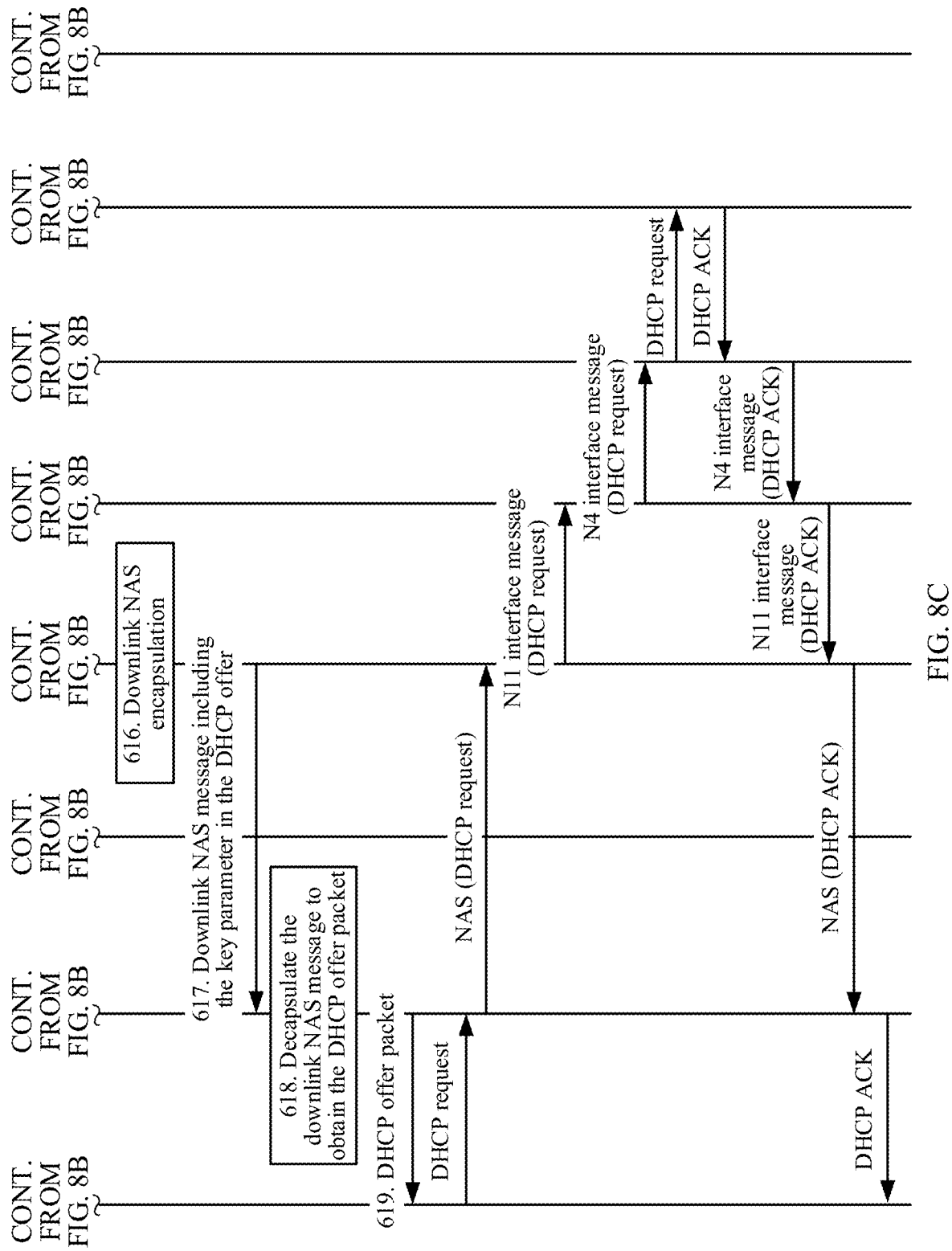

As shown in FIG. 8A, FIG. 8B, and FIG. 8C, another embodiment of a network access method for a device provided in an embodiment of this application includes the following operations.

601. A CPE receives an authorization request packet sent by an STB, for example, a DHCP discover packet.

602. After receiving the authorization request packet, the CPE encapsulates, into a NAS message, an authorization request or a parameter that is in an authorization request and that is used for authorization. In one embodiment, the NAS message may further include authorization type indication information.

For understanding of encapsulating the authorization request into the NAS message, refer to the three types of NAS message described in operation 302.

For example, the CPE adds, to a message container (for example, a session management container) that includes a PDU session establishment request and that is in a NAS message, information such as the authorization type indication information indicating IPoX (DHCP+authentication), content (for example, an option 60) of a DHCP extended field, and device information of the STB, for example, a MAC address and a device type.

603. The CPE sends the NAS message to the AMF by using a RAN device.

604. The AMF decapsulates the received NAS message.

605. The AMF sends, to the SMF, a message that carries the DHCP discover packet or an authorization-related key parameter in the DHCP discover.

For example, content included in the session management container of the CPE may be added to an SM request message sent by the AMF to the SMF through an N11 interface.

606. The SMF generates authorization configuration information and/or additional authorization information.

For understanding of content related to the generation of the authorization configuration information and/or the additional authorization information, refer to the description in operation 506.

In one embodiment, if the message sent by the AMF includes the DHCP discover packet, the SMF may add the generated additional authorization information to the DHCP discover packet, or may modify content of some fields in the DHCP discover packet based on a role (for example, a DHCP relay or a DHCP proxy) of the SMF in the authorization on the device. For example, as the DHCP relay, the SMF may modify a field such as an IP address of an initial relay node: Raiaddr, or a quantity of hops: hops.

Alternatively, the SMF may generate a DHCP discover packet based on the authorization-related key parameter included in the message sent by the AMF, and may add the additional authorization information (for example, content corresponding to an extended field option 82) to the packet; or may modify/pad content of some fields in the DHCP discover packet based on a role (for example, a DHCP relay or a DHCP proxy) of the SMF in the authorization on the device. For example, as the DHCP relay, the SMF may modify/pad a field such as an IP address of an initial relay node: Raiaddr, or a quantity of hops: hops.

607. The SMF sends a message to a UPF through an N4 interface, where the message may carry the DHCP discover packet and/or the authorization configuration information.

Alternatively, the message may carry the authorization-related key parameter, the authorization configuration information and/or the additional authorization information (for example, the content corresponding to the extended field option 82) generated in operation 606, and the like.

The message may be a request/acknowledgement/transmission message, or the like, for example, a session establishment/modification request.

608. The UPF receives the message sent by the SMF.

After receiving the message (for example, an N4 session establishment/modification request message) from the SMF, based on the authorization configuration information or the authorization type indication information included in the message, the UPF may serve as a DHCP relay or a DHCP proxy node, and interact with a network device in a DN, for example, a DHCP server. For example, the UPF extracts the DHCP discover packet from the N4 session establishment/modification message based on the authorization type indication information or the authorization configuration information, and as the DHCP relay, modifies some fields in the DHCP discover packet, and adds IMSI information of the CPE to the extended field option 82. Alternatively, after the DHCP discover packet is generated based on the key parameter in the message sent by the SMF, as the DHCP relay, the UPF modifies some fields of the DHCP packet, and adds IMSI information of the CPE to the extended field option 82.

Alternatively, as a DHCP relay or a DHCP proxy node, the SMF interacts with the network device, such as a DHCP server, in the DN by using the UPF. The UPF may serve as an intermediate node based on the authorization configuration information or the authorization type indication information, and is responsible for forwarding a packet exchanged between the SMF and the network device in the DN. For example, the UPF obtains, from the message (for example, the request/acknowledgement/transmission message) sent by the SMF, a DHCP discover packet generated/modified by the SMF, and the DHCP discover packet is to be forwarded to the DHCP server.

609. The UPF sends the authorization request packet to the network device in the DN. For example, the UPF sends the DHCP discover packet to the DHCP server in the DN through an N6 interface.

610. The network device in the DN performs authorization and authentication on a terminal device based on an authorization mode used by the terminal device. For example, the DHCP server sends an authentication packet to an AAA server based on an authorization parameter in the DHCP discover packet, and the AAA server performs authorization on the STB.

611. An authentication server sends authorization result information to the network device in the DN.

For example, after the authorization on the STB succeeds, the AAA server returns an authentication success notification to the DHCP server.

612. The network device in the DN generates an authorization return message. For example, the DHCP server generates a DHCP offer packet, adds an IP address pre-allocated to the STB to the DHCP offer packet, and adds reference information used for route configuration of the CPE to an extended field (for example, an option 121). The reference information used for route configuration of the CPE may include, for example, all or a part of the following content: an IP address/a network segment address/an address prefix and/or network mask information (for example, a mask or a mask length) that are/is of a common server (a content server, a fast zapping server, or the like) providing an IPTV service, a corresponding next-hop node, a multicast address providing content, a corresponding next-hop node, and the like. It should be noted that, the DHCP server may also add the reference information used for route configuration of the CPE to the extended field (for example, the option 121) in a subsequent DHCP ACK packet.

613. The UPF receives the DHCP offer packet sent by the DHCP server.

In one embodiment, the UPF may modify/pad content of some fields in the DHCP offer packet based on the role (for example, the DHCP relay or the DHCP Proxy) of the UPF in the authorization on the device.

614. The UPF sends a message to the SMF.

The message may include a plurality of key parameters in the DHCP offer packet, or include the DHCP offer packet. The message may be a request/acknowledgement/transmission message, or the like, for example, an N4 session establishment/modification acknowledgement message.

In one embodiment, the SMF may modify/pad content of some fields in the DHCP offer packet based on the role (for example, the DHCP relay or the DHCP Proxy) of the SMF in the authorization on the device.

In one embodiment, the SMF may generate route configuration information based on the reference information that is included in the message and that is used for route configuration of the CPE. The route configuration information may be added to an extended field in the DHCP offer packet, or the reference information that is used for route configuration of the CPE and that is in an extended field in the DHCP offer packet is replaced with the route configuration information.

615. The SMF sends a message to the AMF.

The message may be a request/acknowledgement/transmission message, or the like, for example, an SM response message. A message container (for example, a session management container) in the message carries the DHCP offer packet or the plurality of key parameters in the DHCP offer packet, and may include the route configuration information and/or the reference information used for route configuration of the CPE.

616. The AMF generates a NAS message.

The NAS message may carry a message that is in an acknowledgement/transmission message sent by the SMF and that is sent to the CPE/terminal device by using a message container. For example, the NAS message, for example, a PDU session response, carries content (for example, the plurality of key parameters in the DHCP offer packet or the route configuration information) that is included in a session management container in an SM response message sent by the SMF.

617. The AMF sends the generated NAS message to the CPE by using the RAN device.

618. The CPE decapsulates the received NAS message to obtain the DHCP offer message, or extracts the key parameters from the DHCP offer packet and generates the DHCP offer packet.

In one embodiment, the CPE may configure a route based on the route configuration information and/or the reference information used for route configuration of the CPE that are/is in the NAS message.

The CPE may determine, based on the NAS message or information in the DHCP offer packet, that the DHCP offer message needs to be sent to the STB.

619. The CPE sends the DHCP offer packet to the terminal device that sends the authorization request, that is, the STB.

Subsequently, the STB and the DHCP server continue to exchange a subsequent message (including a DHCP request and a DHCP ACK) through various segments (including the STB to the CPE, the CPE to the AMF, the AMF to the SMF, the SMF to the UPF, and the UPF to the DHCP server) of a transmission path described in the foregoing operations (601 to 619), until an authorization process in an IPoX manner is completed. A subsequent process of the authorization includes: The STB sends a DHCP request message to a selected DHCP server, and the DHCP server also returns a DHCP ACK message to the STB. The DHCP ACK packet returned by the DHCP server may carry an IP address allocated to the STB, and/or the reference information used for route configuration of the CPE. All involved nodes, including the CPE, the RAN device, the AMF, the SMF, the UPF, the network device in the DN, and the like, also forward or process the subsequent message in the manner described in operations 601 to 619 in the access process of the device.

The foregoing describes a process in which the terminal device served by the CPE accesses the network by using the 4G or 5G mobile network.

The following describes a process in which a CPE or a terminal device served by the CPE accesses a network by using a 4G or 5G mobile network in the embodiments of this application. In addition, a network access process of the CPE may be combined into the solution in the foregoing part 1. For example, before the served terminal device accesses the network, the CPE first performs a network access process. Alternatively, the network access process of the CPE may be used as an independent network access solution. Regardless of whether the CPE network access process is combined into the solution in the foregoing part 1 or is used as the independent solution, the network access processes of the CPE are basically the same.

The network access process of the CPE is basically the same as the network access process of the terminal device. A difference lies in that the CPE initiates an authorization request. The CPE may directly perform user plane encapsulation or control plane encapsulation on the authorization request and then transmit the authorization request to a corresponding device, and an operation related to transmission between the terminal device and the CPE does not need to be considered.

The network access process of the CPE or the terminal device served by the CPE is described in the foregoing part 2.

The solution 1 is a solution in which the CPE or the terminal device served by the CPE completes network access by using the 4G mobile network.

The solution 2 is a solution in which the CPE or the terminal device served by the CPE completes network access by using the 5G mobile network.

In addition, the solution 1 and the solution 2 may each include a network access process on a user plane and a network access process on a control plane.

In view of the foregoing descriptions of the plurality of embodiments of the network access process of the terminal device, for understanding of the network access process of the CPE, refer to the network access process of the terminal device. Therefore, in the embodiments of this application, processes in which the CPE or the terminal device served by the CPE accesses a network are described by using a control plane in a 4G scenario and a control plane in a 5G scenario as examples. For understanding of processes on the user plane, refer to corresponding processes in the part 1.

Figure 9A:
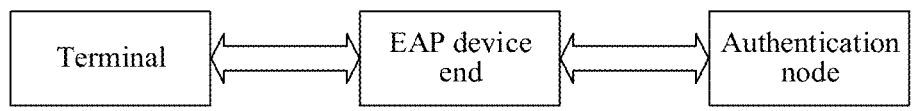
FIG. 9A is a schematic diagram of an example of a system in which devices interact with each other according to an embodiment of this application.

Before the network access of the CPE or the terminal device served by the CPE is described, an information exchange process among the terminal, an EAP device end, and an authentication node according to the EAP protocol in the embodiments of this application is described with reference to FIG. 9A. As shown in FIG. 9A, the terminal serves as an EAP client, and an authorization request of the terminal may be forwarded to the EAP device end. The EAP device end may initiate EAP authentication on the EAP client, and exchange an EAP authentication packet with the EAP client. In addition, the EAP device end transmits an authentication-related packet to the authentication node in an EAP relay mode or an EAP termination mode. The EAP device end may transmit the authentication-related packet to the authentication node by using a RADIUS protocol or a diameter protocol.

In this embodiment, the CPE or the terminal device served by the CPE may be considered as a terminal, that is, the EAP client. Certainly, in addition to the EAP authorization protocol shown in FIG. 9A, the CPE or the terminal device served by the CPE may alternatively access a network by using another type of protocol. In the following embodiment, the EAP is used as an example to describe a network access authorization process of the CPE or the terminal device served by the CPE. However, it should not be understood that only the EAP protocol can be used to perform network access authorization of the CPE or the terminal device served by the CPE.

To support the authorization protocol to be borne on a mobile network side by using a NAS protocol, in this embodiment of this application, there are three methods for carrying an authorization-protocol-related message by using a NAS message. For understanding of details, refer to the three types of NAS messages in the foregoing embodiments.

A process of transmitting a message related to the EAP authorization protocol in a mobile core network, and between the mobile core network and a network device having an authorization and authentication function may include:

A node in the mobile core network, such as an MME or a mobile gateway in a 4G network, or an AMF or an SMF in a 5G network, serving as a node (which may be referred to as an EAP device end for short, that is, an EAP authenticator) having an EAP proxy function, can support a RADIUS/diameter protocol and the EAP protocol, exchange an EAP message with a terminal, and transfer an authentication-related packet with a network device having an authorization and authentication function, for example, an AAA server. Alternatively, a node in the mobile core network, serving as a relay, can support a RADIUS/diameter protocol, and transmit an EAP message between a terminal and an EAP device end. An authentication-related packet may be transmitted, by using the RADIUS/diameter protocol, between the EAP device end and a network device having an authentication and authorization function.

Figure 9B:
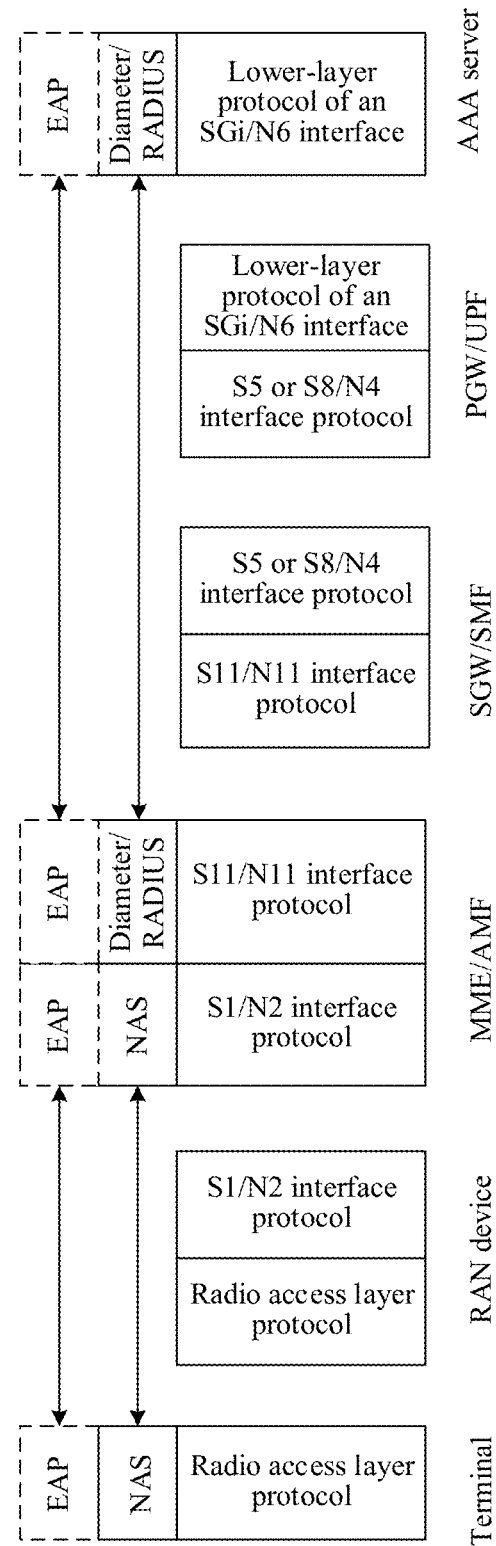
FIG. 9B is a schematic diagram of an example of a device protocol stack according to an embodiment of this application.
Figure 9C:
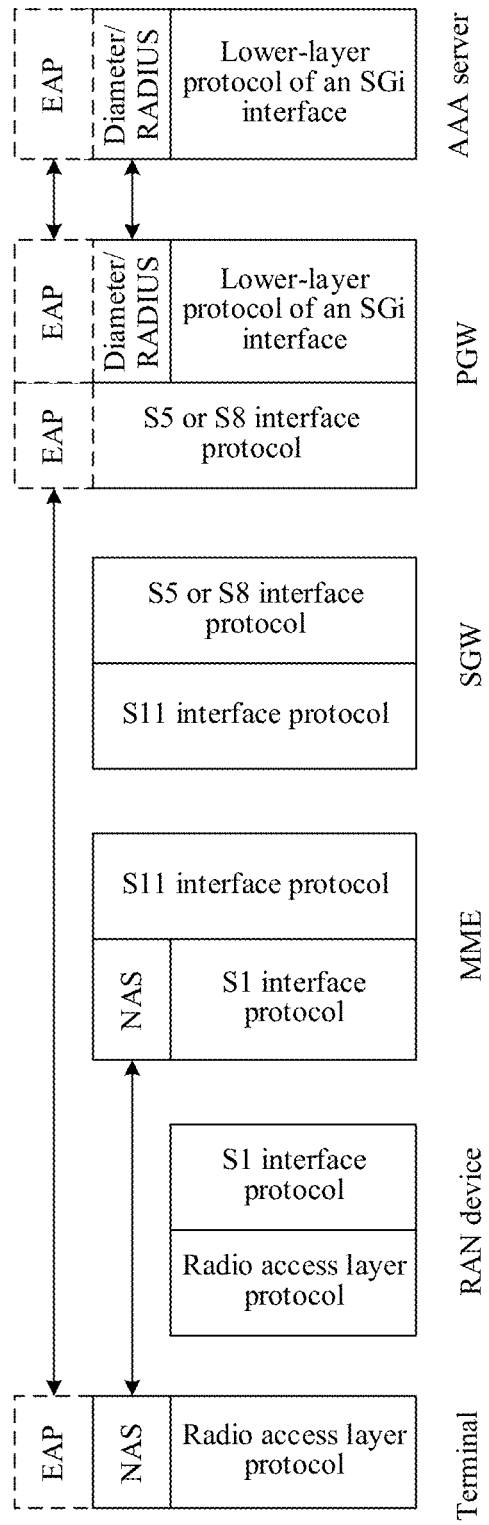
FIG. 9C is a schematic diagram of another example of a device protocol stack according to an embodiment of this application.
Figure 9D:
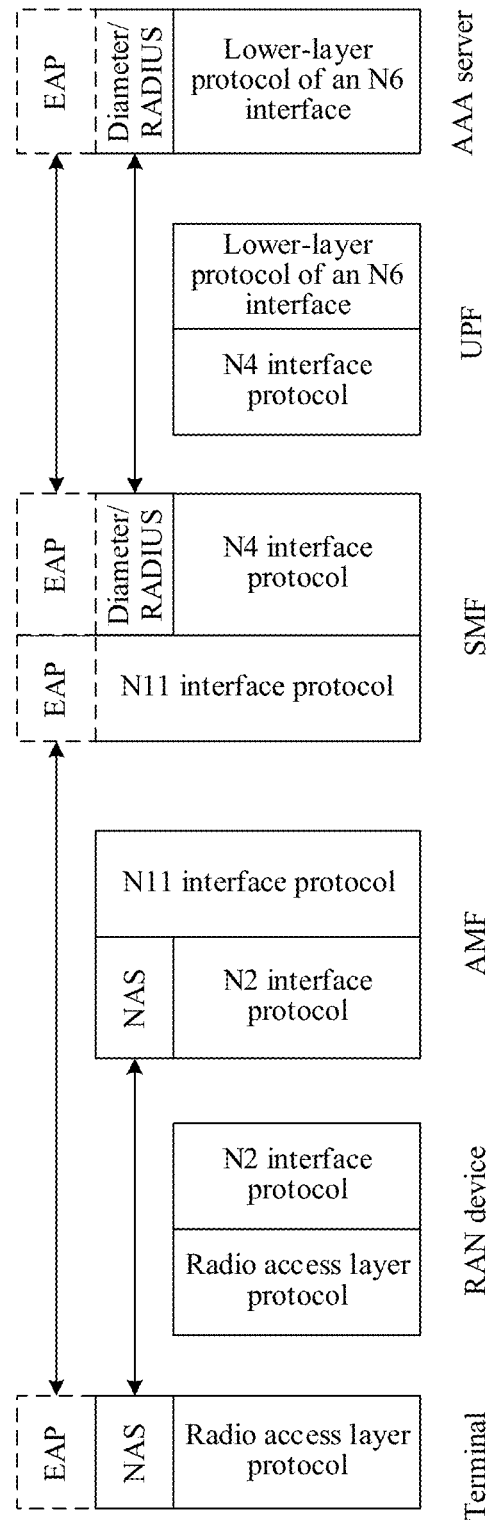
FIG. 9D is a schematic diagram of another example of a device protocol stack according to an embodiment of this application.
Figure 9E:
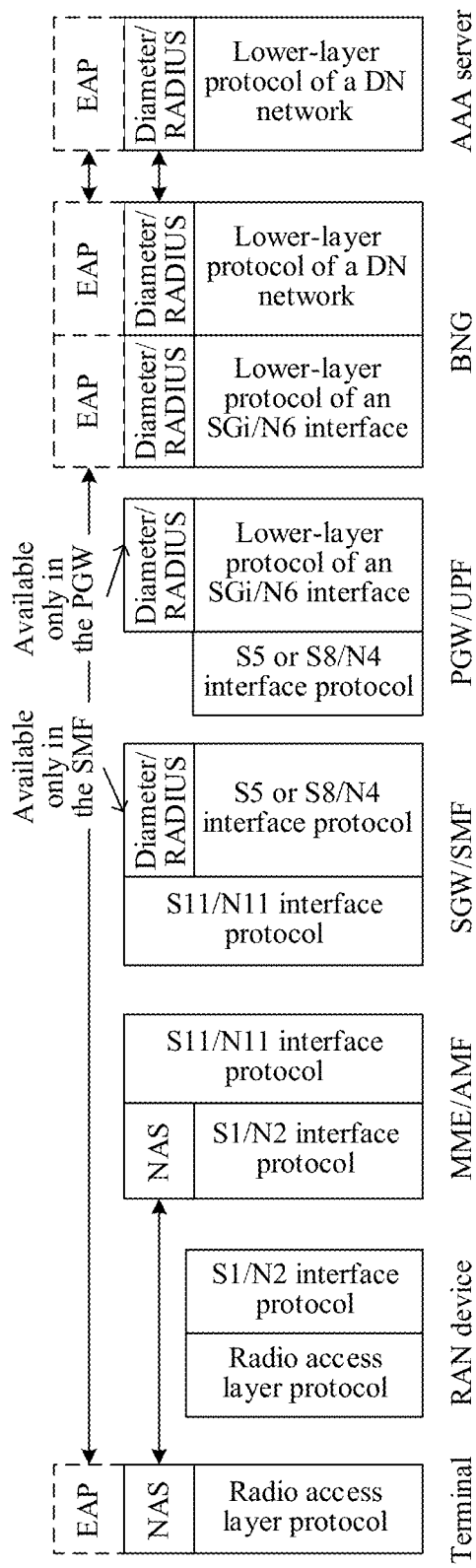
FIG. 9E is a schematic diagram of another example of a device protocol stack according to an embodiment of this application.

In the 4G network and the 5G network, protocol layers in protocol stacks of devices are different. For example, FIG. 9B shows protocol stacks of devices related to an authorization process in which an MME/AMF is used as an EAP device end in a 4G/5G network. FIG. 9C shows a possible example of protocol stacks of devices related to an authorization process in which a mobile gateway is used as an EAP device end in a 4G network. FIG. 9D shows a possible example of protocol stacks of devices related to an authorization process in which an SMF serves as an EAP device end in a 5G network. FIG. 9E shows a possible example of protocol stacks of devices related to an authorization process in which a BNG serves as an EAP device end and interconnects with a 4G/5G network.

Protocol layers included in a protocol stack of each device in FIG. 9B include: A protocol stack of a terminal includes a plurality of protocol layers of a 4G/5G radio access layer and a NAS protocol layer, and in one embodiment, further includes an EAP protocol layer; a protocol stack of a RAN device in the 4G network includes a plurality of protocol layers (for example, PDCP, RLC, MAC, and PHY) of a radio access layer and a plurality of protocol layers of an S1 control plane interface; a protocol stack of a RAN device in the 5G network includes a plurality of protocol layers (for example, SDAP, PDCP, RLC, MAC, and PHY) of a radio access layer and a plurality of protocol layers of an N2 interface; a protocol stack of an MME in the 4G network includes a plurality of protocol layers of an S1 control plane interface, a NAS protocol layer, a plurality of protocol layers of an S11 interface, and a diameter/RADIUS protocol layer, and in one embodiment further includes an EAP protocol layer; a protocol stack of an AMF in the 5G network includes a plurality of protocol layers of an N2 interface, a NAS protocol layer, a plurality of protocol layers of an N11 interface, and a diameter/RADIUS protocol layer, and in one embodiment further includes an EAP protocol layer; a protocol stack of an SGW in the 4G network includes a plurality of protocol layers of an S11 interface and a plurality of protocol layers of an S5/S8 interface; a protocol stack of an SMF in the 5G network includes a plurality of protocol layers of an N11 interface and a plurality of protocol layers of an N4 interface; a protocol stack of a PGW in the 4G network includes a plurality of protocol layers of an S5/S8 interface and a lower-layer (for example, a layer 1 to a layer 4) protocol layer of an SGi interface; a protocol stack of a UPF in the 5G network includes a plurality of protocol layers of an N4 interface and a lower-layer protocol layer of an N6 interface; a protocol stack of an AAA server includes a diameter/RADIUS protocol layer, and in one embodiment further includes an EAP protocol layer; and during interconnection with the 4G network, the protocol stack of the AAA server further includes a lower-layer protocol layer of the SGi interface; or during interconnection with the 5G network, the protocol stack of the AAA server further includes a lower-layer protocol layer of the N6 interface.

Protocol layers included in a protocol stack of each device in FIG. 9C include: A protocol stack of a terminal includes a plurality of protocol layers of a radio access layer and a NAS protocol layer, and in one embodiment further includes an EAP protocol layer; a protocol stack of a RAN device includes a plurality of protocol layers of a radio access layer and a plurality of protocol layers of an S1 control plane interface; a protocol stack of an MME includes a plurality of protocol layers of an S1 control plane interface, a plurality of protocol layers of an S11 interface, and a NAS protocol layer; a protocol stack of an SGW includes a plurality of protocol layers of an S11 interface and a plurality of protocol layers of an S5/S8 interface; a protocol stack of a PGW includes a plurality of protocol layer of an S5/S8 interface, a lower-layer protocol layer of an SGi interface, and a diameter/RADIUS protocol layer, and in one embodiment further includes an EAP protocol layer; a protocol stack of an AAA server includes a lower-layer protocol layer of an SGi interface and a diameter/RADIUS protocol, and in one embodiment further includes an EAP protocol layer.

Protocol layers included in a protocol stack of each device in FIG. 9D include: A protocol stack of a terminal includes a plurality of protocol layers of a radio access layer and a NAS protocol layer, and in one embodiment further includes an EAP protocol layer; a protocol stack of a RAN device includes a plurality of protocol layers of a radio access layer and a plurality of protocol layers of an N2 interface; a protocol stack of an AMF includes a plurality of protocol layers of an N2 interface and a plurality of protocol layers of an N11 interface; a protocol stack of an SMF includes a plurality of protocol layers of an N11 interface, a plurality of protocol layers of an N4 interface, and a diameter/RADIUS protocol layer, and in one embodiment further includes an EAP protocol layer; a protocol stack of a UPF includes a plurality of protocol layer of an N4 interface and a lower-layer protocol layer of an N6 interface; a protocol stack of an AAA server includes a lower-layer protocol layer of an N6 interface and a diameter/RADIUS protocol, and in one embodiment further includes an EAP protocol layer.

Protocol layers included in a protocol stack of each device in FIG. 9E include: A protocol stack of a terminal includes a plurality of protocol layers of a 4G/5G radio access layer and a NAS protocol layer, and in one embodiment further includes an EAP protocol layer; a protocol stack of a RAN device in the 4G network includes a plurality of protocol layers (for example, PDCP, RLC, MAC, and PHY) of a radio access layer and a plurality of protocol layers of an S1 control plane interface; a protocol stack of a RAN device in the 5G network includes a plurality of protocol layers (for example, SDAP, PDCP, RLC, MAC, and PHY) of a radio access layer and a plurality of protocol layers of an N2 interface; a protocol stack of an MME in the 4G network includes a plurality of protocol layers of an S1 control plane interface, a NAS protocol layer, and a plurality of protocol layers of an S11 interface; a protocol stack of an AMF in the 5G network includes a plurality of protocol layers of an N2 interface, a NAS protocol layer, and a plurality of protocol layers of an N11 interface; a protocol stack of an SGW in the 4G network includes a plurality of protocol layers of an S11 interface and a plurality of protocol layers of an S5/S8 interface; a protocol stack of an SMF in the 5G network includes a plurality of protocol layers of an N11 interface, a plurality of protocol layers of an N4 interface, and a diameter/RADIUS protocol layer; a protocol stack of a PGW in the 4G network includes a plurality of protocol layers of an S5/S8 interface, a lower-layer protocol layer of an SGi interface, and a diameter/RADIUS protocol layer; a protocol stack of a UPF in the 5G network includes a plurality of protocol layers of an N4 interface and a lower-layer protocol layer of an N6 interface; a protocol stack of a BNG includes a lower-layer protocol layer of an SGi/N6 interface, a lower-layer protocol layer of a DN network, and a diameter/RADIUS protocol layer, and in one embodiment further includes an EAP protocol layer; a protocol stack of an AAA server includes a lower-layer protocol layer of a DN network and a diameter/RADIUS protocol layer, and in one embodiment further includes an EAP protocol layer.

In FIG. 9B to FIG. 9E, protocol stacks of devices involved in the figures are different. The protocol stacks are related to the 4G or 5G network, and also are related to a device serving as an EAP device end.

Authentication processes in FIG. 9B to FIG. 9E may include the following content.

For example, referring to FIG. 9B, in the 4G network, the terminal carries an EAP message by using a NAS message, and the MME serves as the EAP device end. The MME decapsulates an uplink NAS message sent by the terminal, then encapsulates the EAP message into a RADIUS protocol message or a diameter protocol message in an EAP relay mode, and sends the message to a network device having an authorization and authentication function. Alternatively, the MME extracts authorization-related information from the EAP message in an EAP termination mode, directly writes the authorization-related information into a RADIUS protocol message or a diameter protocol message, and sends the message to a network device having an authorization and authentication function. It should be noted that, when the EAP message is transmitted between the MME and the network device having the authentication and authentication function, the EAP message may need to be forwarded by using, for example, some nodes in the mobile gateway, the BNG, and other routing nodes. A reverse downlink EAP message is also transmitted between segments in a similar manner.

For another example, in the 4G network, referring to FIG. 9C, the terminal carries an EAP message by using a NAS message, and a mobile gateway serves as the EAP device end. In this case, in a mobile network, a GTP tunnel is established between the MME and the mobile gateway, and may bear various EAP messages. The GTP tunnel may be a user plane GTP-U tunnel, or may be a control plane GTP-C tunnel. The MME decapsulates an uplink NAS message sent by the terminal, and then sends the EAP message to the mobile gateway. Similarly, the mobile gateway also sends a downlink EAP message to the MME. It should be noted that, to support transmission of an EAP authorization message through the GTP tunnel on an interface between the MME and the mobile gateway, a new tunnel may be established between the MME and the mobile gateway, and it is determined that a type of the tunnel is used to send the EAP authorization message. Alternatively, the established tunnel may still be used, and a special identifier is added to a header (for example, a GTP/UDP/IP packet header) of a data packet tunnel to indicate that content transmitted in the tunnel is the EAP authorization message. Between the mobile gateway and a network device having an authorization and authentication function, in an EAP relay mode, the EAP message may be directly encapsulated into a RADIUS protocol message or a diameter protocol message, and transmitted between the mobile gateway and the network device having the authorization and authentication function; or in an EAP termination mode, the mobile gateway may extract authorization-related information from the EAP message, and directly write the authorization-related information into a RADIUS protocol message or a diameter protocol message for transmission. A reverse downlink EAP message is also transmitted between segments in a similar manner.

For still another example, in the 5G network, referring to FIG. 9D, the terminal carries an EAP message by using a NAS message, and after decapsulating an uplink NAS message sent by the terminal, the AMF sends related content of the EAP message in the NAS message to the SMF. The SMF serves as the EAP device end, encapsulates the EAP message into a RADIUS protocol message or a diameter protocol message in an EAP relay mode, and sends the message to a network device having an authorization and authentication function in a DN. Alternatively, the SMF extracts authorization-related information from the EAP message in an EAP termination mode, directly writes the authorization-related information into a RADIUS protocol message or a diameter protocol message, and sends the message to a network device having an authorization and authentication function. It should be noted that, when the EAP message is transmitted between the SMF and the network device having the authentication and authentication function in the DN, the EAP message may need to be forwarded by using, for example, some nodes in the UPF, the BNG, and other routing nodes. A reverse downlink EAP message is also transmitted between segments in a similar manner.

For yet another example, in the 5G network, referring to FIG. 9D, the terminal carries an EAP message by using a NAS message, and the AMF serves as the EAP device end. The AMF decapsulates an uplink NAS message sent by the terminal, then encapsulates the EAP message into a RADIUS protocol message or a diameter protocol message in an EAP relay mode, and sends the message to a network device having an authorization and authentication function in a DN. Alternatively, the AMF extracts authorization-related information from the EAP message in an EAP termination mode, directly writes the authorization-related information into a RADIUS protocol message or a diameter protocol message, and sends the message to a network device having an authorization and authentication function. It should be noted that, when the EAP message is transmitted between the AMF and the network device having the authentication and authentication function in the DN, the EAP message may need to be forwarded by using, for example, some nodes in the SMF, the UPF, the BNG, and other routing nodes. A reverse downlink EAP message is also transmitted between segments in a similar manner.

For still yet another example, in the 4G or 5G network, referring to FIG. 9E, the terminal carries an EAP message by using a NAS message, and a network device outside the mobile network, such as the BNG, serves as the EAP device end. After decapsulating the NAS message, the core network node MME/AMF sends related content of the EAP message in the NAS message to a mobile gateway/the SMF. The mobile gateway/SMF communicates with the EAP device end (for example, the BNG) by using the RADIUS/diameter protocol, and encapsulates the related content of the received EAP message into a RADIUS protocol message or a diameter protocol message, and sends the message to the EAP device end (for example, the BNG). The EAP device end sends an EAP authorization message to a network device having an authorization and authentication function in an EAP relay mode or an EAP termination mode. It should be noted that, the mobile gateway/SMF may need to forward a message to the EAP device end such as the BNG by using the UPF and/or another routing node. A reverse downlink EAP message is also transmitted between segments in a similar manner.

With reference to FIG. 9A to FIG. 9E, the descriptions of the transmission modes of the EAP authorization message between segments in the foregoing paragraphs are applicable to authorization on a plurality of terminals in an EAP authorization mode. The terminal is not limited to the CPE authorization scenario described above. For example, the terminal may be a typical terminal in WTTx, for example, the CPE, may be a typical mobile terminal such as a mobile phone, may be a terminal that accesses a network by using a mobile terminal, for example, various wearable devices, or may be various terminals that access a network by using the CPE, for example, an STB or a PC. In one embodiment, the EAP authorization message transmitted between the terminal and a mobile core network device (for example, the MME/AMF) by using the NAS message may be a related message used for authorization on the terminal, or may be a related message used for authorization on another terminal device served by the terminal.

Figure 10B:
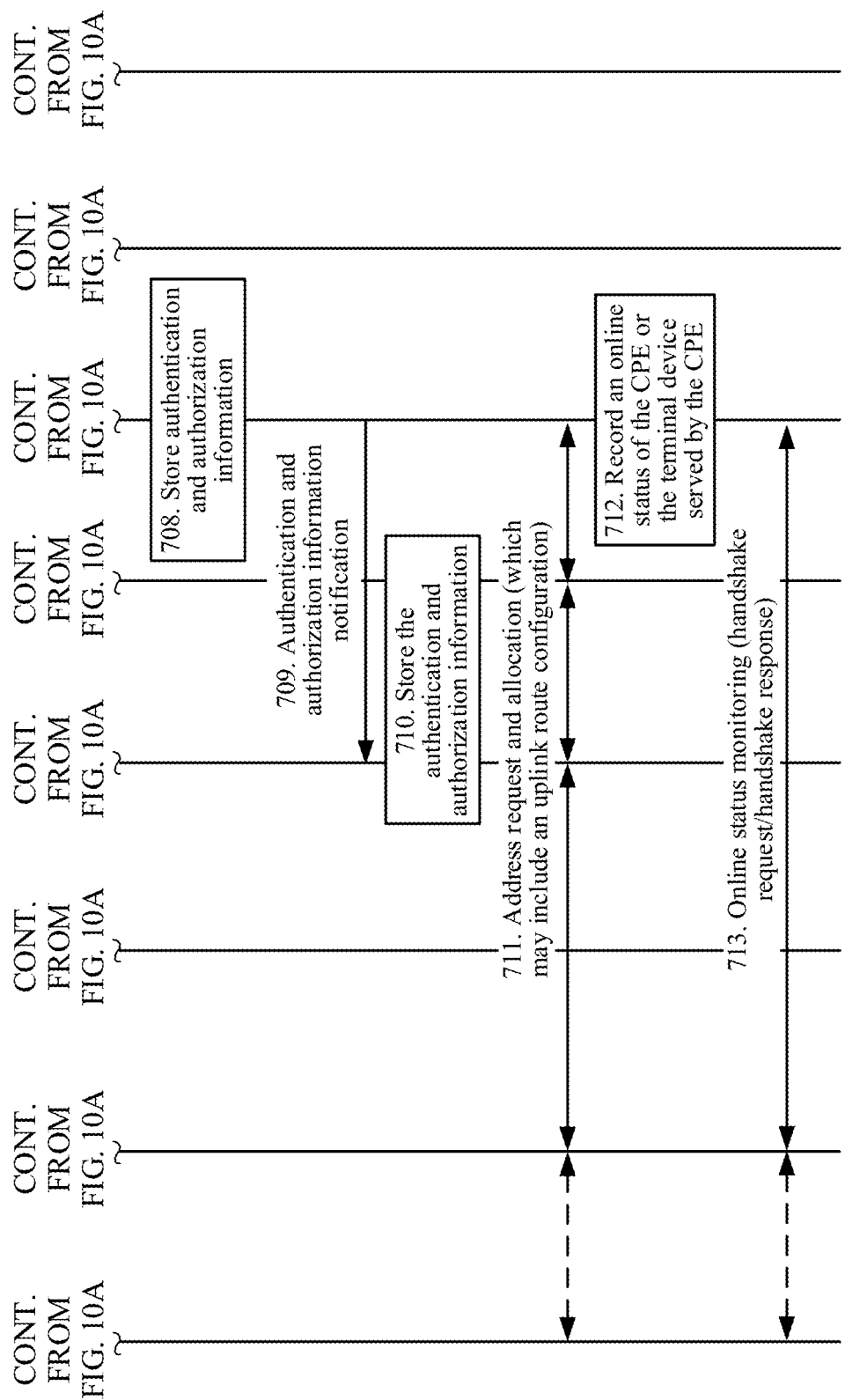

The following describes the solution 1 in the part 2 in the embodiments of this application with reference to schematic diagrams of authorization protocol frameworks shown in FIG. 9A to FIG. 9E (in which FIG. 9E prevails) and a flowchart of network access shown in FIG. 10A and FIG. 10B.

As shown in FIG. 10A and FIG. 10B, another embodiment of a method for network access by a device according to the embodiments of this application includes the following operations.

701. A CPE sends a NAS message including an authorization request and/or an authorization type indication information to an MME by using a RAN device.

The authorization request may be an access request, a connection request, an authorization request, an address allocation request, or another type of information that indicates a network access intention, sent by the CPE or a terminal device served by the CPE to a network when the CPE or the terminal device served by the CPE accesses the network. For brevity, all these are collectively referred to as an authorization request. The authorization type indication information may include an identifier indication of an authorization mode and/or an identifier indication of an authorization protocol.

702. The MME identifies a required authorization mode (for example, an EAP) based on the authorization type indication information in the NAS message.

The MME establishes a channel for transmitting a message carrying an authorization-related message (for example, an EAP message) with an appropriate mobile gateway, for example, establishes a GTP-U/C tunnel. In one embodiment, based on an authorization requirement, the mobile gateway establishes a connection with a network device (for example, the EAP device end: the BNG in FIG. 9E) in an external network. This operation may be omitted if the channel and/or connection is pre-existing.

703. The MME sends a message, such as a connection request message, to a network device (for example, a broadband network gateway BNG) in an external network by using a mobile gateway.

The message may include the authorization request of the CPE or the terminal device served by the CPE or a key parameter in the authorization request. In one embodiment, the connection request message includes an identifier of the CPE and/or the terminal device served by the CPE. The identifier may be allocated by a mobile core network node such as the MME, or may be generated by the CPE and/or the terminal device served by the CPE, or may be an identifier preset in the CPE and/or the terminal device served by the CPE.

704. Trigger authorization and authentication.

There are the following three possible modes.

Mode 1: A mobile core network node having an EAP proxy capability, for example, the MME, serves as the EAP device end, generates a message (for example, an EAP-request/identity message) for triggering authorization, adds the message to the NAS message, and sends the NAS message to the CPE or the terminal device served by the CPE, to trigger an authorization and authentication process. Alternatively, the mobile gateway such as a PGW serves as the EAP device end, and after receiving the connection request, may send a message (for example, an EAP-request/identity message) for triggering authorization, add the message to the NAS message by using the MME, and send the NAS message to the CPE or the terminal device served by the CPE, to trigger an authorization and authentication process.

Mode 2: As shown in FIG. 10A and FIG. 10B, if the EAP device end is not in a mobile network, a mobile core network node may alternatively send a message (for example, a "device connection establishment request message") to the EAP device end (for example, the BNG) in the external network, to instruct the EAP device end (for example, the BNG) to trigger an authorization and authentication process for the CPE or the terminal device served by the CPE. After receiving the message, the EAP device end (for example, the BNG) sends, to the CPE or the terminal device served by the CPE, a message (for example, an EAP-request/identity message) for triggering authorization, to trigger the authorization and authentication process.

Mode 3: In addition, the CPE or the terminal device served by the CPE may alternatively use an EAP-start message as an authorization request, add the EAP-start message to the NAS message, and send the NAS message. After receiving the EAP-start message, the EAP device end (for example, a management function entity, the gateway device, or the BNG) is triggered to perform an EAP authorization and authentication process, and sends a message (for example, an EAP-request/identity message) to the CPE or the terminal device served by the CPE, to perform the authorization and authentication process.

705. The CPE sends a NAS message including an EAP authentication response to the MME by using the RAN device.

The EAP authentication response, such as an EAP-response/identity message, is generated by the CPE or the terminal device served by the CPE. In one embodiment, information such as a network access identifier (NAI for short) and an identifier of the CPE or the terminal device served by the CPE may be added to the EAP authentication response. The EAP authentication response message is transmitted to the EAP device end (for example, the BNG) by using the mobile core network node.

706. The EAP device end (for example, the BNG) sends an access authentication request to an authentication server.

For example, the BNG sends the access authentication request, such as a RADIUS access-request message, to the AAA server, where the request may carry the EAP-response/identity message. In one embodiment, the BNG may encapsulate the EAP-response/identity message into an EAPoR packet in an EAP relay mode, or encapsulate authentication-related information included in the EAP-response/identity message into a standard RADIUS packet in an EAP termination mode.

707. Perform authentication on the CPE or the terminal device served by the CPE.

Based on information (for example, information related to a user/device/terminal) included in the access authentication request, the authentication server selects or determines an applicable authorization protocol. For example, the authentication server may interact with a device, such as an HSS, that stores user information to search for user matching information, and then determines a used EAP authorization protocol. The EAP authorization protocol may include, but is not limited to, EAP-AKA, EAP-AKA', EAP-SIM, EAP-TLS, EAP-MD5, EAP-TTLS, EAP-OTP, and the like that are defined in an IETF RFC. Then, mutual authentication is performed on a related packet between the authentication server and the EAP device end and between the EAP device end and the CPE or the terminal device served by the CPE, to complete the authentication process. A mode for bearing a message in the authorization process in each segment is the same as that described in the foregoing operations. In this embodiment, an EAP-AKA mode is used as an example to briefly describe the authentication process for the CPE. It should be noted that, for understanding of an authentication process for the terminal device served by the CPE, refer to the description of the authentication process in operation 707, and a difference lies in that the CPE needs to send the authorization-related message included in the received NAS message to the terminal device served by the CPE, and needs to send, to the MME, an uplink NAS message that includes the authorization-related message and that is generated by the terminal device served by the CPE.

If an EAP-AKA protocol is used, an authentication process of the authentication server AAA server, for the CPE is as follows:

The AAA server responds to an authentication request packet of the EAP device end, and initiates a challenge to the CPE, where the challenge includes an EAP-request/AKA-identity packet.

The EAP device end (for example, the BNG) forwards the EAP-request/AKA-identity packet to the mobile core network node such as the mobile gateway. Then, the MME adds the EAP-request/AKA-identity packet to the NAS message, and sends the message to the CPE.

After receiving the message, the CPE returns an EAP-response/AKA-identity response message to the EAP device end (for example, the BNG) by using the mobile core network node (for example, the MME and/or the mobile gateway).

The EAP device end (for example, the BNG) encapsulates an EAP-response/AKA-identity response packet into a RADIUS access-request packet and transmits the RADIUS access-request packet to the AAA server.

The AAA server requests an authorization vector corresponding to the CPE from the HSS based on a device ID of the CPE, for example, an IMSI, that is included in the EAP-response/AKA-identity message. The HSS generates the corresponding authorization vector {RAND, XRES, CK, IK, AUTN}, and then sends the authorization vector to the AAA server.

The AAA server sends an authorization parameter required by the CPE to the CPE by using an EAP-request/AKA-challenge message and by using a mobile core network node (for example, the MME and/or the mobile gateway) and the EAP device end such as the BNG.

The CPE verifies the authorization parameter by running an AKA algorithm, to verify validity of the network, calculates a new authorization parameter including an RES and a MAC (Message Authentication Code) value, and feeds back an EAP-response/AKA-challenge response message to the EAP device end (for example, the BNG). Then, the EAP device end (for example, the BNG) sends the EAP-response/AKA-challenge response message to the AAA server.

The AAA server verifies the received new MAC and compares whether the XRES is consistent with the RES.

After the verification succeeds, the AAA server sends an EAP-request/AKA-notification message to the CPE by using the EAP device end (for example, the BNG) and the mobile core network node (for example, the mobile gateway and/or the MME).

The CPE sends an EAP-response/AKA-notification message to the AAA server by using the mobile core network node (for example, the MME and/or the mobile gateway) and the EAP device end such as the BNG.

The AAA server stores information related to an access session, sends a subscriber profile retrieval (optional) to the HSS, generates an EAP-success message, and notifies the CPE by using the EAP device end (for example, the BNG) and the mobile core network node (for example, the MME and/or the mobile gateway).

708. After an EAP authentication and authorization succeeds, the EAP device end (for example, the BNG) stores authentication and authorization information of the CPE. If the authentication fails, the EAP device end (for example, the BNG) notifies, by using the mobile core network node (for example, the mobile gateway and/or the MME) and the RAN device, the CPE or the terminal device served by the CPE that the authentication fails, and the procedure ends.

709. The EAP device end (for example, the BNG) sends an authentication and authorization information notification to the mobile core network node (for example, the MME and/or the mobile gateway).

710. The mobile core network node (for example, the MME and/or the mobile gateway) stores the authentication and authorization information of the CPE or the terminal device served by the CPE. There are the following possible implementations.

If the mobile core network node (for example, the MME and/or the mobile gateway) has an EAP proxy capability, the mobile core network node may serve as the EAP device end, and when receiving the EAP-success information, store the authentication and authorization information that is in the EAP-success information.

Alternatively, referring to operation 709, the BNG may send the "authentication and authorization information" notification to the mobile core network node (for example, the MME and/or the mobile gateway) by using a RADIUS/diameter protocol message and then store the notification.

In one embodiment, an EPS bearer (including an air interface bearer, an S1 bearer, and an S5/S8 bearer that are from the RAN device to the CPE) from the CPE to the mobile gateway may continue to be established for subsequent communication. For a specific establishment process, refer to the prior art.

711. Allocate an IP address to the CPE or the terminal device served by the CPE.

The CPE or the terminal device served by the CPE may initiate an IP address allocation request, add the request to the NAS message, and transmit the NAS message to the MME. Then, the MME sends the NAS message to the mobile gateway. In one embodiment, if the authorization request in operation 701 already includes the address allocation request, the CPE or the terminal device served by the CPE does not need to send the address allocation request again.

The mobile gateway may allocate an IP address to the CPE or the terminal device served by the CPE, or the mobile gateway may initiate a DHCP address allocation request to the network device such as the BNG. The BNG may allocate an IP address to the CPE or the terminal device served by the CPE, or request a DHCP server to allocate an IP address, and then the BNG returns the allocated IP address to the mobile gateway. A packet (for example, a DHCP offer and/or a DHCP ACK) returned by the network device may carry reference information used for route configuration of the CPE (for example, the reference information of the route configuration is added to an extended field option 121).

The mobile gateway may return, by using the MME, an address allocation result to the CPE or the terminal device served by the CPE that initiates the request. If the packet returned by the network device includes the reference information used for route configuration of the CPE, the mobile gateway may generate route configuration information based on the reference information. The route configuration information is included in a notification message sent by the mobile gateway to the CPE by using the MME. For understanding of the reference information used for route configuration of the CPE and the route configuration information, refer to the descriptions in operation 109 and operation 110.

712. The BNG records an online status of the CPE or the terminal device served by the CPE.

713. The BNG may periodically query, by using a handshake request (EAP-request/identity) handshake message, the online status of the CPE or the terminal device served by the CPE, and the online CPE or terminal device served by the CPE may respond by using a handshake response (EAP-response/identity).

The foregoing describes a process in which the CPE or the terminal device served by the CPE in FIG. 10A and FIG. 10B completes the network access by using a 4G mobile network. The following describes the solution 2 in the part 2 with reference to FIG. 9A to FIG. 9E (in which the FIG. 9E prevails) and FIG. 11A and FIG. 11B, in one embodiment, a process in which a CPE or a terminal device served by the CPE completes network access by using a 5G mobile network.

Figure 11A:
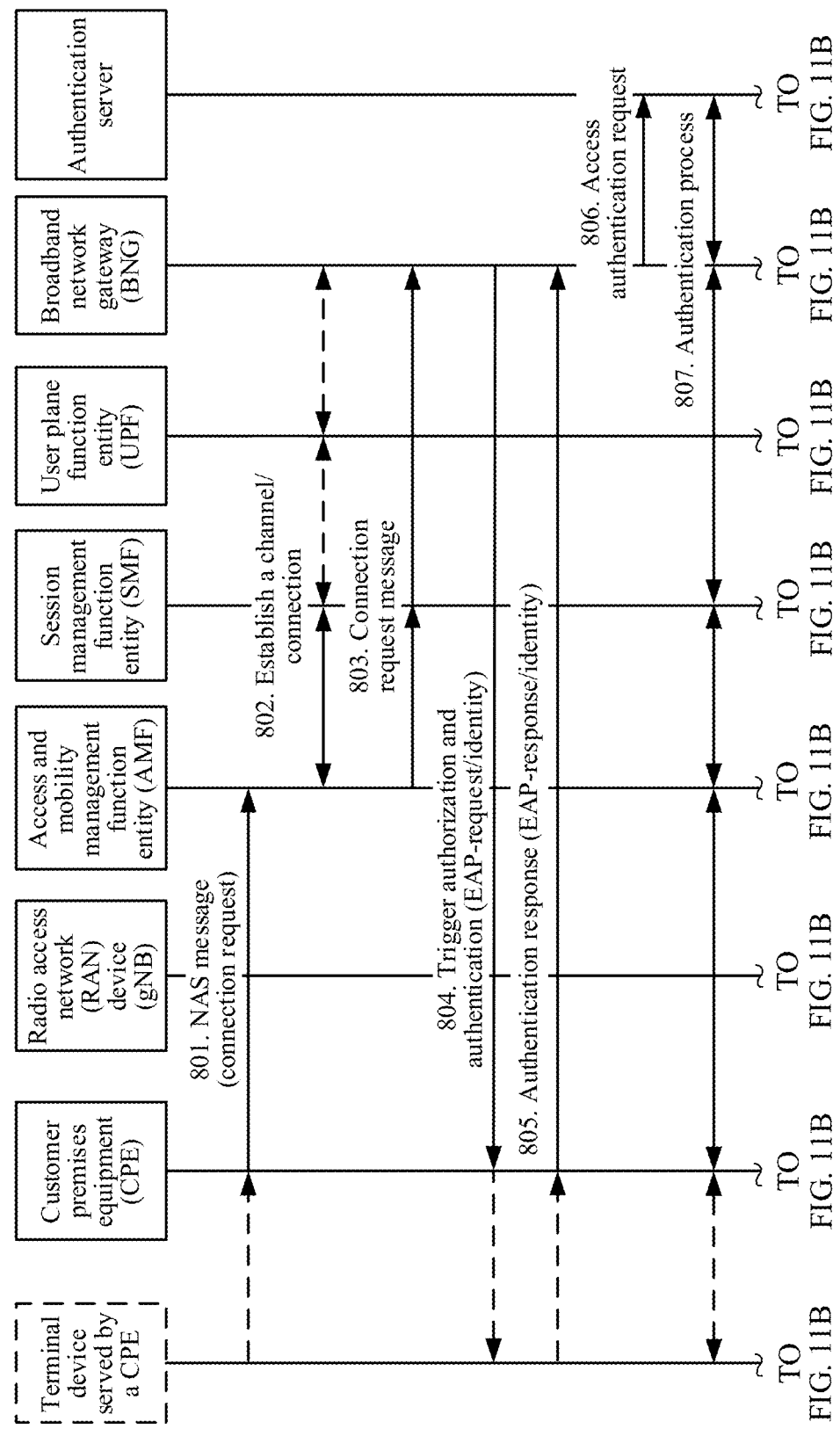

As shown in FIG. 11A and FIG. 11B, another embodiment for a method used by a device to access a network provided in an embodiment of this application includes the following operations.

801. A CPE sends a NAS message including an authorization request and/or an authorization type indication information to an AMF by using a RAN device.

The authorization request may be an access request, a connection request, an authorization request, an address allocation request, or another type of information that indicates a network access intention, sent by the CPE or a terminal device served by the CPE to a network when the CPE or the terminal device served by the CPE accesses the network. For brevity, all these are collectively referred to as an authorization request. The authorization type indication information may include an identifier indication of an authorization mode and/or an identifier indication of an authorization protocol.

802. The AMF identifies a required authorization mode (for example, an EAP) based on the authorization type indication information in the NAS message.

The AMF selects an appropriate SMF, and establishes a channel for bearing an EAP message with the SMF. In one embodiment, based on an authorization requirement, the SMF selects an appropriate UPF, and establishes a connection to a network device (for example, the EAP device end: the BNG, in FIG. 9E) in an external network by using the UPF. This operation may be omitted if the channel/connection is pre-established.

803. The AMF sends a message (for example, a request/acknowledgement/transmission message) to an SMF, where the message may include the authorization request of the CPE or the terminal device served by the CPE or a key parameter in the authorization request.

Then, the SMF sends a message to a network device such as a BNG in a DN by using the UPF. The message (which may be, for example, a "connection request message) may include the authorization request of the CPE or the terminal device served by the CPE or the key parameter in the authorization request. In one embodiment, the message includes an identifier of the CPE or the terminal device served by the CPE. The identifier may be allocated by a mobile core network node such as the AMF or the SMF, or may be generated by the CPE or the terminal device served by the CPE, or may be an identifier preset in the CPE or the terminal device served by the CPE.

804. Trigger authorization and authentication. There are the following three possible modes.

Mode 1: A mobile core network node having an EAP proxy capability, for example, the AMF, serves as the EAP device end, generates a message (for example, an EAP-request/identity message) for triggering authorization, adds the message to the NAS message, and sends the NAS message to the CPE or the terminal device served by the CPE, to trigger an authorization and authentication process. Alternatively, the SMF serves as the EAP device end, and after receiving the connection request, may send a message (for example, an EAP-request/identity message) for triggering authorization to the AMF, and the AMF adds the message (for example, the EAP-request/identity message) for triggering authorization to the NAS message, and send the NAS message to the CPE, to trigger an authorization and authentication process.

Mode 2: As shown in FIG. 11A and FIG. 11B, if the EAP device end is not in a mobile network, a mobile core network node such as the SMF may alternatively send a message (for example, a "device connection establishment request" message) to the EAP device end such as the BNG in the external network, to instruct the BNG to trigger an authorization and authentication process for the CPE or the terminal device served by the CPE. After receiving the message, the BNG sends, to the CPE or the terminal device served by the CPE, a message (for example, an EAP-request/identity message) for triggering authorization, to trigger the authorization and authentication process.

Mode 3: In addition, the CPE or the terminal device served by the CPE may alternatively use an EAP-start message as an authorization request, add the EAP-start message to the NAS message, and send the NAS message. After receiving the EAP-start message, the EAP device end (for example, a mobile core network node such as the AMF, the SMF, or the UPF, or an external network device such as the BNG) is triggered to perform an EAP authorization and authentication process, and sends a message (for example, an EAP-request/identity message) to the CPE to perform the authorization and authentication process.

805. The CPE sends a NAS message including an EAP authentication response by using the RAN device.

Information such as network access identifier information NAI and an identifier of the CPE or the terminal device served by the CPE may be added to the EAP authentication response, such as an EAP-response/identity message, and the EAP authentication response message is transmitted to the EAP device end (for example, the BNG) by using the mobile core network node (for example, the AMF and/or the SMF and/or the UPF).

If the EAP authentication response needs to be transmitted by using the SMF and the UPF, a connection needs to be established between the SMF and the UPF.

806. The EAP device end (for example, the BNG) sends an access authentication request to an authentication server.

For example, the BNG sends the access authentication request, such as a RADIUS access-request message, to the AAA server, where the request may carry the EAP-response/identity message. In one embodiment, the BNG may encapsulate the EAP-response/identity message into an EAPoR packet in an EAP relay mode, or encapsulate authentication-related information included in the EAP-response/identity message into a standard RADIUS packet in an EAP termination mode.

It should be noted that, in a process in which the EAP device end (for example, the AMF, the SMF, or the BNG) sends the access authentication request to the AAA server, the access authentication request may need to be forwarded by using, for example, some nodes in the SMF, the UPF, the BNG, and other routing nodes.

807. Perform authentication on the CPE or the terminal device served by the CPE.

For an authentication process, refer to the process in operation 707. For a mobile core network node involved in this process, a role of the mobile gateway is replaced by the SMF and the UPF, and a role of the MME is replaced by the AMF.

808. After an EAP authentication and authorization succeeds, the EAP device end (for example, the BNG) stores authentication and authorization information of the CPE. If the authentication fails, the EAP device end (for example, the BNG) notifies, by using the mobile core network node (for example, the UPF and/or the SMF and/or the AMF) and the RAN device, the CPE or the terminal device served by the CPE that the authentication fails, and the procedure ends.

809. The EAP device end (for example, the BNG) sends an authentication and authorization information notification to the mobile core network node (for example, the UPF and/or the SMF and/or the AMF).

810. The mobile core network node (for example, the UPF and/or the SMF and/or the AMF) stores the authentication and authorization information of the CPE or the terminal device served by the CPE.

There are the following implementations.

If the mobile core network node (for example, the UPF and/or the SMF and/or the AMF) has an EAP proxy capability, the mobile core network node may serve as the EAP device end, and when receiving EAP-success information, store the authentication and authorization information that is in the EAP-success information.

Alternatively, referring to operation 809, the BNG may send the "authentication and authorization information" notification to the mobile core network node (for example, the UPF and/or the SMF and/or the AMF) by using a RADIUS/diameter protocol message and then store the notification.

In one embodiment, a PDU session (including an air interface bearer and an N3 tunnel that are from the RAN device to the CPE), an N4 session, and the like between the CPE and the UPF may continue to be established. For understanding of a setup process, refer to the prior art, for example, a corresponding part in 3GPP TS23.502 V0.4.0.

811. Allocate an IP address to the CPE or the terminal device served by the CPE.

The CPE or the terminal device served by the CPE may initiate an IP address allocation request, add the request to the NAS message, and transmit the NAS message to the AMF. Then, the AMF sends the NAS message to the SMF. In one embodiment, if the authorization request in operation 801 already includes the address allocation request, the CPE or the terminal device served by the CPE does not need to send the address request again.

The SMF may allocate an IP address to the CPE or the terminal device served by the CPE, or the SMF may initiate a DHCP address allocation request to the network device such as the BNG by using the UPF. The BNG may allocate an IP address to the CPE or the terminal device served by the CPE, or request a DHCP server to allocate an IP address, and then return the allocated IP address to the SMF by using the UPF. A packet (for example, a DHCP offer and/or a DHCP ACK) returned by the network device may carry reference information used for route configuration of the CPE (for example, the reference information of the route configuration is added to an extended field option 121).

The SMF may return, by using the AMF, an address allocation result to the CPE or the terminal device served by the CPE that initiates the request. If the packet returned by the network device includes the reference information used for route configuration of the CPE, the SMF may generate route configuration information based on the reference message. The route configuration information is included in a notification message sent by the SMF to the CPE by using the AMF. For understanding of the reference information used for route configuration of the CPE and the route configuration information, refer to the descriptions in step 109 and step 110.

812. The BNG records an online status of the CPE or the terminal device served by the CPE.

813. The BNG may periodically query, by using a handshake request (EAP-request/identity) handshake message, the online status of the CPE or the terminal device served by the CPE, and the online CPE or terminal device served by the CPE may respond by using a handshake response (EAP-response/identity).

The foregoing describes a process in which the CPE or the terminal device served by the CPE in FIG. 11A and FIG. 11B completes the network access by using the 5G mobile network.

In the network access modes described above, the authorization mode is indicated by the authorization type indication information or an authentication mode is indicated by authentication type indication information. In one embodiment, a specific channel may be established between the CPE and the gateway device to send an authorization-related message. The channel may be a bearer or a transmission tunnel, or may be an APN/a DNN, a PDN connection, a PDU session, a network slice, or the like, provided that the channel can correspond to the authorization mode. A form of the channel is not limited in this embodiment of this application. When the channel is established, the CPE negotiates, with the gateway device, the authorization mode or the authorization protocol used for data in the channel. In this way, the authorization type indication information does not need to be transmitted when the authorization request of the terminal device is transmitted, or the authentication protocol type information does not need to be transmitted when the authentication request of the CPE is transmitted, provided that the authorization request or the authentication request is transmitted on a corresponding bearer based on a corresponding authorization mode. An authorization result may also be returned through the channel, or the authorization result may be returned by using other information defined by a system. In addition, for understanding of other steps of the authorization mode performed through the specific channel, refer to corresponding processes in the foregoing embodiments. Details are not described again in this embodiment of this application.

The foregoing describes a process in which a device accesses a network by using a mobile network. The following describes a process in which a device in a converged network architecture accesses a network in the embodiments of this application.

An architecture of a converged network in a 5G scenario in an embodiment of this application is described below with reference to FIG. 12.

Figure 12:
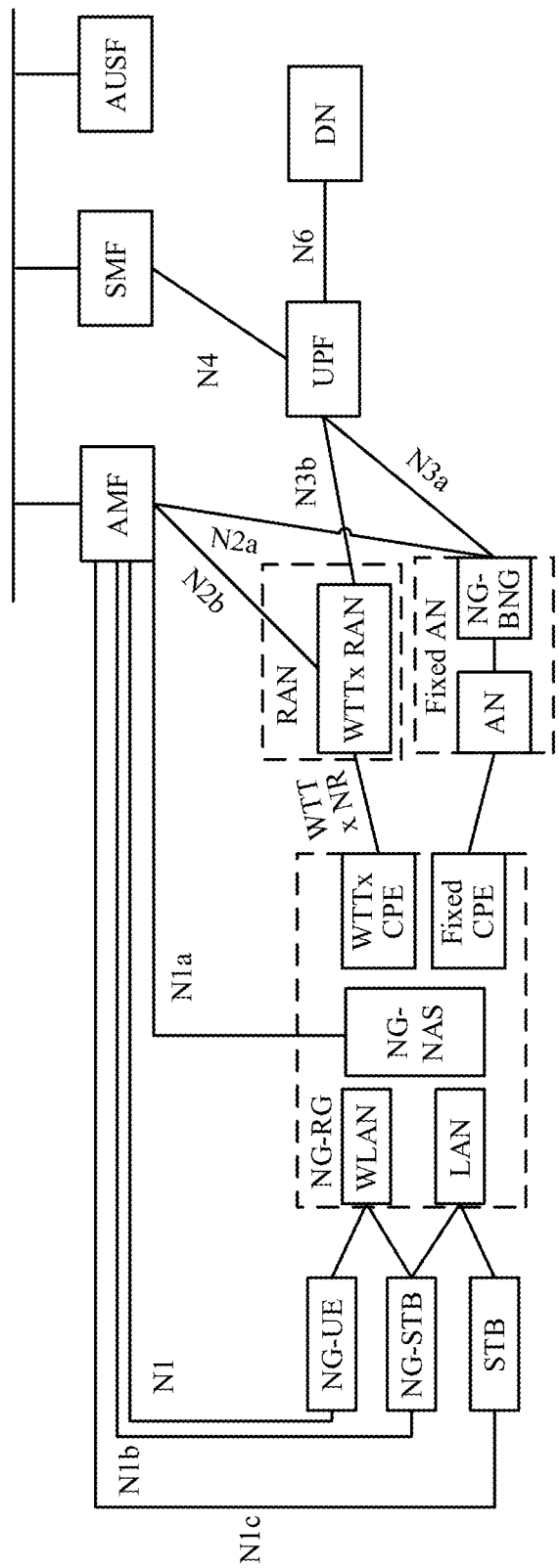
FIG. 12 is a schematic architectural diagram of a converged network according to an embodiment of this application.

As shown in FIG. 12, the converged network in the 5G scenario provided in this embodiment of this application includes:

various types of terminal devices that support an NAS protocol. A protocol stack of the terminal device may include, below a NAS layer, an Ethernet protocol layer, a local area network (including a LAN, a WLAN, and the like) protocol layer, a personal area network (PAN, such as Bluetooth and ZigBee), and a lower-layer protocol of an interconnection technology (D2D, microwave, infrared, or the like) between other devices. For example, in FIG. 12, an STB is a conventional fixed terminal (or referred to as a fixed network terminal or a wired network terminal), and the conventional fixed terminal transmits a NAS message to an AMF through, for example, an N1c interface. Names of interfaces between devices are not limited in this embodiment of this application, provided that the interfaces can be used to transmit NAS messages between the terminal devices and the AMF. An NG-STB is a 5G fixed terminal, and the 5G fixed terminal transmits a NAS message to the AMF through an N1b interface. An NG-UE is a mobile terminal in a 5G network, and the 5G mobile terminal transmits a NAS message to the AMF through an N1 interface in the 5G network. An NG-RG is a home gateway in the 5G network, and the NG-RG may include a wireless terminal module (that is, a WTTx CPE, which accesses the network by using a radio access network RAN), and may further include a fixed terminal module (that is, a fixed CPE, which accesses the network by using a wired access network fixed AN). An NG-RG and other terminal devices (for example, the STB, the NG-UE, and the NG-STB) at home may form a WLAN/LAN/PAN (the WLAN is a wireless local area network, the LAN is a local area network, and the PAN is a personal area network) in a wireless connection manner (for example, a direct D2D connection between terminals in 3GPP, or a connection manner such as WiFi/Bluetooth/Zigbee/microwave/infrared) or in a wired connection manner (for example, Ethernet), and provides network access services for these terminal devices. An NG-NAS is a NAS message processing module in a CPE, and transmits a NAS message to the AMF through an N1a interface. A WTTx RAN module in a RAN transmits a control plane message to the AMF through an interface N2b, and a fixed AN module transmits a control plane message to the AMF through an interface N2a.

FIG. 12 shows an authorization solution for a CPE and a terminal device served by the CPE in the converged network. The CPE and the terminal device served by the CPE each use NAS messages to bear authorization messages corresponding to various possible authorization protocols, and perform an authorization and authentication process in the network. Various possible authorization mechanisms include but are not limited to an EPS-AKA or EPS-AKA' mechanism commonly used in a wireless network, or EAP-TLS, EAP-SIM, EAP-AKA, EAP-AKA', and the like that are in an EAP series commonly used in a wireless local area network, or an authorization mechanism corresponding to an access mode such as PPP, PPPoX, and IPoX commonly used in a fixed network.

To support diversified authorization protocols to be borne on a mobile network side by using a NAS protocol, in this application, there are three methods for carrying an authorization-related message by using a NAS message. For understanding of three types of the NAS message, refer to the descriptions in the foregoing part, and details are not described herein again.

Figure 13:
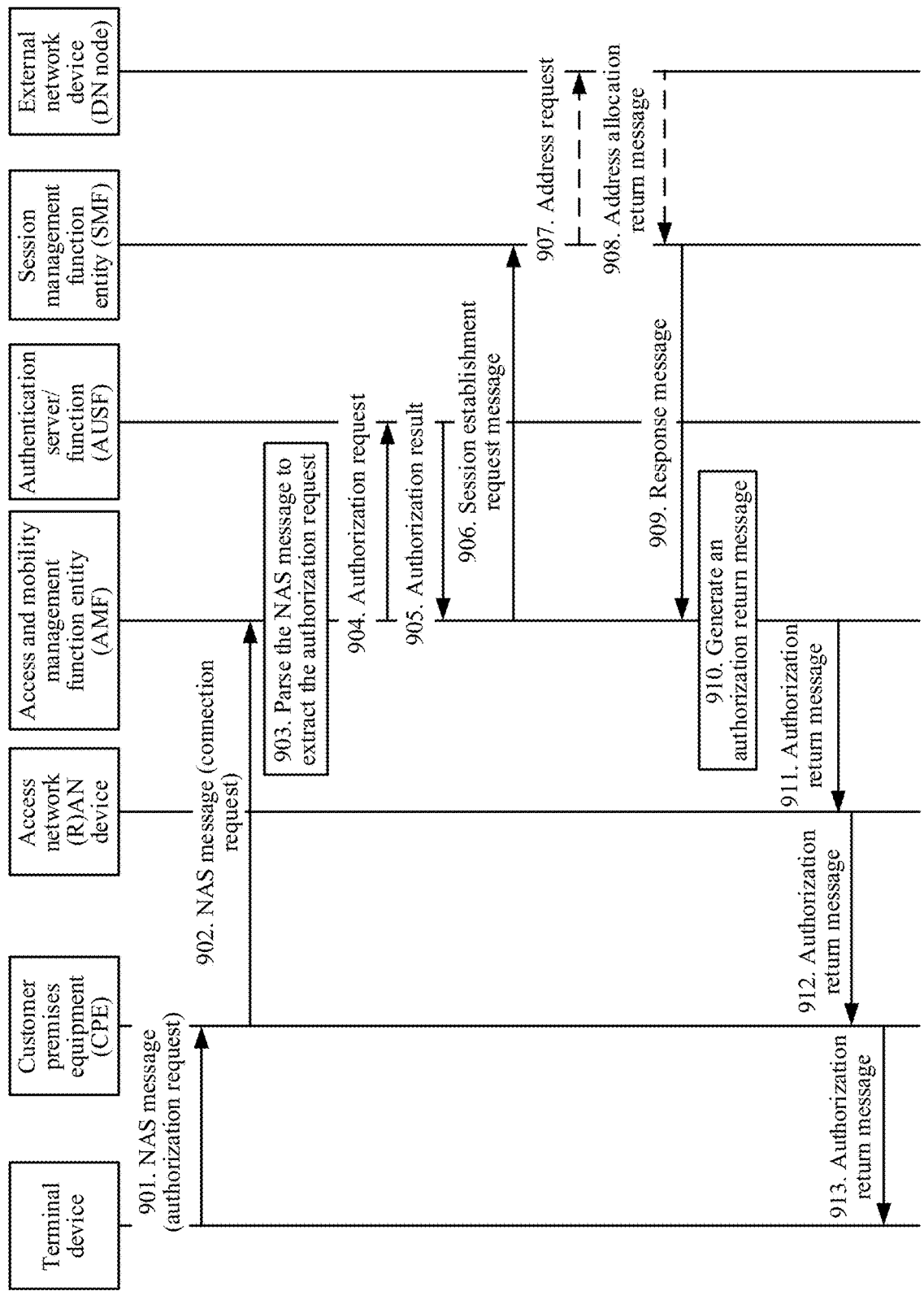
FIG. 13 is a schematic diagram of another embodiment of a access network method for a device according to the embodiments of this application.

The following describes the part 3 in the embodiments of this application with reference to FIG. 13, in one embodiment, a solution in which a terminal device served by the CPE accesses a network in the converged network architecture in the 5G scenario. A (R)AN indicates that an access network may be a radio access network or a fixed (wired) access network. In one embodiment, a (R)AN device indicates a radio access network device, for example, a base station, or a fixed (wired) access network device, for example, a DSLAM.

As shown in FIG. 13, another embodiment for a method used by a device to access a network provided in an embodiment of this application includes the following steps.

901. A terminal device sends an authorization request.

The terminal device may be understood as a terminal device served by a CPE. The served terminal device is a terminal device connected to the CPE. The terminal device accesses a network by using the CPE.

The authorization request may be included in a NAS message. In one embodiment, the NAS message may further carry authorization type indication information. The authorization request may be an access request, a connection request, an authorization request, an address allocation request, or another type of information that indicates a network access intention, sent by the terminal device to the network when the terminal device accesses the network. For brevity, all these are collectively referred to as an authorization request. The authorization type indication information may include an identifier indication of an authorization mode and/or an identifier indication of an authorization protocol.

902. As a relay role, a CPE forwards, to a (R)AN device, a NAS message including the authorization request of the terminal served by the CPE. After receiving the NAS message, the (R)AN device sends, to an AMF, the NAS message of the terminal device served by the CPE.

In one embodiment, if the authorization request sent by the terminal device served by the CPE is not included in the NAS message, the CPE may generate an uplink NAS message, and send the uplink NAS message to the AMF by using the (R)AN device. The uplink NAS message carries the authorization request of the served terminal device or a key parameter in the authorization request, and/or the authorization type indication information.

903. The AMF parses the received NAS message.

The AMF extracts information related to the authorization request, and determines a required authorization mode or authorization protocol.

904. The AMF sends the authorization request to a node having an authentication function, for example, an AUSF.

905. Perform authorization on the terminal device.

The AUSF may support various different authorization protocols. The AUSF returns an authorization result to the AMF after completing the authorization on the terminal device based on the authorization request sent by the AMF.

906. If the authorization succeeds, the AMF sends a message to an SMF.

The message (for example, a request/acknowledgement/transmission message) may be used to request to establish a PDU session, and may further include an address request of the terminal device.

907. The SMF selects an appropriate UPF based on a requirement of the terminal device, establishes the PDU session, and allocates an IP address to the terminal device.

In one embodiment, the SMF may allocate an IP address to the terminal device, or the SMF may initiate a DHCP address allocation request to an external network device (a DN node) such as a BNG by using a UPF. The BNG may allocate an IP address to the terminal device, or request a DHCP server to allocate an IP address, then add the allocated IP address to a return packet (for example, a DHCP offer and/or a DHCP ACK), and send the packet to the SMF by using the UPF. The packet (for example, the DHCP offer and/or the DHCP ACK) returned by the network device may carry reference information used for route configuration of the CPE (for example, the reference information of the route configuration is added to an extended field option 121). For understanding of content of the reference information used for the route configuration of the CPE, refer to the corresponding description in operation 109.

908. The SMF receives a message returned by an external network device that has an address allocation function, where the message may include the IP address allocated to the terminal device, and/or reference information used for route configuration of the CPE.

If the DHCP packet returned by the external network device includes the reference information used for route configuration of the CPE, the SMF may generate route configuration information based on the reference message, and add the route configuration information to a notification message sent by the SMF to the CPE by using the AMF. For understanding of content of the reference information used for route configuration of the CPE and the route configuration information, refer to the descriptions in operation 109 and operation 110.

909. The SMF sends a message to the AMF.

The message may be a request/acknowledgement/transmission message, for example, a "session establishment response message". The message includes a notification message sent by the SMF to the terminal device served by the CPE. The notification message may include the IP address allocated to the terminal device served by the CPE and/or the route configuration information. Alternatively, the message may include a notification message sent by the SMF to the CPE, where the notification message may include the route configuration information.

910. The AMF generates an authorization return message based on the authorization result and/or an IP address allocation result and/or the route configuration information, and encapsulates the authorization return message into a NAS message sent to the terminal device served by the CPE. In addition, if the AMF receives the notification message sent by the SMF to the CPE, the AMF may also add the notification message to the NAS message sent to the CPE.

911 to 913. Sequentially, the AMF transmits the authorization return message to the (R)AN device, the (R)AN device transmits the authorization return message to the CPE, and the CPE transmits the authorization return message to the served terminal device.

In operation 912, the CPE receives the NAS message forwarded by the (R)AN device. If the NAS message includes the authorization return message sent to the terminal device served by the CPE, where the authorization return message includes the route configuration information, the CPE may read the route configuration information from the NAS message (for example, the CPE configures a NAS snooping function), to configure a route. Alternatively, the NAS message sent by the AMF to the CPE includes route configuration information, and the CPE configures a route after receiving the corresponding NAS message.

After the authorization ends, for understanding of subsequent operations corresponding to protocol-related network access, refer to the processes in the foregoing embodiments. Details are not described herein again.

It can be learned from content of the embodiment corresponding to FIG. 13 that, in this embodiment of this application, the network access process of the terminal device may be implemented in the converged network architecture in the 5G scenario, thereby avoiding laying of dedicated network channels, and improving mobile network utilization.

The foregoing describes an authorization process for the terminal device served by the CPE. An authorization process for the CPE in the scenario is actually basically the same as the process corresponding to FIG. 13. A difference is that: the CPE plays the relay role during authorization on the terminal device served by the CPE, and during authorization on the CPE, an authorization request is added by the CPE to a NAS message and the NAS message is directly sent by the CPE.

Figure 14:
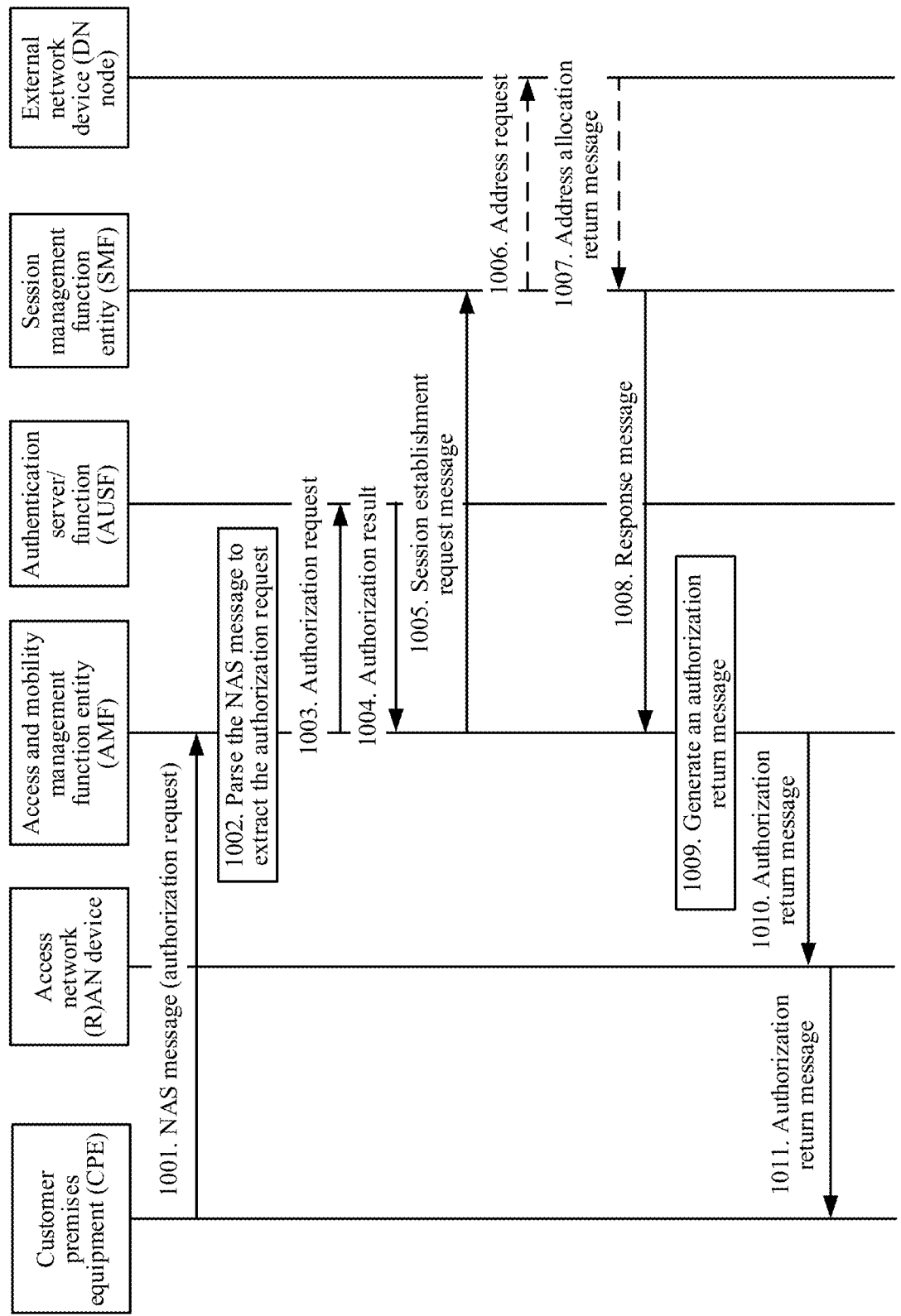
FIG. 14 is a schematic diagram of another embodiment of a access network method for a device according to the embodiments of this application.

As shown in FIG. 14, another embodiment for a method used by a device to access a network provided in an embodiment of this application includes the following operations.

1001. A CPE sends an authorization request to an AMF by using a (R)AN device.

The authorization request may be included in a NAS message. In one embodiment, the NAS message may further carry authorization type indication information.

The authorization request may be an access request, a connection request, an authorization request, an address allocation request, or another type of information that indicates a network access intention, sent by the CPE to a network when the CPE accesses the network. For brevity, all these are collectively referred to as an authorization request. The authorization type indication information may include an identifier indication of an authorization mode and/or an identifier indication of an authorization protocol.

Processes of 1002 to 1011 are similar to operations 903 to 912 in the embodiment corresponding to FIG. 13, and may be understood with reference to operations 903 to 912. It should be noted that a difference between this embodiment and the previous embodiment corresponding to FIG. 13 lies in that, in this embodiment, authorization and address allocation are for the CPE. Therefore, a message returned from a core network device to the terminal device served by the CPE in operation 903 to operation 912 may be replaced with a message returned from a core network device to the CPE in this embodiment. After receiving the message, the CPE may read content in the message. For example, the CPE may obtain route configuration information from a NAS message received by the CPE, and does not need to perform NAS snooping.

It can be learned from content of the embodiment corresponding to FIG. 14 that, in this embodiment of this application, the network access process of the CPE may be implemented in the converged network architecture in the 5G scenario, thereby avoiding laying of dedicated network channels, and improving mobile network utilization.

Figure 15A:
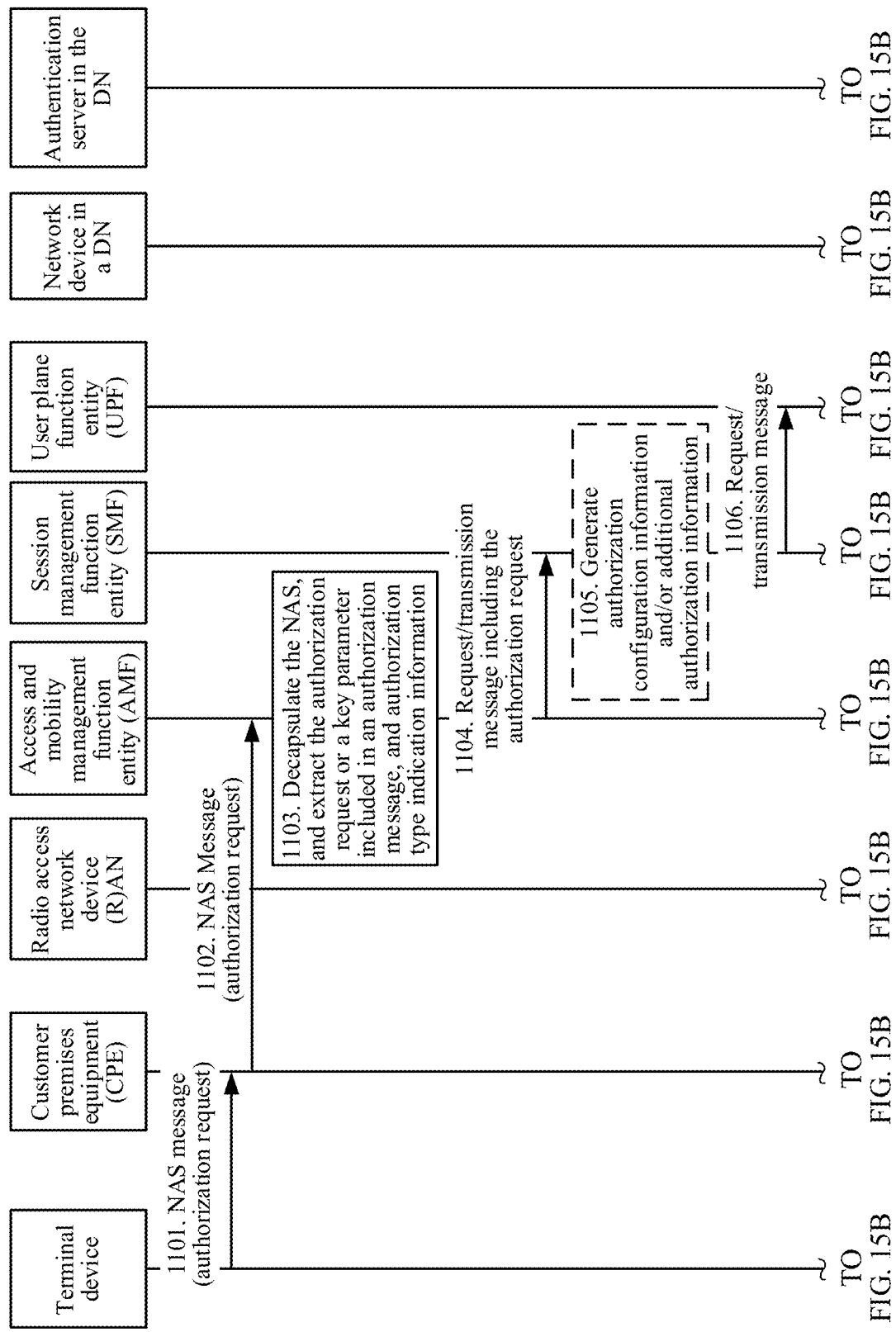
FIG. 15A and FIG. 15B are a schematic diagram of another embodiment of a access network method for a device according to the embodiments of this application.
Figure 15B:
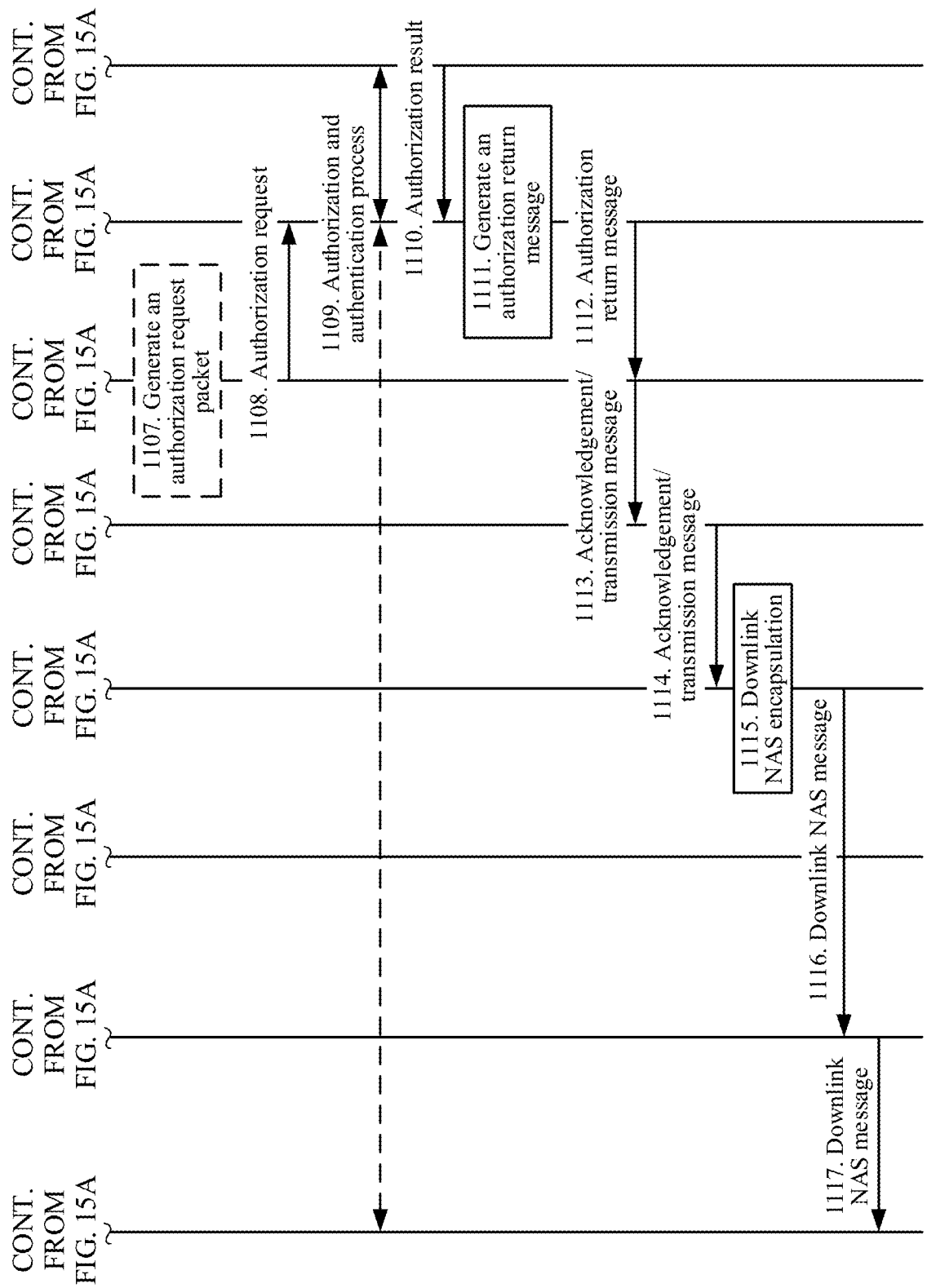

The following describes the part 4 in the embodiments of this application with reference to FIG. 15A and FIG. 15B, in one embodiment, another solution in which a terminal device served by a CPE and the CPE that are in a converged network access a network in a converged network architecture in the 5G scenario.

As shown in FIG. 15A and FIG. 15B, another embodiment of a method for network access by a device according to the embodiments of this application includes the following operations.

1101. A terminal device sends an authorization request.

The terminal device may be understood as a terminal device served by a CPE. The served terminal device is a terminal device connected to the CPE. The terminal device accesses a network by using the CPE.

The authorization request may be included in a NAS message. In one embodiment, the NAS message may further carry authorization type indication information.

The authorization request may be an access request, a connection request, an authorization request, an address allocation request, or another type of information that indicates a network access intention, sent by the terminal device to a network when the terminal device accesses the network. For brevity, all these are collectively referred to as an authorization request. The authorization type indication information may include an identifier indication of an authorization mode and/or an identifier indication of an authorization protocol.

1102. As a relay role, a CPE forwards, to a (R)AN device, a NAS message including the authorization request of terminal served by the CPE, and then forwards the NAS message to an AMF by using the (R)AN device.

In one embodiment, if the authorization request sent by the terminal device served by the CPE is not included in the NAS message, the CPE may generate an uplink NAS message, and send the uplink NAS message to the AMF by using the (R)AN device. The message carries the authorization request of the served terminal device or a key parameter in the authorization request, and/or the authorization type indication information.

For understanding of operation 1103 to operation 1116, refer to operation 504 to operation 517.

In operation 1116, the CPE receives the NAS message forwarded by the (R)AN device. If the NAS message includes an authorization return message sent to the terminal device served by the CPE, where the authorization return message includes route configuration information, the CPE may read the route configuration information from the NAS message (for example, the CPE configures a NAS snooping function), to configure a route. Alternatively, the NAS message sent by the AMF to the CPE includes route configuration information, and the CPE configures a route after receiving the corresponding NAS message.

The NAS snooping function described in this embodiment of this application means that a device can read a NAS message that transmitted by the device, to learn of all or a part of content of the NAS message, but does not change the content of the NAS message.

1117. The CPE transmits, to the terminal device served by the CPE, a NAS message sent by the AMF to the terminal device.

It can be learned from content of the embodiment corresponding to FIG. 15A and FIG. 15B that, in this embodiment of this application, the network access process of the terminal device may be implemented in the converged network architecture in the 5G scenario, thereby avoiding laying of dedicated network channels, and improving mobile network utilization.

The foregoing describes an authorization process for the terminal device served by the CPE. An authorization process for the CPE in the scenario is actually basically the same as the process corresponding to FIG. 15A and FIG. 15B. A difference is that: the CPE plays the relay role during authorization on the terminal device, and during authorization on the CPE, an authorization request is added by the CPE to a NAS message and the NAS message is directly sent by the CPE.

Figure 16A:
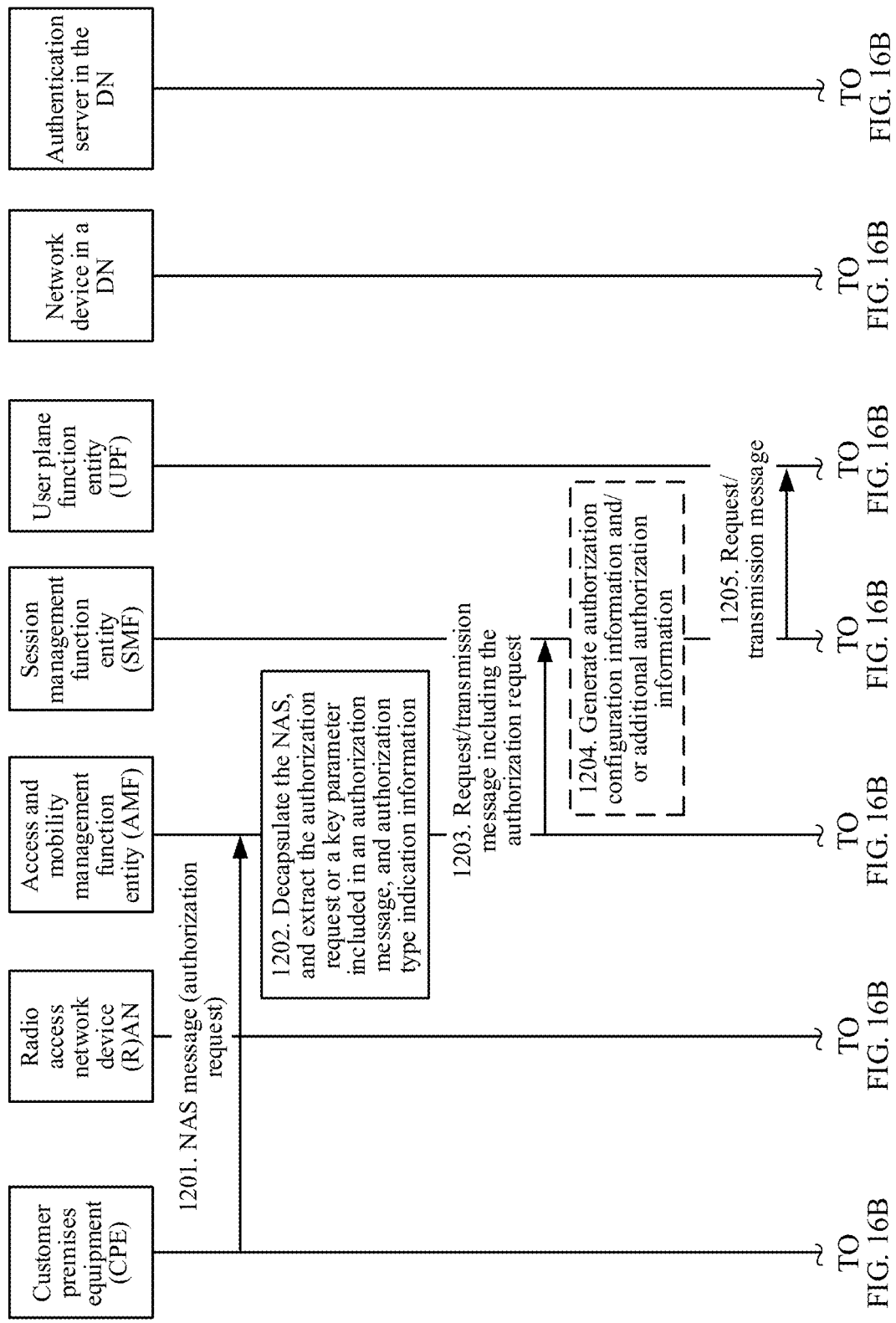

As shown in FIG. 16A and FIG. 16B, another embodiment for a method used by a device to access a network provided in an embodiment of this application includes the following operations.

1201. A CPE sends an authorization request to an AMF by using a (R)AN device.

The authorization request may be included in a NAS message. In one embodiment, the NAS message may further carry authorization type indication information.

The authorization request may be an access request, a connection request, an authorization request, an address allocation request, or another type of information that indicates a network access intention, sent by the CPE to a network when the CPE accesses the network. For brevity, all these are collectively referred to as an authorization request. The authorization type indication information may include an identifier indication of an authorization mode and/or an identifier indication of an authorization protocol.

Processes of 1202 to 1215 are similar to operations 1103 to 1116 in the embodiment corresponding to FIG. 15A and FIG. 15B, and may be understood with reference to operation 1103 to operation 1116. It should be noted that a difference between this embodiment and the embodiment corresponding to FIG. 15A and FIG. 15B lies in that, in this embodiment, authorization and address allocation are for the CPE. Therefore, a message returned from a core network device to the terminal device served by the CPE in operation 1103 to operation 1116 should be replaced with a message returned from a core network device to the CPE in this embodiment. After receiving the message, the CPE may read content in the message. For example, the CPE may obtain route configuration information from a NAS message received by the CPE, and does not need to perform NAS snooping. The NAS snooping function described in this embodiment of this application means that a device can read a NAS message that transmitted by the device, to learn of all or a part of content of the NAS message, but does not change the content of the NAS message.

It can be learned from content of the embodiment corresponding to FIG. 16A and FIG. 16B that, in this embodiment of this application, after a mobile network and a fixed network are converged into a converged network, an access process of the CPE may be implemented in the converged network, thereby avoiding laying of dedicated network channels, and improving mobile network utilization.

The foregoing describes the network access method in the embodiments of this application. The following describes a network access apparatus with reference to the accompanying drawings. The apparatus may be considered as an abstract summary of various network access apparatuses in the embodiments of this application.

The network access apparatus may be a CPE, a gateway device, a management function entity, or a terminal device.

Figure 17:
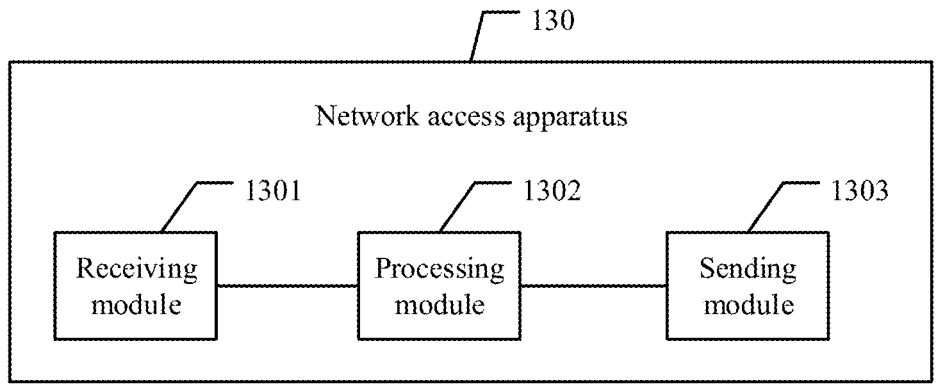
FIG. 17 is a schematic diagram of a function structure of an apparatus used for network access by a device according to an embodiment of this application.

As shown in FIG. 17, in a broad sense, a network access apparatus 130 may include the following modules divided based on functions: a receiving module 1301, a processing module 1302, and a sending module 1303. The receiving module 1301 may perform receiving functions in the embodiments shown in FIG. 3A to FIG. 16B when the network access apparatus is a corresponding CPE, gateway device, management function entity, or terminal device. The sending module 1303 may perform sending functions in the embodiments shown in FIG. 3A to FIG. 16B when the network access apparatus is a corresponding CPE, gateway device, management function entity, or terminal device. The processing module 1302 may perform processing functions in the embodiments shown in FIG. 3A to FIG. 16B when the network access apparatus is a corresponding CPE, gateway device, management function entity, or terminal device.

Figure 18:
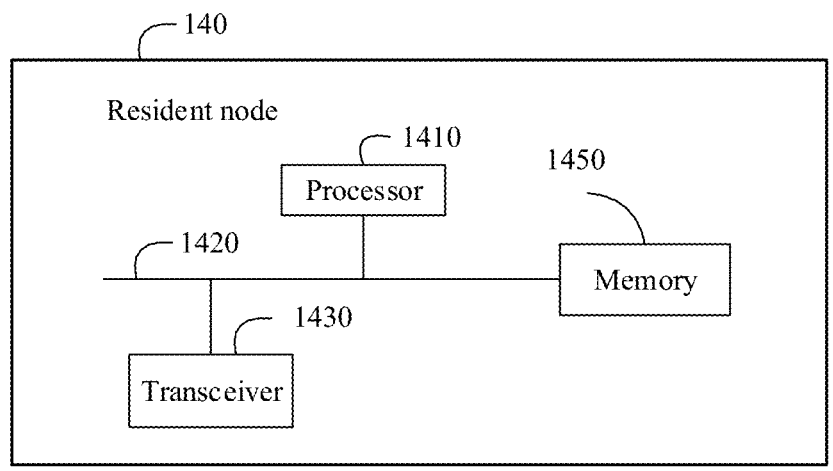
FIG. 18 is a schematic diagram of an embodiment of a customer premises equipment according to the embodiments of this application.

FIG. 18 is a schematic structural diagram of a CPE 140 according to an embodiment. The CPE 140 includes at least one processor 1410, a memory 1450, and a transceiver 1430. The memory 1450 may include a read-only memory and a random access memory, and provide an operation instruction and data to the processor 1410. A part of the memory 1450 may further include a non-volatile random access memory (NVRAM).

In some embodiments, the memory 1450 stores the following elements: an executable module or a data structure, or a subset thereof, or an extended set thereof.

In this embodiment, the operation instruction stored in the memory 1450 (the operation instruction may be stored in an operating system) is invoked to perform a corresponding operation. The processor 1410 controls an operation of the CPE 140, and the processor 1410 may also be referred to as a CPU (central processing unit). The memory 1450 may include a read-only memory and a random access memory, and provide an instruction and data to the processor 1410. A part of the memory 1450 may further include a non-volatile random access memory (NVRAM). During specific application, components of the CPE 140 are coupled together by using a bus system 1420. In addition to a data bus, the bus system 1420 may further include a power bus, a control bus, a status signal bus, and the like. However, for clear description, various types of buses in the figure are marked as the bus system 1420.

The methods disclosed in the foregoing embodiments may be applied to the processor 1410, or implemented by the processor 1410. The processor 1410 may be an integrated circuit chip and has a signal processing capability. In an implementation process, operations in the foregoing methods can be implemented by using a hardware integrated logic circuit in the processor 1410, or by using instructions in a form of software. The processor 1410 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 1410 may implement or perform the methods, operations, and logical block diagrams that are disclosed in the embodiments. The general purpose processor may be a microprocessor, or the processor may be any conventional processor or the like. Operations of the methods disclosed with reference to the embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1450, and the processor 1410 reads information in the memory 1450 and completes the operations in the foregoing methods in combination with hardware of the processor 1410.

In one embodiment, the transceiver 1430 is configured to perform sending and receiving operations of the CPE in the embodiments shown in FIG. 3A to FIG. 16B.

The processor 1410 is configured to perform processing operations of the CPE in the embodiments shown in FIG. 3A to FIG. 16B.

For understanding of structures of other gateway device, management function entity, and terminal device, refer to FIG. 18. Functions of corresponding transceivers and processors in the gateway device, the management function entity, and the terminal device may each perform corresponding sending, receiving, and processing operations of the devices in FIG. 3A to FIG. 16B.

Figure 19:
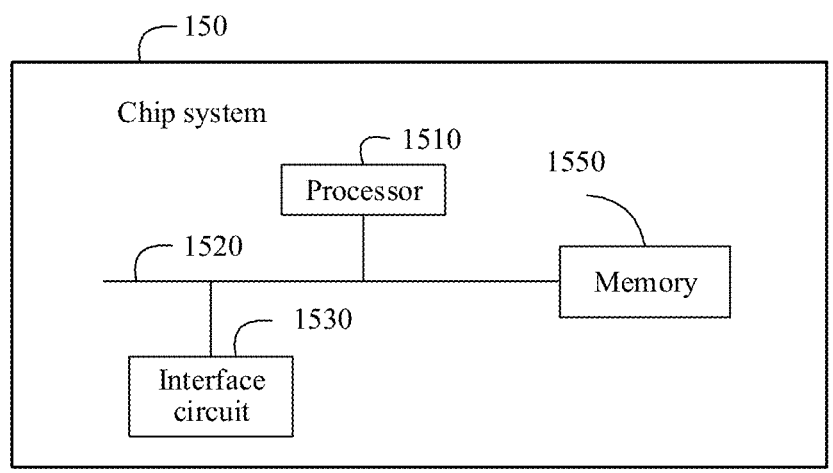
FIG. 19 is a schematic diagram of an embodiment of a chip system according to the embodiments of this application.

FIG. 19 is a schematic structural diagram of a chip system 150 according to an embodiment. The chip system 150 includes at least one processor 1510, a memory 1550, and an interface circuit 1530. The memory 1550 may include a read-only memory and a random access memory, and provide an operation instruction and data to the processor 1510. A part of the memory 1550 may further include a non-volatile random access memory (NVRAM).

In some embodiments, the memory 1550 stores the following elements: an executable module or a data structure, or a subset thereof, or an extended set thereof.

In this embodiment, the operation instruction stored in the memory 1550 (the operation instruction may be stored in an operating system) is invoked to perform a corresponding operation.

In one embodiment, structures of chip systems used by a customer premises equipment, a gateway device, a management function entity, or a terminal device are similar, but different apparatuses use different chip systems to implement respective functions.

The processor 1510 controls operations of the customer premises equipment, the gateway device, the management function entity, or the terminal device, and the processor 1510 may also be referred to as a CPU (central processing unit). The memory 1550 may include a read-only memory and a random access memory, and provide an instruction and data to the processor 1510. A part of the memory 1550 may further include a non-volatile random access memory (NVRAM). During specific application, components of the chip system 150 are coupled together by using a bus system 1520. In addition to a data bus, the bus system 1520 may further include a power bus, a control bus, and a status signal bus. However, for clear description, various types of buses in the figure are marked as the bus system 1520.

The methods disclosed in the foregoing embodiments may be applied to the processor 1510, or implemented by the processor 1510. The processor 1510 may be an integrated circuit chip and has a signal processing capability. In an implementation process, operations in the foregoing methods can be implemented by using a hardware integrated logic circuit in the processor 1510, or by using instructions in a form of software. The processor 1510 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 1510 may implement or perform the methods, operations, and logical block diagrams that are disclosed in the embodiments of the invention. The general purpose processor may be a microprocessor, or the processor may be any conventional processor or the like. Operations of the methods disclosed with reference to the embodiments of the invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1550, and the processor 1510 reads information in the memory 1550 and completes the operations in the foregoing methods in combination with hardware of the processor 1510.

In one embodiment, the interface circuit 1530 is configured to perform sending and receiving operations of the customer premises equipment, the gateway device, the management function entity, or the terminal device in the embodiments tot shown in FIG. 3A to FIG. 16B.

In one embodiment, the processor 1510 is configured to perform processing operations of the customer premises equipment, the gateway device, the management function entity, or the terminal device in the embodiments shown in FIG. 3A to FIG. 16B.

In the foregoing embodiment, the instruction that is stored in the memory and that is to be performed by the processor may be implemented in a form of a computer program product. The computer program product may be written into the memory in advance, or may be downloaded and installed in the memory in a form of software.

The computer program product includes one or more computer instructions. When the computer program instructions are loaded or executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The access network method, the apparatus, the device, the computer-readable storage medium, and the system provided in the embodiments of this application are described in detail above. The principle and implementations of this application are described herein through specific examples. The descriptions about the embodiments are merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limitation to this application.

What is claimed is:

1. A network access method comprising:
   receiving, by a resident node, a first message from a terminal device, wherein the first message comprises an authorization request;
   sending, by the resident node, a second message, wherein the second message is processed by a network node into a third message, the third message used by a gateway device to identify the authorization request and/or an authorization mode for the terminal device to access a network, and the authorization request and/or the authorization mode for the terminal device to access a network is used by the network to perform authorization on the terminal device, wherein the second message is transmitted through an authorization channel corresponding to the authorization mode, and the authorization channel is used to determine the corresponding authorization mode; and
   receiving, by the resident node, authorization result information from the network, and sending the authorization result information to the terminal device.

2. The method according to claim 1, wherein the authorization request and/or the authorization mode for the terminal device to access a network used by the network to perform authorization on the terminal device comprises:
   the authorization mode is used to instruct the gateway device to send the authorization request to a network device, and the authorization request is used to instruct the network device to perform authorization on the terminal device; and
   the receiving, by the resident node, authorization result information from the network comprises:
   receiving, by the resident node, the authorization result information returned by the network device by using the gateway device.

3. The method according to claim 1, wherein the second message comprises the authorization request and indication information, and the indication information is used to indicate the authorization mode for the terminal device to access a network.

4. The method according to claim 1, wherein the method further comprises:
   identifying, by the resident node based on the first message, the authorization mode for the terminal device to access a network from information carried in a data packet between the terminal device and the resident node; and
   processing, by the resident node, the authorization request and indication information used to indicate the authorization mode, to obtain the second message.

5. The method according to claim 4, wherein the second message comprises the indication information, and the indication information is added by the resident node in a processing process that is of a protocol layer above an air interface access layer in a communication protocol or that is of the air interface access layer; and the sending, by the resident node, a second message comprises:

sending, by the resident node, the second message to a radio access network (RAN) device, wherein when the second message comprises the indication information, the indication information and the authorization request are comprised in the third message, and the third message is transmitted through a transmission channel between the RAN device and the gateway device.

6. The method according to claim 4, wherein the second message is a first non-access stratum (NAS) message, and the first NAS message comprises the authorization request and the indication information; and the sending, by the resident node, a second message comprises:

sending, by the resident node, the first NAS message to a radio access network (RAN) device, and sending the first NAS message to a management device by using the RAN device, wherein the authorization request and the indication information in the first NAS message are obtained by the management device, and are sent by the management device to the gateway device.

7. The method according to claim 1, wherein the authorization result information comprises information that the authorization succeeds, and a return message corresponding to the authorization result information comprises address allocation information and/or route configuration information, wherein the route configuration information comprises reference information that is of route configuration and that is allocated by the network device or configuration information that is of route configuration and that is determined by the gateway device based on reference information of the route configuration, and the address allocation information comprises a network address pre-allocated or allocated to the terminal device.

8. The method according to claim 7, wherein the method further comprises:

storing, by the resident node, the route configuration information, wherein the route configuration information is used by the resident node to determine corresponding route configuration for a service of the terminal device.

9. The method according to claim 6, wherein the first NAS message is a first-type NAS message, and the first-type NAS message is a message used by the terminal device to access the network; or the first NAS message is a second-type NAS message, the second-type NAS message comprises an information element, and the information element comprises information used by the terminal device to access the network; or the first NAS message is a third-type NAS message, the third-type NAS message comprises an information element, the information element is used to carry information used by the terminal device to access the network, and the information element comprises an information element used for access or a message container used for access.

10. The method according to claim 1, wherein the second message further comprises additional authorization information, and the additional authorization information comprises at least one of an identity indicating the resident node, information indicating a location of the terminal device and/or a location of the resident node, or information about a channel used to transmit the authorization request; and the information about a channel used to transmit the authorization request comprises at least one of the following information: a tunnel identifier, a bearer identifier, or a session identifier.

11. An apparatus applied for a resident node comprising:
at least one processor; and
a memory storing instructions executable by the at least one processor, wherein the instructions instruct the at least one processor to perform operations comprising:
receiving, a first message from a terminal device, wherein the first message comprises an authorization request;
sending, a second message, wherein the second message is processed by a network node into a third message, the third message used by a gateway device to identify the authorization request and/or an authorization mode for the terminal device to access a network, and the authorization request and/or the authorization mode for the terminal device to access a network is used by the network to perform authorization on the terminal device, wherein the second message is transmitted through an authorization channel corresponding to the authorization mode, and the authorization channel is used to determine the corresponding authorization mode; and
receiving, authorization result information from the network, and sending the authorization result information to the terminal device.

12. The apparatus according to claim 11, wherein the authorization request and/or the authorization mode for the terminal device to access a network used by the network to perform authorization on the terminal device comprises:
the authorization mode is used to instruct the gateway device to send the authorization request to a network device, and the authorization request is used to instruct the network device to perform authorization on the terminal device; and wherein the instructions instruct the at least one processor to perform operations comprising:
the receiving, authorization result information from the network comprises:
receiving, the authorization result information returned by the network device by using the gateway device.

13. The apparatus according to claim 11, wherein the second message comprises the authorization request and indication information, and the indication information is used to indicate the authorization mode for the terminal device to access a network.

14. The apparatus according to claim 11, wherein the instructions instruct the at least one processor to perform operations comprising:
identifying, based on the first message, the authorization mode for the terminal device to access a network from information carried in a data packet between the terminal device and the apparatus; and
processing, the authorization request and indication information used to indicate the authorization mode, to obtain the second message.

15. The apparatus according to claim 14, wherein the second message comprises the indication information, and the indication information is added by the apparatus in a processing process that is of a protocol layer above an air interface access layer in a communication protocol or that is of the air interface access layer; and wherein the instructions instruct the at least one processor to perform operations comprising:

the sending, a second message comprises:
sending, the second message to a radio access network (RAN) device, wherein
when the second message comprises the indication information, the indication information and the authorization request are comprised in the third message, and the third message is transmitted through a transmission channel between the RAN device and the gateway device.

16. The apparatus according to claim 14, wherein the second message is a first non-access stratum (NAS) message, and the first NAS message comprises the authorization request and the indication information; and wherein the instructions instruct the at least one processor to perform operations comprising:
the sending, a second message comprises:
sending, the first NAS message to a radio access network (RAN) device, and sending the first NAS message to a management device by using the RAN device, wherein the authorization request and the indication information in the first NAS message are obtained by the management device, and are sent by the management device to the gateway device.

17. The apparatus according to claim 11, wherein the authorization result information comprises information that the authorization succeeds, and a return message corresponding to the authorization result information comprises address allocation information and/or route configuration information, wherein the route configuration information comprises reference information that is of route configuration and that is allocated by the network device or configuration information that is of route configuration and that is determined by the gateway device based on reference information of the route configuration, and the address allocation information comprises a network address pre-allocated or allocated to the terminal device.

18. The apparatus according to claim 17, wherein the instructions instruct the at least one processor to perform operations comprising:
storing, the route configuration information, wherein the route configuration information is used by the apparatus to determine corresponding route configuration for a service of the terminal device.

* * * * *